(12) United States Patent
Fujisaki

(10) Patent No.: US 8,081,962 B1
(45) Date of Patent: *Dec. 20, 2011

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 12/901,496

(22) Filed: Oct. 9, 2010

Related U.S. Application Data

(63) Continuation of application No. 11/623,061, filed on Jan. 13, 2007, which is a continuation of application No. 10/905,365, filed on Dec. 30, 2004, now abandoned.

(60) Provisional application No. 60/521,265, filed on Mar. 23, 2004.

(51) Int. Cl.
*H04M 3/00* (2006.01)

(52) U.S. Cl. ..... 455/418; 370/486; 370/487; 455/404.2; 455/456.1; 455/457; 455/456.2; 455/456.3; 455/456.4; 455/456.5; 455/456.6; 455/414.1; 455/412.2; 455/566; 455/158.4; 455/158.5; 709/214; 709/216; 709/242

(58) Field of Classification Search ............... 370/486, 370/487; 455/418, 404.2, 456.1, 456.2, 456.3, 455/456.4, 456.5, 456.6, 457, 414.1, 412.2, 455/566, 158.4, 158.5; 709/214, 216, 242
See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,113,427 A | 5/1992 | Ryoichi et al. | |
| 5,272,638 A | 12/1993 | Martin et al. | |
| 5,353,376 A | 10/1994 | Oh et al. | |
| 5,388,147 A | 2/1995 | Grimes | |
| 5,404,579 A | 4/1995 | Obayashi et al. | |
| 5,405,152 A | 4/1995 | Katanics et al. | |
| 5,414,461 A | 5/1995 | Kishi et al. | |
| 5,446,904 A | 8/1995 | Belt et al. | |
| 5,532,741 A | 7/1996 | Tsutsumi | |
| 5,542,557 A | 8/1996 | Koyama et al. | |
| 5,543,789 A | 8/1996 | Behr et al. | |
| 5,559,554 A | 9/1996 | Uekane et al. | |
| 5,648,768 A | 7/1997 | Bouve | |
| 5,675,630 A | 10/1997 | Beatty | |
| 5,687,331 A | 11/1997 | Volk et al. | |
| 5,732,383 A | 3/1998 | Foladare et al. | |
| 5,758,280 A | 5/1998 | Kimura | |
| 5,772,586 A | 6/1998 | Heinonen et al. | |
| 5,778,304 A | 7/1998 | Grube et al. | |
| 5,802,460 A | 9/1998 | Parvulescu et al. | |
| 5,805,672 A | 9/1998 | Barkat et al. | |
| 5,812,930 A | 9/1998 | Zavrel | |
| 5,844,824 A | 12/1998 | Newman et al. | |
| 5,902,349 A | 5/1999 | Endo et al. | |
| 5,916,024 A | 6/1999 | Von Kohorn | |
| 5,918,180 A | 6/1999 | Dimino | |
| 5,959,661 A | 9/1999 | Isono | |
| 6,009,336 A | 12/1999 | Harris et al. | |
| 6,011,973 A | 1/2000 | Valentine et al. | |
| 6,043,752 A | 3/2000 | Hisada et al. | |
| 6,081,265 A | 6/2000 | Nakayama et al. | |
| 6,115,597 A | 9/2000 | Kroll et al. | |
| 6,128,594 A | 10/2000 | Gulli et al. | |

(Continued)

*Primary Examiner* — Patrick N. Edouard
*Assistant Examiner* — Shantell Heiber

(57) ABSTRACT

The communication device which implements a voice communicating function, an attached file emailing function, a geographic location function, a dictionary function, a schedule notifying function, a multiple type TV program function, a multiple TV screen displaying function, a touch panel function, a communication device finding function, and a resume enabled video game function, independently or simultaneously.

3 Claims, 1 Drawing Sheet

U.S. PATENT DOCUMENTS

Figure 1:
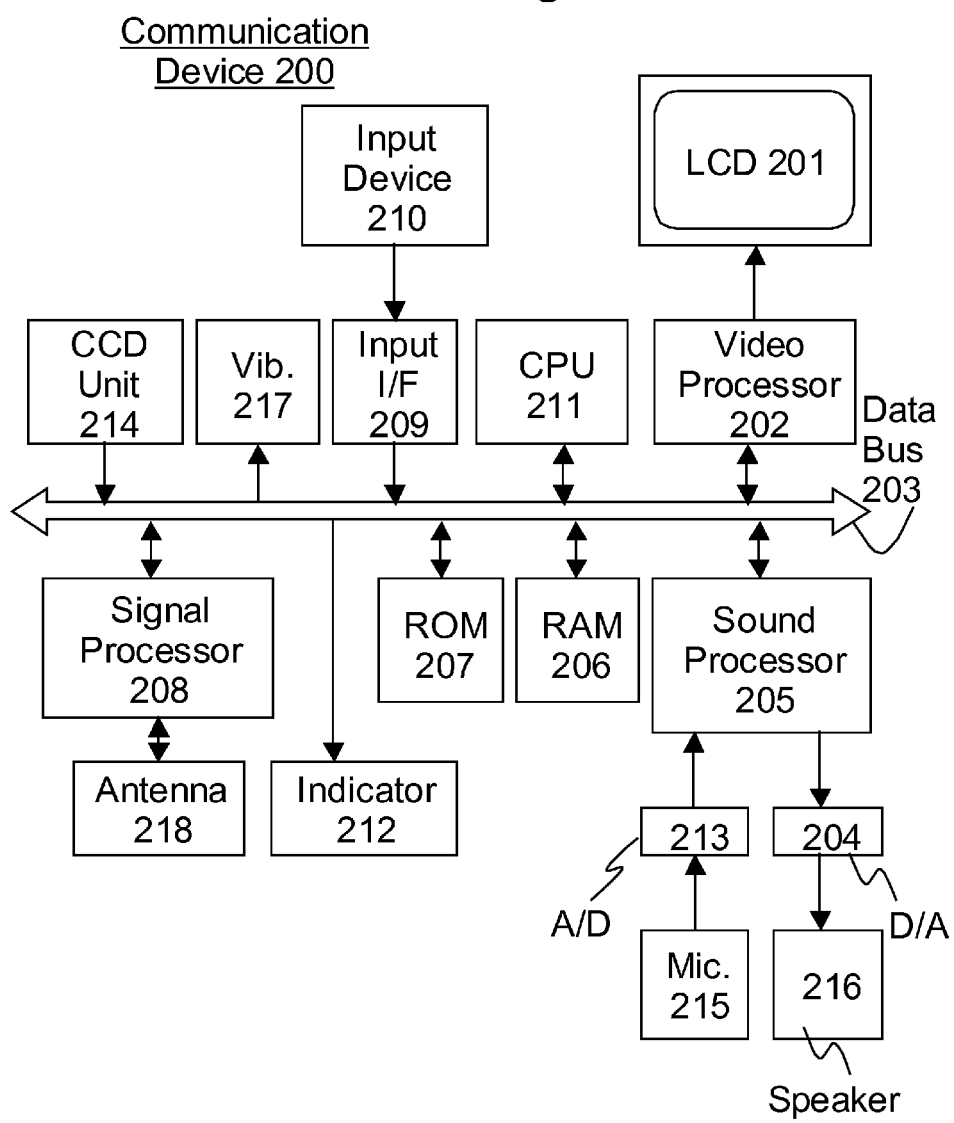

| | | |
|---|---|---|
| 6,144,848 A | 11/2000 | Walsh et al. |
| 6,148,212 A | 11/2000 | Park et al. |
| 6,198,942 B1 | 3/2001 | Hayashi et al. |
| 6,202,060 B1 | 3/2001 | Tran |
| 6,216,013 B1 | 4/2001 | Moore et al. |
| 6,216,158 B1 | 4/2001 | Luo et al. |
| 6,223,029 B1 | 4/2001 | Stenman et al. |
| 6,225,944 B1 | 5/2001 | Hayes |
| 6,236,832 B1 | 5/2001 | Ito |
| 6,243,039 B1 | 6/2001 | Elliot |
| 6,249,720 B1 | 6/2001 | Kubota et al. |
| 6,253,075 B1 | 6/2001 | Beghtol et al. |
| 6,265,988 B1 | 7/2001 | LeMense et al. |
| 6,285,317 B1 | 9/2001 | Ong |
| 6,292,666 B1 | 9/2001 | Siddiqui et al. |
| 6,292,747 B1 | 9/2001 | Amro et al. |
| 6,311,011 B1 | 10/2001 | Kuroda |
| 6,311,077 B1 | 10/2001 | Bien |
| 6,332,122 B1 | 12/2001 | Ortega et al. |
| 6,333,684 B1 | 12/2001 | Kang |
| 6,363,320 B1 | 3/2002 | Chou |
| 6,366,651 B1 | 4/2002 | Griffith et al. |
| 6,366,782 B1 | 4/2002 | Fumarolo et al. |
| 6,374,221 B1 | 4/2002 | Haimi-Cohen |
| 6,385,466 B1 | 5/2002 | Hirai et al. |
| 6,385,541 B1 | 5/2002 | Blumberg et al. |
| 6,405,033 B1 | 6/2002 | Kennedy, III et al. |
| 6,411,198 B1 | 6/2002 | Hirai et al. |
| 6,411,822 B1 | 6/2002 | Kraft |
| 6,415,138 B2 | 7/2002 | Sirola et al. |
| 6,421,470 B1 | 7/2002 | Nozaki et al. |
| 6,421,602 B1 | 7/2002 | Bullock et al. |
| 6,430,498 B1 | 8/2002 | Maruyama et al. |
| 6,442,404 B1 | 8/2002 | Sakajiri |
| 6,445,802 B1 | 9/2002 | Dan |
| 6,477,387 B1 | 11/2002 | Jackson et al. |
| 6,486,867 B1 | 11/2002 | Kopp et al. |
| 6,487,422 B1 | 11/2002 | Lee |
| 6,512,919 B2 | 1/2003 | Ogasawara |
| 6,519,566 B1 | 2/2003 | Boyer et al. |
| 6,526,293 B1 | 2/2003 | Matsuo |
| 6,529,742 B1 | 3/2003 | Yang |
| 6,532,035 B1 | 3/2003 | Saari et al. |
| 6,538,558 B2 | 3/2003 | Sakazume et al. |
| 6,542,750 B2 | 4/2003 | Hendrey et al. |
| 6,542,814 B2 | 4/2003 | Polidi et al. |
| 6,553,310 B1 | 4/2003 | Lopke |
| 6,567,745 B2 | 5/2003 | Fuchs et al. |
| 6,567,984 B1 | 5/2003 | Allport |
| 6,600,975 B2 | 7/2003 | Moriguchi et al. |
| 6,606,504 B1 | 8/2003 | Mooney et al. |
| 6,611,753 B1 | 8/2003 | Millington |
| 6,615,186 B1 | 9/2003 | Kolls |
| 6,618,704 B2 | 9/2003 | Kanevsky et al. |
| 6,622,018 B1 | 9/2003 | Erekson |
| 6,631,271 B1 | 10/2003 | Logan |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,681,120 B1 | 1/2004 | Kim |
| 6,690,932 B1 | 2/2004 | Barnier et al. |
| 6,701,148 B1 | 3/2004 | Wilson et al. |
| 6,707,942 B1 | 3/2004 | Cortopassi et al. |
| 6,711,399 B1 | 3/2004 | Granier |
| 6,725,022 B1 | 4/2004 | Clayton et al. |
| 6,728,531 B1 | 4/2004 | Lee et al. |
| 6,738,643 B1 | 5/2004 | Harris |
| 6,738,711 B2 | 5/2004 | Ohmura et al. |
| 6,763,226 B1 | 7/2004 | McZeal, Jr. |
| 6,772,174 B1 | 8/2004 | Pettersson |
| 6,779,030 B1 | 8/2004 | Dugan et al. |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,819,939 B2 | 11/2004 | Masamura |
| 6,820,055 B2 | 11/2004 | Saindon et al. |
| 6,836,654 B2 | 12/2004 | Decotignie |
| 6,865,372 B2 | 3/2005 | Mauney et al. |
| 6,883,000 B1 | 4/2005 | Gropper |
| 6,891,525 B2 | 5/2005 | Ogoro |
| 6,895,084 B1 | 5/2005 | Saylor et al. |
| 6,895,256 B2 | 5/2005 | Harma et al. |
| 6,895,259 B1 | 5/2005 | Blank nee Keller et al. |
| 6,898,321 B1 | 5/2005 | Knee et al. |
| 6,898,765 B2 | 5/2005 | Matthews, III et al. |
| 6,901,383 B1 | 5/2005 | Ricketts et al. |
| 6,904,298 B2 | 6/2005 | Arai et al. |
| 6,912,544 B1 | 6/2005 | Weiner |
| 6,922,630 B2 | 7/2005 | Maruyama et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,968,184 B2 | 11/2005 | Criss et al. |
| 6,968,206 B1 | 11/2005 | Whitsey-Anderson |
| 6,992,699 B1 | 1/2006 | Vance et al. |
| 6,999,802 B2 | 2/2006 | Kim |
| 7,003,598 B2 | 2/2006 | Kavanagh |
| 7,007,239 B1 | 2/2006 | Hawkins et al. |
| 7,012,999 B2 | 3/2006 | Ruckart |
| 7,028,077 B2 | 4/2006 | Toshimitsu et al. |
| 7,035,666 B2 | 4/2006 | Silberfenig et al. |
| 7,058,356 B2 | 6/2006 | Slotznick |
| 7,076,052 B2 | 7/2006 | Yoshimura |
| 7,081,832 B2 | 7/2006 | Nelson et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,117,152 B1 | 10/2006 | Mukherji et al. |
| 7,117,504 B2 | 10/2006 | Smith et al. |
| 7,126,951 B2 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Enzmann et al. |
| 7,142,810 B2 | 11/2006 | Oesterling |
| 7,142,890 B2 | 11/2006 | Irimajiri et al. |
| 7,190,880 B2 | 3/2007 | Cookson et al. |
| 7,218,916 B2 | 5/2007 | Nonami |
| 7,224,851 B2 | 5/2007 | Kinjo |
| 7,233,795 B1 | 6/2007 | Ryden |
| 7,239,742 B2 | 7/2007 | Ohtani et al. |
| 7,251,255 B1 | 7/2007 | Young |
| 7,260,416 B2 | 8/2007 | Shippee |
| 7,266,186 B1 | 9/2007 | Henderson |
| 7,274,952 B2 | 9/2007 | Hayashi |
| 7,346,373 B2 | 3/2008 | Kim |
| 7,426,264 B1 | 9/2008 | Henderson |
| 7,489,768 B1 | 2/2009 | Strietzel |
| 7,551,899 B1 | 6/2009 | Nicolas et al. |
| 2001/0000249 A1 | 4/2001 | Oba et al. |
| 2001/0005826 A1 | 6/2001 | Shibuya |
| 2001/0011293 A1 | 8/2001 | Murakami et al. |
| 2001/0029425 A1 | 10/2001 | Myr |
| 2001/0035829 A1 | 11/2001 | Yu et al. |
| 2001/0037191 A1 | 11/2001 | Furuta et al. |
| 2001/0041590 A1 | 11/2001 | Silberfenig et al. |
| 2002/0002705 A1 | 1/2002 | Byrnes et al. |
| 2002/0004701 A1 | 1/2002 | Nakano |
| 2002/0006804 A1 | 1/2002 | Mukai et al. |
| 2002/0016724 A1 | 2/2002 | Yang et al. |
| 2002/0019225 A1 | 2/2002 | Miyashita |
| 2002/0026348 A1 | 2/2002 | Fowler et al. |
| 2002/0028690 A1 | 3/2002 | McKenna et al. |
| 2002/0031120 A1 | 3/2002 | Rakib |
| 2002/0034292 A1 | 3/2002 | Tuoriniemi |
| 2002/0036642 A1 | 3/2002 | Kwon et al. |
| 2002/0038219 A1 | 3/2002 | Yanay et al. |
| 2002/0039914 A1 | 4/2002 | Hama et al. |
| 2002/0047787 A1 | 4/2002 | Mikkola et al. |
| 2002/0049742 A1 | 4/2002 | Chan et al. |
| 2002/0055350 A1 | 5/2002 | Gupte et al. |
| 2002/0058497 A1 | 5/2002 | Jeong |
| 2002/0058531 A1 | 5/2002 | Terasaki et al. |

| | | | | | | |
|---|---|---|---|---|---|---|
| 2002/0065037 A1 | 5/2002 | Messina et al. | | 2003/0135563 A1 | 7/2003 | Bodin et al. |
| 2002/0065604 A1 | 5/2002 | Sekiyama | | 2003/0142957 A1 | 7/2003 | Young et al. |
| 2002/0066115 A1 | 5/2002 | Wendelrup | | 2003/0148772 A1 | 8/2003 | Ben-Ari |
| 2002/0068585 A1 | 6/2002 | Chan et al. | | 2003/0153364 A1 | 8/2003 | Osann, Jr. |
| 2002/0068599 A1 | 6/2002 | Rodriguez et al. | | 2003/0155413 A1 | 8/2003 | Kovesdi et al. |
| 2002/0082059 A1 | 6/2002 | Nariai et al. | | 2003/0157929 A1 | 8/2003 | Janssen et al. |
| 2002/0085700 A1 | 7/2002 | Metcalf | | 2003/0166399 A1 | 9/2003 | Tokkonen et al. |
| 2002/0094806 A1 | 7/2002 | Kamimura | | 2003/0171113 A1 | 9/2003 | Choi |
| 2002/0098857 A1 | 7/2002 | Ishii | | 2003/0174685 A1 | 9/2003 | Hasebe |
| 2002/0102960 A1 | 8/2002 | Lechner | | 2003/0181201 A1 | 9/2003 | Bomze et al. |
| 2002/0103872 A1 | 8/2002 | Watanabe | | 2003/0204562 A1 | 10/2003 | Hwang |
| 2002/0110246 A1 | 8/2002 | Gosior et al. | | 2003/0220835 A1 | 11/2003 | Barnes, Jr. |
| 2002/0115469 A1 | 8/2002 | Rekimoto et al. | | 2003/0222762 A1 | 12/2003 | Beigl et al. |
| 2002/0120589 A1 | 8/2002 | Aoki | | 2003/0224760 A1 | 12/2003 | Day |
| 2002/0120718 A1 | 8/2002 | Lee | | 2003/0227570 A1 | 12/2003 | Kim et al. |
| 2002/0123336 A1 | 9/2002 | Kamada | | 2003/0229900 A1 | 12/2003 | Reisman |
| 2002/0127997 A1 | 9/2002 | Karlstedt et al. | | 2003/0236866 A1 | 12/2003 | Light |
| 2002/0133342 A1 | 9/2002 | McKenna | | 2004/0003307 A1 | 1/2004 | Tsuji |
| 2002/0137470 A1 | 9/2002 | Baron et al. | | 2004/0029640 A1 | 2/2004 | Masuyama et al. |
| 2002/0137526 A1 | 9/2002 | Shinohara | | 2004/0033795 A1 | 2/2004 | Walsh et al. |
| 2002/0142763 A1 | 10/2002 | Kolsky | | 2004/0034692 A1 | 2/2004 | Eguchi et al. |
| 2002/0147645 A1 | 10/2002 | Alao et al. | | 2004/0082321 A1 | 4/2004 | Kontianinen |
| 2002/0151326 A1 | 10/2002 | Awada et al. | | 2004/0103303 A1 | 5/2004 | Yamauchi et al. |
| 2002/0151327 A1 | 10/2002 | Levitt | | 2004/0107072 A1 | 6/2004 | Dietrich et al. |
| 2002/0154632 A1 | 10/2002 | Wang et al. | | 2004/0114732 A1 | 6/2004 | Choe et al. |
| 2002/0157101 A1 | 10/2002 | Schrader et al. | | 2004/0117108 A1 | 6/2004 | Nemeth |
| 2002/0164996 A1 | 11/2002 | Dorenbosch | | 2004/0137893 A1 | 7/2004 | Muthuswamy et al. |
| 2002/0165850 A1 | 11/2002 | Roberts et al. | | 2004/0137983 A1 | 7/2004 | Kerr et al. |
| 2002/0168959 A1 | 11/2002 | Noguchi et al. | | 2004/0142678 A1 | 7/2004 | Krasner |
| 2002/0173344 A1 | 11/2002 | Cupps et al. | | 2004/0157664 A1 | 8/2004 | Link |
| 2002/0177407 A1 | 11/2002 | Mitsumoto | | 2004/0166832 A1 | 8/2004 | Portman et al. |
| 2002/0178009 A1 | 11/2002 | Firman | | 2004/0166879 A1 | 8/2004 | Meadows et al. |
| 2002/0178225 A1 | 11/2002 | Madenberg et al. | | 2004/0174863 A1 | 9/2004 | Caspi et al. |
| 2002/0183045 A1 | 12/2002 | Emmerson et al. | | 2004/0183937 A1 | 9/2004 | Viinikanoja et al. |
| 2002/0191951 A1 | 12/2002 | Sodeyama et al. | | 2004/0203490 A1 | 10/2004 | Kaplan |
| 2002/0196378 A1 | 12/2002 | Slobodin et al. | | 2004/0203520 A1 | 10/2004 | Schirtzinger et al. |
| 2002/0198813 A1 | 12/2002 | Patterson, Jr. et al. | | 2004/0203577 A1 | 10/2004 | Forman et al. |
| 2002/0198936 A1 | 12/2002 | McIntyre et al. | | 2004/0203904 A1 | 10/2004 | Gwon et al. |
| 2003/0003967 A1 | 1/2003 | Ito | | 2004/0203909 A1 | 10/2004 | Koster |
| 2003/0007556 A1 | 1/2003 | Oura et al. | | 2004/0204035 A1 | 10/2004 | Raghuram et al. |
| 2003/0013483 A1 | 1/2003 | Ausems et al. | | 2004/0204126 A1 | 10/2004 | Reyes et al. |
| 2003/0014286 A1 | 1/2003 | Cappellini | | 2004/0204821 A1 | 10/2004 | Tu |
| 2003/0017857 A1 | 1/2003 | Kitson et al. | | 2004/0204848 A1 | 10/2004 | Matsuo et al. |
| 2003/0018744 A1 | 1/2003 | Johanson et al. | | 2004/0209649 A1 | 10/2004 | Lord |
| 2003/0018748 A1 | 1/2003 | McKenna | | 2004/0216037 A1 | 10/2004 | Hishida et al. |
| 2003/0032389 A1 | 2/2003 | Kim et al. | | 2004/0218738 A1 | 11/2004 | Arai et al. |
| 2003/0032406 A1 | 2/2003 | Minear et al. | | 2004/0219951 A1 | 11/2004 | Holder |
| 2003/0033214 A1 | 2/2003 | Mikkelsen et al. | | 2004/0222988 A1 | 11/2004 | Donnelly |
| 2003/0038800 A1 | 2/2003 | Kawahara | | 2004/0235513 A1 | 11/2004 | O'Connell |
| 2003/0045301 A1 | 3/2003 | Wollrab | | 2004/0235520 A1 | 11/2004 | Cadiz et al. |
| 2003/0045311 A1 | 3/2003 | Larikka et al. | | 2004/0242269 A1 | 12/2004 | Fadell |
| 2003/0045329 A1 | 3/2003 | Kinoshita | | 2004/0248586 A1 | 12/2004 | Patel et al. |
| 2003/0045996 A1 | 3/2003 | Yamazaki et al. | | 2004/0252197 A1 | 12/2004 | Fraley et al. |
| 2003/0050776 A1 | 3/2003 | Blair | | 2004/0257208 A1 | 12/2004 | Huang et al. |
| 2003/0052964 A1 | 3/2003 | Priestman et al. | | 2005/0004749 A1 | 1/2005 | Park |
| 2003/0055994 A1 | 3/2003 | Herrmann et al. | | 2005/0020301 A1 | 1/2005 | Lee |
| 2003/0061606 A1 | 3/2003 | Hartwig et al. | | 2005/0026629 A1 | 2/2005 | Contractor |
| 2003/0063732 A1 | 4/2003 | Mcknight | | 2005/0036509 A1 | 2/2005 | Acharya et al. |
| 2003/0065784 A1 | 4/2003 | Herrod | | 2005/0048987 A1 | 3/2005 | Glass |
| 2003/0065805 A1 | 4/2003 | Barnes, Jr. | | 2005/0070257 A1 | 3/2005 | Saarinen et al. |
| 2003/0069693 A1 | 4/2003 | Snapp et al. | | 2005/0090768 A1 | 4/2005 | Brattesani et al. |
| 2003/0073432 A1 | 4/2003 | Meade, II | | 2005/0097038 A1 | 5/2005 | Yu et al. |
| 2003/0083055 A1 | 5/2003 | Riordan et al. | | 2005/0107119 A1 | 5/2005 | Lee et al. |
| 2003/0083873 A1 | 5/2003 | Ross et al. | | 2005/0113080 A1 | 5/2005 | Nishimura |
| 2003/0084121 A1 | 5/2003 | De Boor et al. | | 2005/0120225 A1 | 6/2005 | Kirsch et al. |
| 2003/0093503 A1 | 5/2003 | Yamaki et al. | | 2005/0136949 A1 | 6/2005 | Barnes, Jr. |
| 2003/0093790 A1 | 5/2003 | Logan et al. | | 2005/0153681 A1 | 7/2005 | Hanson |
| 2003/0099367 A1 | 5/2003 | Okamura | | 2005/0153745 A1 | 7/2005 | Smethers |
| 2003/0100326 A1 | 5/2003 | Grube et al. | | 2005/0164684 A1 | 7/2005 | Chen et al. |
| 2003/0107580 A1 | 6/2003 | Egawa et al. | | 2005/0165871 A1 | 7/2005 | Barrs, II et al. |
| 2003/0109251 A1 | 6/2003 | Fujito et al. | | 2005/0166242 A1 | 7/2005 | Matsumoto et al. |
| 2003/0114191 A1 | 6/2003 | Nishimura | | 2005/0186954 A1 | 8/2005 | Kenney |
| 2003/0115240 A1 | 6/2003 | Cho | | 2005/0191969 A1 | 9/2005 | Mousseau |
| 2003/0117316 A1 | 6/2003 | Tischer | | 2005/0235312 A1 | 10/2005 | Karaoguz et al. |
| 2003/0119479 A1 | 6/2003 | Arima et al. | | 2005/0257149 A1 | 11/2005 | Kamiya et al. |
| 2003/0119485 A1 | 6/2003 | Ogasawara | | 2005/0261945 A1 | 11/2005 | Mougin et al. |
| 2003/0119562 A1 | 6/2003 | Kokubo | | 2006/0015819 A1 | 1/2006 | Hawkins et al. |
| 2003/0122779 A1 | 7/2003 | Martin et al. | | 2006/0031407 A1 | 2/2006 | Dispensa et al. |
| 2003/0132928 A1 | 7/2003 | Kori | | 2006/0041923 A1 | 2/2006 | McQuaide, Jr. |

| | | | | | |
|---|---|---|---|---|---|
| 2006/0052100 A1 | 3/2006 | Almgren | 2007/0204014 A1 | 8/2007 | Greer et al. |
| 2006/0073820 A1 | 4/2006 | Craswell et al. | 2007/0218891 A1 | 9/2007 | Cox |
| 2006/0133590 A1 | 6/2006 | Jiang | 2007/0260456 A1 | 11/2007 | Proux et al. |
| 2006/0140387 A1 | 6/2006 | Boldt | 2007/0262848 A1 | 11/2007 | Berstis et al. |
| 2006/0143655 A1 | 6/2006 | Ellis et al. | 2008/0014917 A1 | 1/2008 | Rhoads et al. |
| 2006/0166650 A1 | 7/2006 | Berger et al. | 2008/0016526 A1 | 1/2008 | Asmussen |
| 2006/0206913 A1 | 9/2006 | Jerding et al. | 2008/0016534 A1 | 1/2008 | Ortiz et al. |
| 2006/0234758 A1 | 10/2006 | Parupudi et al. | 2008/0058005 A1 | 3/2008 | Zicker et al. |
| 2006/0284732 A1 | 12/2006 | Brock-Fisher | 2008/0194273 A1 | 8/2008 | Kansal et al. |
| 2007/0061845 A1 | 3/2007 | Barnes, Jr. | 2008/0242283 A1 | 10/2008 | Ruckart |
| 2007/0109262 A1 | 5/2007 | Oshima et al. | 2008/0250459 A1 | 10/2008 | Roman |
| 2007/0135145 A1 | 6/2007 | Lee et al. | 2009/0197641 A1 | 8/2009 | Rofougaran et al. |
| 2007/0142047 A1 | 6/2007 | Heeschen | 2010/0030557 A1 | 2/2010 | Molloy et al. |
| 2007/0190944 A1 | 8/2007 | Doan et al. | 2010/0099457 A1 | 4/2010 | Kim |

COMMUNICATION DEVICE

Paragraph [0001]—CROSS REFERENCE TO RELATED APPLICATIONS

Paragraph [0002]—The application is a continuation of U.S. Ser. No. 11/623,061, filed 2007-Jan.-13, which is a continuation of U.S. Ser. No. 10/905,365, filed 2004-Dec.-30, now abandoned which claims the benefit of U.S. Provisional Application No. 60/521,265, filed 2004-Mar.-23, all of which are hereby incorporated herein by reference in their entirety.

Paragraph [0003]—BACKGROUND OF INVENTION

Paragraph [0003.1]—The invention relates to a communication device and more particularly to the communication device which has a capability to communicate with another communication device in a wireless fashion.

Paragraph [0004]—U.S. Pat. No. 4,937,570 is introduced as a prior art of the present invention of which the summary is the following: "A route guidance display device for an automotive vehicle capable of displaying route patterns with a three-dimensional effect to enhance the viewer's comprehension of the road route situation being encountered. The display device includes a plurality of intersecting display segments indicative of corresponding possible route configurations. A depth-enhancing segment is included in a portion indicating the straight-ahead route. An intersection name display section may be separately included to display the name and related information regarding an intersection laying ahead." However, the foregoing prior art does not disclose the communication device which implements a voice communicating function, an attached file emailing function, a geographic location function, a dictionary function, a schedule notifying function, a multiple type TV program function, a multiple TV screen displaying function, a touch panel function, a communication device finding function, and a resume enabled video game function, independently or simultaneously.

Paragraph [0005]—For the avoidance of doubt, the number of the prior arts introduced herein (and/or in IDS) may be of a large one, however, the applicant has no intent to hide the more relevant prior art(s) in the less relevant ones.

Paragraph [0006]—SUMMARY OF INVENTION

Paragraph [0007]—It is an object of the present invention to provide a device capable of implementing a plurality of functions.

Paragraph [0008]—It is another object of the present invention to provide merchandise to merchants attractive to the consumers in the U.S.

Paragraph [0009]—It is another object of the present invention to provide mobility to the users of the device in which the present invention is incorporated.

Paragraph [0010]—It is another object of the present invention to provide more convenience to the users of the device compared to the prior art.

Paragraph [0011]—It is another object of the present invention to overcome the shortcomings associated with the prior art.

Paragraph [0012]—It is another object of the present invention to provide a convenient device capable to implement the functions of both voice communication and audio (visual) player to consumers.

Paragraph [0013]—The present invention introduces the communication device which implements a voice communicating function, an attached file emailing function, a geographic location function, a dictionary function, a schedule notifying function, a multiple type TV program function, a multiple TV screen displaying function, a touch panel function, a communication device finding function, and a resume enabled video game function, independently or simultaneously.

Paragraph [0014]—BRIEF DESCRIPTION OF DRAWING

Paragraph [0015]—The above and other aspects, features, and advantages of the invention will be better understood by reading the following more particular description of the invention, presented in conjunction with the following drawing, wherein:

Paragraph [0016]—FIG. 1 is a block diagram illustrating an exemplary embodiment of the present invention.

Paragraph [0017]—DETAILED DESCRIPTION

Paragraph [0018]—The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the paragraph number is cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

Paragraph [0019]—FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

Paragraph [0020]—As another embodiment, LCD 201 or LCD 201/Video Processor 202 may be separated from the other elements described in FIG. 1, and be connected in a wireless fashion to be wearable and/or head-mountable.

Paragraph [0021]—When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

Paragraph [0022]—Paragraph [0022] illustrate(s) the data stored in Host H. As described in Paragraph [0022], Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

Paragraph [0023]—<<Movie eTicket Function>>

Paragraph [0024]—This Paragraph [0024] through Paragraph [0070] illustrate(s) the movie eticket function which enables the user of Communication Device 200 to purchase the movie tickets via Communication Device 200 and enter the movie theaters by utilizing Communication Device 200 without utilizing paper tickets.

Paragraph [0025]—This Paragraph [0025] illustrate(s) the storage area included in Host H (Paragraph [0022]). In the present embodiment, Host H includes Movie eTicket Data Storage Area H79b of which the data and the software programs stored therein are described in Paragraph [0024].

Paragraph [0026]—This Paragraph [0026] illustrate(s) the storage areas included in Movie eTicket Data Storage Area H79b (Paragraph [0025]). In the present embodiment, Movie eTicket Data Storage Area H79b includes Movie Data Storage Area H79b1, User Data Storage Area H79b2, Purchase Data Storage Area H79b3, and Work Area H79b4. Movie Data Storage Area H79b1 stores the data described in Paragraph [0027]. User Data Storage Area H79b2 stores the data described in Paragraph [0028]. Purchase Data Storage Area H79b3 stores the data described in Paragraph [0029]. Work Area H79b4 is utilized as a work area to perform calculation and temporarily store data.

Paragraph [0027]—This Paragraph [0027] illustrate(s) the data stored in Movie Data Storage Area H79b1 (Paragraph [0026]). In the present embodiment, Movie Data Storage Area H79b1 comprises two columns, i.e., 'Movie ID' and 'Movie Data'. Column 'Movie ID' stores the movie IDs, and each movie ID is an identification of the corresponding movie data stored in column 'Movie Data'. Column 'Movie Data' stores the movie data, and each the movie data includes five types of data, i.e., title, location, starting time, ending time, and summary. Here, the title represents the title of the movie represented by the corresponding movie ID, the location represents the geographic location of theater where the movie represented by the corresponding movie ID is shown, the starting time represents the starting time of the movie represented by the corresponding movie ID, the ending time represents the ending time of the movie represented by the corresponding movie ID, and the summary represents the summary of the movie represented by the corresponding movie ID. In the present embodiment, Movie Data Storage Area H79b1 stores the following data: the movie ID 'Movie#1' and the corresponding movie data 'Movie Data#1 (Title#1, Location#1, Starting Time#1, Ending Time#1, Summary#1)'; the movie ID 'Movie#2' and the corresponding movie data 'Movie Data#2 (Title#2, Location#2, Starting Time#2, Ending Time#2, Summary#2)'; the movie ID 'Movie#3' and the corresponding movie data 'Movie Data#3 (Title#3, Location#3, Starting Time#3, Ending Time#3, Summary#3)'; and the movie ID 'Movie#4' and the corresponding movie data 'Movie Data#4 (Title#4, Location#4, Starting Time#4, Ending Time#4, Summary#4)'.

Paragraph [0028]—This Paragraph [0028] illustrate(s) the data stored in User Data Storage Area H79b2 (Paragraph [0026]). In the present embodiment, User Data Storage Area H79b2 comprises two columns, i.e., 'User ID' and 'User Data'. Column 'User ID' stores the user IDs, and each user ID is an identification of the user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area H79b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

Paragraph [0029]—This Paragraph [0029] illustrate(s) the data stored in Purchase Data Storage Area H79b3 (Paragraph [0026]). In the present embodiment, Purchase Data Storage Area H79b3 comprises two columns, i.e., 'User ID' and 'Purchase Data'. Column 'User ID' stores the user IDs described in Paragraph [0028]. Column 'Purchase Data' stores the purchase data, and each purchase data is composed of alphanumeric data which do not represent or indicate the user data. A unique alphanumeric data may be assigned to each purchase data so that each purchase data is distinguished from the other purchase data. In the present embodiment, Purchase Data Storage Area H79b3 stores the following data: the user ID 'User#1' and the corresponding purchase data 'Purchase Data#1'; the user ID 'User#2' and the corresponding purchase data 'Purchase Data#2'; the user ID 'User#3' and the corresponding purchase data 'Purchase Data#3'; and the user ID 'User#4' and the corresponding purchase data 'Purchase Data#4'. As another embodiment, a common alphanumeric data may be assigned to all purchase data (i.e., Purchase Data#1, Purchase Data#2, Purchase Data#3, and Purchase Data#4 are composed of the same alphanumeric data).

Paragraph [0030]—This Paragraph [0030] illustrate(s) the software programs stored in Movie eTicket Software Storage Area H79c (Paragraph [0025]). In the present embodiment, Movie eTicket Software Storage Area H79c stores Movie Data Selecting Software H79c1, Purchase Data Producing Software H79c2, Purchase Data Updating Software H79c3, Purchase Data Deleting Software H79c5, and Movie eTicket Information Storage Area 20679a. Movie Data Selecting Software H79c1 is the software program described in Paragraph [0039]. Purchase Data Producing Software H79c2 is the software program described in Paragraph [0040]. Purchase Data Updating Software H79c3 is the software program described in Paragraph [0047]. Purchase Data Deleting Software H79c5 is the software program described in Paragraph [0049].

Paragraph [0031]—This Paragraph [0031] illustrate(s) the storage area included in RAM 206 (FIG. 1) of Communication Device 200. In the present embodiment, RAM 206 includes Movie eTicket Information Storage Area 20679a of which the data and the software programs stored therein are described in Paragraph [0033].

Paragraph [0032]—The data and/or the software programs stored in Movie eTicket Information Storage Area 20679a (Paragraph [0031]) may be downloaded from Host H (Paragraph [0022]) in the manner described in Paragraph [0416] through Paragraph [0422].

Paragraph [0033]—This Paragraph [0033] illustrate(s) the storage areas included in Movie eTicket Information Storage Area 20679a (Paragraph [0031]). In the present embodiment, Movie eTicket Information Storage Area 20679a includes Movie eTicket Data Storage Area 20679b and Movie eTicket Software Storage Area 20679c. Movie eTicket Data Storage Area 20679b stores the data described in Paragraph [0034] through Paragraph [0037]. Movie eTicket Software Storage Area 20679c stores the data described in Paragraph [0038].

Paragraph [0034]—This Paragraph [0034] illustrate(s) the storage areas included in Movie eTicket Data Storage Area 20679b (Paragraph [0033]). In the present embodiment, Movie eTicket Data Storage Area 20679b includes Movie Data Storage Area 20679b1, User Data Storage Area 20679b2, Purchase Data Storage Area 20679b3, and Work Area 20679b4. Movie Data Storage Area 20679b1 stores the data described in Paragraph [0035]. User Data Storage Area 20679b2 stores the data described in Paragraph [0036]. Purchase Data Storage Area 20679b3 stores the data described in Paragraph [0037]. Work Area 20679b4 is utilized as a work area to perform calculation and temporarily store data.

Paragraph [0035]—This Paragraph [0035] illustrate(s) the data stored in Movie Data Storage Area 20679b1 (Paragraph [0034]). In the present embodiment, Movie Data Storage Area 20679b1 comprises two columns, i.e., 'Movie ID' and 'Movie Data'. Column 'Movie ID' stores the movie IDs, and each movie ID is an identification of the corresponding movie data stored in column 'Movie Data'. Column 'Movie Data' stores the movie data, and each the movie data includes five types of data, i.e., title, location, starting time, ending time, and summary. Here, the title represents the title of the movie represented by the corresponding movie ID, the location represents the geographic location of theater where the movie represented by the corresponding movie ID is shown, the starting time represents the starting time of the movie represented by the corresponding movie ID, the ending time represents the ending time of the movie represented by the corresponding movie ID, and the summary represents the summary of the movie represented by the corresponding movie ID. In the present embodiment, Movie Data Storage Area H79b1 stores the following data: the movie ID 'Movie#1' and the corresponding movie data 'Movie Data#1 (Title#1, Location#1, Starting Time#1, Ending Time#1, Summary#1)'; the movie ID 'Movie#2' and the corresponding movie data 'Movie Data#2 (Title#2, Location#2, Starting Time#2, Ending Time#2, Summary#2)'; the movie ID 'Movie#3' and the corresponding movie data 'Movie Data#3 (Title#3, Location#3, Starting Time#3, Ending Time#3, Summary#3)'; and the movie ID 'Movie#4' and the corresponding movie data 'Movie Data#4 (Title#4, Location#4, Starting Time#4, Ending Time#4, Summary#4)'.

Paragraph [0036]—This Paragraph [0036] illustrate(s) the data stored in User Data Storage Area 20679b2 (Paragraph [0034]). In the present embodiment, User Data Storage Area 20679b2 comprises two columns, i.e., 'User ID' and 'User Data'. Column 'User ID' stores the user ID which is an identification of the user data stored in column 'User Data'. Column 'User Data' stores the user data which includes name, home address, phone number, email address, and credit card information. Here, the name represents the name of the user of Communication Device 200 (e.g., device A), the home address represents the home address of the user, the phone number represents the phone number of the user, the email address represents the email address of the user, and the credit card information represents the credit card information of the user. In the present embodiment, User Data Storage Area 20679b2 stores the following data: the user ID 'User#4' and the user data 'User Data#4 (Name#4, Home Address#4, Phone Number#4, Email Address#4, Credit Card Information#4)'.

Paragraph [0037]—This Paragraph [0037] illustrate(s) the data stored in Purchase Data Storage Area 20679b3 (Paragraph [0034]). In the present embodiment, Purchase Data Storage Area 20679b3 comprises two columns, i.e., 'User ID' and Purchase Data'. Column 'User ID' stores the user IDs described in Paragraph [0036]. Column 'Purchase Data' stores the purchase data which is composed of alphanumeric data which do not represent or indicate the user data. In the present embodiment, Purchase Data Storage Area 20679b3 stores the following data: the user ID 'User#4' and the corresponding purchase data 'Purchase Data#4'.

Paragraph [0038]—This Paragraph [0038] illustrate(s) the software programs stored in Movie eTicket Software Storage Area 20679c (Paragraph [0033]). In the present embodiment, Movie eTicket Software Storage Area 20679c stores Movie Data Selecting Software 20679c1, Purchase Data Producing Software 20679c2, and purchase data Authenticating Software 20679c4. Movie Data Selecting Software 20679c1 is the software program described in Paragraph [0039]. Purchase Data Producing Software 20679c2 is the software program described in Paragraph [0040]. Purchase Data Authenticating Software 20679c4 is the software program described in Paragraph [0048].

Paragraph [0039]—This Paragraph [0039] illustrate(s) Movie Data Selecting Software H79c1 (Paragraph [0030]) of Host H (Paragraph [0022]) and Movie Data Selecting Software 20679c1 (Paragraph [0038]) of Communication Device 200, which selects a movie for which the movie eticket is to be purchased. In the present embodiment, Host H retrieves all movie IDs and movie data from Movie Data Storage Area H79b1 (Paragraph [0027]), and sends these data to Communication Device 200 in a wireless fashion (S1). Upon receiving the movie IDs and the movie data from Host H, CPU 211 (FIG. 1) of Communication Device 200 stores these data in Movie Data Storage Area 20679b1 (Paragraph [0035]) (S2). CPU 211 retrieves the movie data from Movie Data Storage Area 20679b1 (Paragraph [0035]) and displays a movie list on LCD 201 (FIG. 1) (S3). The user of Communication Device 200 selects a movie data (e.g., Movie Data#1) by utilizing Input Device 210 (FIG. 1) or via voice recognition system (S4).

Paragraph [0040]—This Paragraph [0040] illustrate(s) Purchase Data Producing Software H79c2 (Paragraph [0030]) of Host H (Paragraph [0022]) and Purchase Data Producing Software 20679c2 (Paragraph [0038]) of Communication Device 200, which produces a purchase data. In the present embodiment, CPU 211 (FIG. 1) of Communication Device 200 retrieves its user data (e.g., User Data#4) from User Data Storage Area 20679b2 (Paragraph [0036]) (S1), and sends in a wireless fashion the corresponding movie ID (e.g., Movie#1) of the movie data selected in S4 (e.g., Movie Data#1) and the user data (e.g., User Data#4), which are received by Host H (S2). Host H retrieves the credit card information (e.g., Credit Card Information#4) from the user data (e.g., User Data#4), and performs the credit card authentication process which is a process to authenticate the credit card information (e.g., Credit Card Information#4) (S3). If the credit card information is authenticated, Host H produces a new user ID (e.g., User#4) and stores the user data (e.g., User Data#4) at the corresponding user ID (e.g., User#4) in User Data Storage Area H79b2 (Paragraph [0028]) (S4). Host H produces a purchase data (e.g., Purchase Data#4) and stores the data at the corresponding user ID (e.g., User#4) in Purchase Data Storage Area H79b3 (Paragraph [0029]) (S5). Host H sends in a wireless fashion the purchase data (e.g., Purchase Data#4), and Communication Device 200 receives the data (S6). CPU 211 of Communication Device 200 stores the purchase data (e.g., Purchase Data#4) in Purchase Data Storage Area 20679b3 (Paragraph [0037]) (S7).

Paragraph [0041]—This Paragraph [0041] illustrate(s) the function of Movie eTicket Authenticating Device MAD79, Admission Gate Controller AGC79, and Admission Gate AG79. In the present embodiment, Movie eTicket Authenticating Device MAD79 is connected to Admission Gate Controller AGC79, and Admission Gate Controller AGC79 is connected to Admission Gate AG79 Admission Gate AG79 is the gate installed at the entrance of a movie theater. Admission Gate AG79 is normally closed, and opens only when an admission gate signal is sent from Admission Gate Controller AGC79. People are able to go through Admission Gate AG79 when it is open. Admission Gate Controller AGC79 is a device to control Admission Gate AG79. Admission Gate Controller AGC79 sends the admission gate signal which is a command to open the gate of Admission Gate AG79. The admission gate signal is sent when Admission Gate Controller AGC79 receives an admission signal sent from Movie eTicket Authenticating Device MAD79. Here, the admission signal is a signal which indicates that a movie eticket is authenticated of which the process therefor is explained hereinafter.

Paragraph [0042]—This Paragraph [0042] illustrate(s) the storage areas included in Movie eTicket Authenticating Device MAD79a (Paragraph [0041]). In the present embodiment, Movie eTicket Authenticating Device MAD79a includes Authenticated Movie eTicket Data Storage Area MAD79b and Authenticated Movie eTicket Software Storage Area MAD79c. Authenticated Movie eTicket Data Storage Area MAD79b stores the data necessary to implement the present function, such as the ones described in Paragraph [0043] and Paragraph [0045]. Authenticated Movie eTicket Software Storage Area MAD79c stores the software programs necessary to implement the present function, such as the ones described in Paragraph [0046].

Paragraph [0043]—This Paragraph [0043] illustrate(s) the storage areas included in Authenticated Movie eTicket Data Storage Area MAD79b (Paragraph [0042]). In the present embodiment, Authenticated Movie eTicket Data Storage Area MAD79b includes Purchase Data Storage Area MAD79b1, User Data Storage Area MAD79b2, and Work Area MAD79b3. Purchase Data Storage Area MAD79b1 stores the data described in Paragraph [0045]. User Data Storage Area MAD79b2 stores the data described in Paragraph [0044]. Work Area MAD79b3 is utilized as a work area to perform calculation and temporarily store data.

Paragraph [0044]—This Paragraph [0044] illustrate(s) the data stored in User Data Storage Area MAD79b2 (Paragraph [0043]). In the present embodiment, User Data Storage Area MAD79b2 comprises two columns, i.e., 'User ID' and 'User Data'. Column 'User ID' stores the user IDs, and each user ID is an identification of the corresponding user data stored in column 'User Data'. Column 'User Data' stores the user data, and each user data includes name, home address, phone number, email address, and credit card information. Here, the name represents the name of the corresponding user of Communication Device 200, the home address represents the home address of the corresponding user, the phone number represents the phone number of the corresponding user, the email address represents the email address of the corresponding user, and the credit card information represents the credit card information of the corresponding user. In the present embodiment, User Data Storage Area MAD79b2 stores the following data: the user ID 'User#1' and the corresponding user data 'User Data#1 (Name#1, Home Address#1, Phone Number#1, Email Address#1, Credit Card Information#1)'; the user ID 'User#2' and the corresponding user data 'User Data#2 (Name#2, Home Address#2, Phone Number#2, Email Address#2, Credit Card Information#2)'; the user ID 'User#3' and the corresponding user data 'User Data#3 (Name#3, Home Address#3, Phone Number#3, Email Address#3, Credit Card Information#3)'; and the user ID 'User#4' and the corresponding user data 'User Data#4 (Name#4, Home Address#4, Phone Number#4, Email Address#4, Credit Card Information#4)'.

Paragraph [0045]—This Paragraph [0045] illustrate(s) the data stored in Purchase Data Storage Area MAD79b1 (Paragraph [0043]). In the present embodiment, Purchase Data Storage Area MAD79b1 comprises two columns, i.e., 'User ID' and 'Purchase Data'. Column 'User ID' stores the user 113s described in Paragraph [0044]. Column 'Purchase Data' stores the purchase data, and each purchase data is composed of alphanumeric data which do not represent or indicate the user data. A unique alphanumeric data may be assigned to each purchase data so that each purchase data is distinguished from the other purchase data. In the present embodiment, Purchase Data Storage Area MAD79b1 stores the following data: the user ID 'User#1' and the corresponding purchase data 'Purchase Data#1'; the user ID 'User#2' and the corresponding purchase data 'Purchase Data#2'; the user ID 'User#3' and the corresponding purchase data 'Purchase Data#3'; and the user ID 'User#4' and the corresponding purchase data 'Purchase Data#4'. As another embodiment, a common alphanumeric data may be assigned to all purchase data (i.e., Purchase Data#1, Purchase Data#2, Purchase Data#3, and Purchase Data#4 are composed of the same alphanumeric data).

Paragraph [0046]—This Paragraph [0046] illustrate(s) the software programs stored in Authenticated Movie eTicket Software Storage Area MAD79c (Paragraph [0042]). In the present embodiment, Authenticated Movie eTicket Software Storage Area MAD79c stores Purchase Data Updating Software MAD79c3, Purchase Data Authenticating Software MAD79c4, and purchase data Deleting Software MAD79c5. Purchase Data Updating Software MAD79c3 is the software program described in Paragraph [0047]. Purchase Data Authenticating Software MAD79c4 is the software program described in Paragraph [0048]. Purchase Data Deleting Software MAD79c5 is the software program described in Paragraph [0049].

Paragraph [0047]—This Paragraph [0047] illustrate(s) Purchase Data Updating Software H79c3 (Paragraph [0030]) of Host H (Paragraph [0022]) and purchase data Updating Software MAD79c3 (Paragraph [0046]) of Movie eTicket Authenticating Device MAD79 (Paragraph [0041]), which update the purchase data stored in Movie eTicket Authenticating Device MAD79 (Paragraph [0041]). In the present embodiment, Host H retrieves all user IDs and purchase data from Purchase Data Storage Area H79b3 (Paragraph [0029]) and sends the data to Movie eTicket Authenticating Device MAD79 (Paragraph [0041]) (S1). Movie eTicket Authenticating Device MAD79 receives the user IDs and the purchase data from Host H and stores the data in Purchase Data Storage Area MAD79b1 (Paragraph [0045]) (S2).

Paragraph [0048]—This Paragraph [0048] illustrate(s) Purchase Data Authenticating Software MAD79c4 (Paragraph [0046]) of Movie eTicket Authenticating Device MAD79 (Paragraph [0041]) and purchase data Authenticating Software 20679c4 (Paragraph [0038]) of Communication Device 200, which authenticate the purchase data sent from Communication Device 200. In the present embodiment, CPU 211 (FIG. 1) of Communication Device 200 retrieves the purchase data (e.g., Purchase Data#4) from Purchase Data Storage Area 20679b3 (Paragraph [0037]) and sends in a wireless fashion the data to Movie eTicket Authenticating Device MAD79 (Paragraph [0041]) (S1). Movie eTicket Authenticating Device MAD79 (Paragraph [0041]) receives the purchase data (e.g., Purchase Data#4) from Communication Device 200 and stores the data in Work Area MAD79b3 (Paragraph [0043]) (S2). Movie eTicket Authenticating Device MAD79 performs the authentication process, i.e., scans Purchase Data Storage Area MAD79b1 (Paragraph [0045]) (S3). If the purchase data (e.g., Purchase Data#4) is authenticated, Movie eTicket Authenticating Device MAD79 sends an admission signal to Admission Gate Controller AGC79 (Paragraph [0041]) to open Admission Gate AG79 (Paragraph [0041]) (S4). Movie eTicket Authenticating Device MAD79 (Paragraph [0041]) sends in a wireless fashion a purchase data granted signal, which is received by Communication Device 200 (S5). Here, the purchase data granted signal is the signal which indicates that the purchase data (e.g., Purchase Data#4) is authenticated and thereby the user of Communication Device 200 is allowed to go through Admission Gate AG79 (Paragraph [0041]). CPU 211 (FIG. 1) of Communication Device 200 stores the purchase data granted signal in Work Area 20679b4 (Paragraph [0034]) (S6), and displays the purchase data granted notification data on LCD 201 (FIG. 1) (S7). Here, the purchase data granted notification data is an image data designed to be displayed on LCD 201 (FIG. 1) which indicates that the purchase data (e.g., Purchase Data#4) is authenticated and thereby the user of Communication Device 200 is allowed to go through Admission Gate AG79 (Paragraph [0041]). If the movie theater has no Admission Gate AG79 (Paragraph [0041]) or Admission Gate AG79 (Paragraph [0041]) is not functioning, the attendant of the movie theater may visually confirm the purchase data granted notification displayed on LCD 201 (FIG. 1), and thereby allow the user of Communication Device 200 to enter the movie theater.

Paragraph [0049]—This Paragraph [0049] illustrate(s) Purchase Data Deleting Software H79c5 (Paragraph [0030]) of Host H (Paragraph [0022]) and purchase data Deleting Software MAD79c5 (Paragraph [0046]) of Movie eTicket Authenticating Device MAD79 (Paragraph [0041]), which delete the purchase data stored in Movie eTicket Authenticating Device MAD79 (Paragraph [0041]). In the present embodiment, Movie eTicket Authenticating Device MAD79 (Paragraph [0041]) sends a purchase data expiration signal, which is received by Host H (S1). Here, the purchase data expiration signal is the signal which indicates that the user of Communication Device 200 has gone through Admission Gate AG79 (Paragraph [0041]) and, thereby, the purchase data (e.g., Purchase Data#4) is no longer valid. In response to the purchase data expiration signal, Host H deletes the purchase data (e.g., Purchase Data#4) and the corresponding user ID (e.g., User#4) stored in Purchase Data Storage Area H79b3 (Paragraph [0029]) (S2). Host H also deletes the user ID (e.g., User#4) and the corresponding user data (e.g., User Data#4) stored in User Data Storage Area H79b2 (Paragraph [0028]) (S3).

Paragraph [0050]—<<Movie eTicket Function—Another Embodiment01>>

Paragraph [0051]—Paragraph [0052] through Paragraph [0058] illustrate(s) another embodiment of the present function wherein the user data, instead of the purchase data, is utilized for performing the admission process.

Paragraph [0052]—This Paragraph [0052] illustrate(s) the software programs stored in Movie eTicket Software Storage Area H79c (Paragraph [0025]). In the present embodiment, Movie eTicket Software Storage Area H79c stores User Data Updating Software H79c3a and User Data Deleting Software H79c5a. User Data Updating Software H79c3a is the software program described in Paragraph [0056]. User Data Deleting Software H79c5a is the software program described in Paragraph [0058].

Paragraph [0053]—This Paragraph [0053] illustrate(s) the software programs stored in Movie eTicket Software Storage Area 20679c (Paragraph [0033]). In the present embodiment, Movie eTicket Software Storage Area 20679c stores User Data Authenticating Software 20679c4a. User Data Authenticating Software 20679c4a is the software program described in Paragraph [0057].

Paragraph [0054]—This Paragraph [0054] illustrate(s) the data stored in User Data Storage Area MAD79b2 (Paragraph [0043]). In the present embodiment, User Data Storage Area MAD79b2 comprises two columns, i.e., 'User ID' and 'User Data'. Column 'User ID' stores the user IDs, and each user ID is an identification of the user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area MAD79b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

Paragraph [0055]—This Paragraph [0055] illustrate(s) the software programs stored in Authenticated Movie eTicket Software Storage Area MAD79c (Paragraph [0042]). In the present embodiment, Authenticated Movie eTicket Software Storage Area MAD79c stores User Data Updating Software MAD79c3a, User Data Authenticating Software MAD79c4a, and User Data Deleting Software MAD79c5a. User Data Updating Software MAD79c3a is the software program described in Paragraph [0056]. User Data Authenticating Software MAD79c4a is the software program described in Paragraph [0057]. User Data Deleting Software MAD79c5a is the software program described in Paragraph [0058].

Paragraph [0056]—This Paragraph [0056] illustrate(s) User Data Updating Software H79c3a (Paragraph [0030]) of Host H (Paragraph [0022]) and user data Updating Software MAD79c3a (Paragraph [0046]) of Movie eTicket Authenticating Device MAD79 (Paragraph [0041]), which update the user data stored in Movie eTicket Authenticating Device MAD79 (Paragraph [0041]). In the present embodiment, Host H retrieves all user IDs and user data from User Data Storage Area H79b2 (Paragraph [0028]) and sends the data to Movie eTicket Authenticating Device MAD79 (Paragraph [0041]) (S1). Movie eTicket Authenticating Device MAD79 (Paragraph [0041]) receives the user IDs and the user data from Host H and stores the data in User Data Storage Area MAD79b2 (Paragraph [0054]) (S2).

Paragraph [0057]—This Paragraph [0057] illustrate(s) User Data Authenticating Software MAD79c4a (Paragraph [0046]) of Movie eTicket Authenticating Device MAD79 (Paragraph [0041]) and User Data Authenticating Software 20679c4a (Paragraph [0038]) of Communication Device 200, which authenticate the user data sent from Communication Device 200. In the present embodiment, CPU 211 (FIG. 1) of Communication Device 200 retrieves its user data (e.g., User Data#4) from User Data Storage Area 20679b2 (Paragraph [0036]) and sends in a wireless fashion the data to Movie eTicket Authenticating Device MAD79 (Paragraph [0041]) (S1). Movie eTicket Authenticating Device MAD79 (Paragraph [0041]) receives the user data (e.g., User Data#4) from Communication Device 200 and stores the data in Work Area MAD79b3 (Paragraph [0043]) (S2). Movie eTicket Authenticating Device MAD79 (Paragraph [0041]) performs the authentication process, i.e., scans User Data Storage Area MAD79b2 (Paragraph [0054]) (S3). If the user data is authenticated, Movie eTicket Authenticating Device MAD79 (Paragraph [0041]) sends an admission signal to Admission Gate Controller AGC79 (Paragraph [0041]) to open Admission Gate AG79 (Paragraph [0041]) (MAD79) (S4). Movie eTicket Authenticating Device MAD79 (Paragraph [0041]) sends in a wireless fashion a user data granted signal, which is received by Communication Device 200 (S5). Here, the user data granted signal is the signal which indicates that the user data (e.g., User Data#4) is authenticated and thereby the user of Communication Device 200 is allowed to go through Admission Gate AG79 (Paragraph [0041]). CPU 211 of Communication Device 200 stores the user data granted signal in Work Area 20679b4 (Paragraph [0034]) (S6), and displays the user data granted notification data on LCD 201 (FIG. 1) (S7). Here, the user data granted notification data is an image data designed to be displayed on LCD 201 (FIG. 1) which indicates that the user data (e.g., User Data#4) is authenticated and thereby the user of Communication Device 200 is allowed to go through Admission Gate AG79 (Paragraph [0041]). If the movie theater has no Admission Gate AG79 (Paragraph [0041]) or Admission Gate AG79 (Paragraph [0041]) is not functioning, the attendant of the movie theater may visually confirm the user data granted notification displayed on LCD 201 (FIG. 1), and thereby allow the user of Communication Device 200 to enter the movie theater.

Paragraph [0058]—This Paragraph [0058] illustrate(s) User Data Deleting Software H79c5a (Paragraph [0030]) of Host H (Paragraph [0022]) and User Data Deleting Software MAD79c5a (Paragraph [0046]) of Movie eTicket Authenticating Device MAD79 (Paragraph [0041]), which delete the user data stored in Movie eTicket Authenticating Device MAD79 (Paragraph [0041]). In the present embodiment, Movie eTicket Authenticating Device MAD79 (Paragraph [0041]) sends the user data expiration signal, which is received by Host H (S1). Here, the user data expiration signal is the signal which indicates that the user of Communication Device 200 has gone through Admission Gate AG79 (Paragraph [0041]) and, thereby, the user data (e.g., User Data#4) is no longer valid. In response to the user data expiration signal, Host H deletes the user ID (e.g., User#4) and the user data (e.g., User Data#4) stored in User Data Storage Area H79b2 (Paragraph [0028]) (S2).

Paragraph [0059]—<<Movie eTicket Function—Another Embodiment02>>

Paragraph [0060]—Paragraph [0061] through Paragraph [0070] illustrate(s) another embodiment of the present function wherein the user data, as well as the purchase data, is utilized for performing the admission process.

Paragraph [0061]—This Paragraph [0061] illustrate(s) the software programs stored in Movie eTicket Software Storage Area H79c (Paragraph [0025]). In the present embodiment, Movie eTicket Software Storage Area H79c stores Movie Data Selecting Software H79c1, Purchase Data Producing Software H79c2, Purchase Data/User Data Updating Software H79c3b, and Purchase Data/User Data Deleting Software H79c5b. Movie Data Selecting Software H79c1 is the software program described in Paragraph [0066]. Purchase Data Producing Software H79c2 is the software program described in Paragraph [0067]. Purchase Data/User Data Updating Software H79c3b is the software program described in Paragraph [0068]. Purchase Data/User Data Deleting Software H79c5b is the software program described in Paragraph [0069].

Paragraph [0062]—This Paragraph [0062] illustrate(s) the software programs stored in Movie eTicket Software Storage Area 20679c (Paragraph [0033]). In the present embodiment, Movie eTicket Software Storage Area 20679c stores Movie Data Selecting Software 20679c1, Purchase Data Producing Software 20679c2, and Purchase Data/User Data Authenticating Software 20679c4b. Movie Data Selecting Software 20679c1 is the software program described in Paragraph [0066]. Purchase Data Producing Software 20679c2 is the software program described in Paragraph [0067]. Purchase Data/User Data Authenticating Software 20679c4b is the software program described in Paragraph [0069].

Paragraph [0063]—This Paragraph [0063] illustrate(s) the data stored in User Data Storage Area MAD79b2 (Paragraph [0043]). In the present embodiment, User Data Storage Area MAD79b2 comprises two columns, i.e., 'User ID' and 'User Data'. Column 'User ID' stores the user IDs, and each user ID is an identification of the user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area MAD79b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

Paragraph [0064]—This Paragraph [0064] illustrate(s) the data stored in Purchase Data Storage Area MAD79b1 (Paragraph [0043]). In the present embodiment, Purchase Data Storage Area MAD79b1 comprises two columns, i.e., 'User ID' and 'Purchase Data'. Column 'User ID' stores the user IDs described in Paragraph [0063]. Column 'Purchase Data' stores the purchase data, and each purchase data is composed of alphanumeric data which do not represent or indicate the user data. A unique alphanumeric data may be assigned to each purchase data so that each purchase data is distinguished from the other purchase data. In the present embodiment, Purchase Data Storage Area MAD79b1 stores the following data: the user ID 'User#1' and the corresponding purchase data 'Purchase Data#1'; the user ID 'User#2' and the corresponding purchase data 'Purchase Data#2'; the user ID 'User#3' and the corresponding purchase data 'Purchase Data#3'; and the user ID 'User#4' and the corresponding purchase data 'Purchase Data#4'. As another embodiment, a common alphanumeric data may be assigned to all purchase data (i.e., Purchase Data#1, Purchase Data#2, Purchase Data#3, and Purchase Data#4 are composed of the same alphanumeric data).

Paragraph [0065]—This Paragraph [0065] illustrate(s) the software programs stored in Authenticated Movie eTicket Software Storage Area MAD79c (Paragraph [0042]). In the present embodiment, Authenticated Movie eTicket Software Storage Area MAD79c stores Purchase Data/User Data Updating Software MAD79c3b, Purchase Data/User Data Authenticating Software MAD79c4b, and Purchase Data/User Data Deleting Software MAD79c5b. Purchase Data/User Data Updating Software MAD79c3b is the software program described in Paragraph [0068]. Purchase Data/User Data Authenticating Software MAD79c4b is the software program described in Paragraph [0069]. Purchase Data/User Data Deleting Software MAD79c5b is the software program described in Paragraph [0070].

Paragraph [0066]—This Paragraph [0066] illustrate(s) Movie Data Selecting Software H79c1 (Paragraph [0030]) of Host H (Paragraph [0022]) and Movie Data Selecting Software 20679c1 (Paragraph [0038]) of Communication Device 200, which select the movie for which the movie eticket is to be purchased. In the present embodiment, Host H retrieves all movie IDs and movie data from Movie Data Storage Area H79b1 (Paragraph [0027]), and sends these data to Communication Device 200 in a wireless fashion (S1). Upon receiving the movie IDs and the movie data from Host H, CPU 211 (FIG. 1) of Communication Device 200 stores these data in Movie Data Storage Area 20679b1 (Paragraph [0035]) (S2). CPU 211 retrieves the movie data from Movie Data Storage Area 20679b1 (Paragraph [0035]) and displays a movie list on LCD 201 (FIG. 1) (S3). The user of Communication Device 200 selects a movie data (e.g., Movie Data#1) by utilizing Input Device 210 (FIG. 1) or via voice recognition system (S4).

Paragraph [0067]—This Paragraph [0067] illustrate(s) Purchase Data Producing Software H79c2 (Paragraph [0030]) of Host H (Paragraph [0022]) and Purchase Data Producing Software 20679c2 (Paragraph [0038]) of Communication Device 200, which produce a purchase data. In the present embodiment, CPU 211 (FIG. 1) of Communication Device 200 retrieves its user data (e.g., User Data#4) from User Data Storage Area 20679b2 (Paragraph [0036]) (S1), and sends in a wireless fashion the corresponding movie ID (e.g., Movie#1) of the movie data selected in S4 (e.g., Movie Data#1) and the user data (e.g., User Data#4), which are received by Host H (S2). Host H retrieves the credit card information (e.g., Credit Card Information#4) from the user data (e.g., User Data#4), and initiates the credit card authentication process which is a process to authenticate the credit card information (e.g., Credit Card Information#4) (S3). If the credit card information is authenticated, Host H produces a new user ID (e.g., User#4) and stores the user data (e.g., User Data#4) at the user ID (e.g., User#4) in User Data Storage Area H79b2 (Paragraph [0028]) (S4). Host H produces a purchase data (e.g., Purchase Data#4) and stores the data at the user ID (e.g., User#4) in Purchase Data Storage Area H79b3 (Paragraph [0029]) (S5). Host H sends the purchase data (e.g., Purchase Data#4) in a wireless fashion, and Communication Device 200 receives the data (S6). CPU 211 of Communication Device 200 stores the purchase data (e.g., Purchase Data#4) in Purchase Data Storage Area 20679b3 (Paragraph [0037]) (S7).

Paragraph [0068]—This Paragraph [0068] illustrate(s) Purchase Data/User Data Updating Software H79c3b (Paragraph [0030]) of Host H (Paragraph [0022]) and Purchase Data/User Data Updating Software MAD79c3b (Paragraph [0046]) of Movie eTicket Authenticating Device MAD79 (Paragraph [0041]), which update the purchase data and the user data stored in Movie eTicket Authenticating Device MAD79 (Paragraph [0041]). In the present embodiment, Host H retrieves all user IDs and purchase data from Purchase Data Storage Area H79b3 (Paragraph [0029]) (S1). Host H retrieves all user IDs and user data from User Data Storage Area H79b2 (Paragraph [0028]) (S2). Host H sends the data retrieved in S1 and S2, and Movie eTicket Authenticating Device MAD79 (Paragraph [0041]) receives the data (S3). Movie eTicket Authenticating Device MAD79 (Paragraph [0041]) stores the user IDs and the purchase data in Purchase Data Storage Area MAD79b1 (Paragraph [0064]) (S4). Movie eTicket Authenticating Device MAD79 (Paragraph [0041]) stores the user IDs and the user data in User Data Storage Area MAD79b2 (Paragraph [0063]) (S5).

Paragraph [0069]—This Paragraph [0069] illustrate(s) Purchase Data/User Data Authenticating Software MAD79c4b (Paragraph [0046]) of Movie eTicket Authenticating Device MAD79 (Paragraph [0041]) and Purchase Data/User Data Authenticating Software 20679c4b (Paragraph [0038]) of Communication Device 200, which authenticate the purchase data and the user data stored in Movie eTicket Authenticating Device MAD79 (Paragraph [0041]). In the present embodiment, CPU 211 (FIG. 1) of Communication Device 200 retrieves the purchase data (e.g., Purchase Data#4) from Purchase Data Storage Area 20679b3 (Paragraph [0037]) (S1). CPU 211 retrieves the user data (e.g., User Data#4) from User Data Storage Area 20679b2 (Paragraph [0036]) (S2). CPU 211 retrieves the movie data from Movie Data Storage Area 20679b1 (Paragraph [0035]) (S3). CPU 211 sends in a wireless fashion the data retrieved in S1, S2 and S3, and Movie eTicket Authenticating Device MAD79 (Paragraph [0041]) receives the data (S4). Movie eTicket Authenticating Device MAD79 (Paragraph [0041]) stores the purchase data (e.g., Purchase Data#4), the user data (e.g., User Data#4), and the movie data (e.g., Movie Data#1) in Work Area MAD79b3 (Paragraph [0043]) (S5). Movie eTicket Authenticating Device MAD79 (Paragraph [0041]) performs the authentication process, i.e., scans Purchase Data Storage Area MAD79b1 (Paragraph [0064]) (S6), and also scans User Data Storage Area MAD79b2 (Paragraph [0063]) (S7). Movie eTicket Authenticating Device MAD79 (Paragraph [0041]) sends the admission signal to Admission Gate Controller AGC79 (Paragraph [0041]) to open Admission Gate AG79 (Paragraph [0041]) (S8). Movie eTicket Authenticating Device MAD79 (Paragraph [0041]) sends in a wireless fashion the purchase data granted signal, which is received by Communication Device 200 (S9). Here, the purchase data granted signal is the signal which indicates that the purchase data (e.g., Purchase Data#4) is authenticated and thereby the user of Communication Device 200 is allowed to go through Admission Gate AG79 (Paragraph [0041]). CPU 211 (FIG. 1) of Communication Device 200 stores the purchase data granted signal in Work Area 20679b4 (Paragraph [0034]) (S10). Movie eTicket Authenticating Device MAD79 (Paragraph [0041]) sends in a wireless fashion the user data granted signal, which is received by Communication Device 200 (S11). Here, the user data granted signal is the signal which indicates that the user data (e.g., User Data#4) is authenticated and thereby the user of Communication Device 200 is allowed to go through Admission Gate AG79 (Paragraph [0041]). CPU 211 stores the user data granted signal in Work Area 20679b4 (Paragraph [0034]) (S12). CPU 211 displays the Movie eTicket granted notification data on LCD 201 (FIG. 1) (S13). Here, the movie eticket granted notification data is an image data designed to be displayed on LCD 201 (FIG. 1) which indicates that the user of Communication Device 200 is allowed to go through Admission Gate AG79 (Paragraph [0041]). If the movie theater has no Admission Gate AG79 (Paragraph [0041]) or Admission Gate AG79 (Paragraph [0041]) is not functioning, the attendant of the movie theater may visually confirm the purchase data granted notification displayed on LCD 201 (FIG. 1), and thereby allow the user of Communication Device 200 to enter the movie theater. The movie eticket granted notification data may include the user data of the user of Communication Device 200 and the movie data described hereinbefore.

Paragraph [0070]—This Paragraph [0070] illustrate(s) Purchase Data/User Data Deleting Software H79c5b (Paragraph [0030]) of Host H (Paragraph [0022]) and Purchase Data/User Data Deleting Software MAD79c5b (Paragraph [0046]) of Movie eTicket Authenticating Device MAD79 (Paragraph [0041]), which delete the purchase data and the user data stored in Movie eTicket Authenticating Device MAD79 (Paragraph [0041]). In the present embodiment, Movie eTicket Authenticating Device MAD79 (Paragraph [0041]) sends the Purchase Data/User Data expiration signal, which is received by Host H (S1). Here, the purchase data/user data expiration signal is the signal which indicates that the user of Communication Device 200 has gone through Admission Gate AG79 (Paragraph [0041]) and, thereby, the purchase data (e.g., Purchase Data#4) and the user data (e.g., User Data#4) are no longer valid. Host H deletes the purchase data (e.g., Purchase Data#4) and the user ID (e.g., User#4) stored in Purchase Data Storage Area H79b3 (Paragraph [0029]) (S2). Host H deletes the user ID (e.g., User#4) and the user data (e.g., User Data#4) stored in User Data Storage Area H79b2 (Paragraph [0028]) (S3).

Paragraph [0071]—The term 'movie eticket' utilized in this specification means the purchase data granted signal (Paragraph [0048]), the purchase data granted notification data (Paragraph [0048]), the user data granted signal (Paragraph [0057]), the user data granted notification data (Paragraph [0057]), and/or any data which represents that the user of Communication Device 200 has duly purchased the movie ticket and/or has the right to enter the movie theater to watch the certain movie (e.g., Movie#1).

Paragraph [0072]—<<Carrier Prepaid eCard Function>>

Paragraph [0073]—Paragraph [0074] through Paragraph [0104] illustrate(s) the carrier prepaid ecard function which enables to purchase prepaid ecards via Communication Device 200 and board carrier by utilizing Communication Device 200 without utilizing paper tickets. Here, the carrier prepaid ecard is a prepaid card stored in Communication Device 200 in an electronic form (i.e., ecard). A certain amount of credit (e.g., the credit equivalent to $40) is stored in the carrier prepaid ecard, and carrier fare is charged thereto every time the user of Communication Device 200 boards a carrier. The term 'carrier' includes any carrier or transportation system capable of carrying passengers, such as railway train, bus, taxi, airplane, etc.

Paragraph [0074]—This Paragraph [0074] illustrate(s) the storage area included in Host H (Paragraph [0022]). In the present embodiment, Host H includes Carrier Prepaid eCard Information Storage Area H80a of which the data and the software programs stored therein are described in Paragraph [0075].

Paragraph [0075]—This Paragraph [0075] illustrate(s) the storage areas included in Carrier Prepaid eCard Information Storage Area H80a (Paragraph [0074]). In the present embodiment, Carrier Prepaid eCard Information Storage Area H80a includes Carrier Prepaid eCard Data Storage Area H80b and Carrier Prepaid eCard Software Storage Area H80c. Carrier Prepaid eCard Data Storage Area H80b stores the data necessary to implement the present function on the side of Host H (Paragraph [0022]), such as the ones described in Paragraph through Paragraph [0080]. Carrier Prepaid eCard Software Storage Area H80c stores the software programs necessary to implement the present function on the side of Host H, such as the ones described in Paragraph [0081].

Paragraph [0076]—This Paragraph [0076] illustrate(s) the storage areas included in Carrier Prepaid eCard Data Storage Area H80b (Paragraph [0075]). In the present embodiment, Carrier Prepaid eCard Data Storage Area H80b includes Prepaid eCard Type Data Storage Area H80b1, User Data Storage Area H80b2, Purchased eCard Type Data Storage Area H80b3, Balance Data Storage Area H80b4, and Work Area H80b5. Prepaid eCard Type Data Storage Area H80b1 stores the data described in Paragraph [0077]. User Data Storage Area H80b2 stores the data described in Paragraph [0078]. Purchased eCard Type Data Storage Area H80b3 stores the data described in Paragraph [0079]. Balance Data Storage Area H80b4 stores the data described in Paragraph [0080]. Work Area H80b5 is utilized as a work area to perform calculation and temporarily store data.

Paragraph [0077]—This Paragraph [0077] illustrate(s) the data stored in Prepaid eCard. Type Data Storage Area H80b1 (Paragraph [0076]). In the present embodiment, Prepaid eCard Type Data Storage Area H80b1 comprises two columns, i.e., 'Prepaid eCard Type ID' and 'Prepaid eCard Type Data'. Column 'Prepaid eCard Type ID' stores the prepaid ecard type IDs, and each prepaid ecard type ID is an identification of the corresponding prepaid ecard type data stored in column 'Prepaid eCard Type Data'. Column 'Prepaid eCard Type Data' stores the prepaid ecard type data, and each prepaid ecard type data represents the type of the prepaid ecard capable to be purchased. In the present embodiment, Prepaid eCard Type Data Storage Area H80b1 stores the following data: the prepaid ecard type ID 'Prepaid eCard Type#1' and the corresponding prepaid ecard type data 'Prepaid eCard Type Data#1'; the prepaid ecard type ID 'Prepaid eCard Type#2' and the corresponding prepaid ecard type data 'Prepaid eCard Type Data#2'; the prepaid ecard type ID 'Prepaid eCard Type#3' and the corresponding prepaid ecard type data 'Prepaid eCard Type Data#3'; and the prepaid ecard type ID 'Prepaid eCard Type#4' and the corresponding prepaid ecard type data 'Prepaid eCard Type Data#4'. Here, the prepaid ecard type data 'Prepaid eCard Type Data#1' represents the credit equivalent to the amount of $10; the prepaid ecard type data 'Prepaid eCard Type Data#2' represents the credit equivalent to the amount of $20; the prepaid ecard type data 'Prepaid eCard Type Data#3' represents the credit equivalent to the amount of $30; and the prepaid ecard type data 'Prepaid eCard Type Data#4' represents the credit equivalent to the amount of $40.

Paragraph [0078]—This Paragraph [0078] illustrate(s) the data stored in User Data Storage Area H80b2 (Paragraph [0076]). In the present embodiment, User Data Storage Area H80b2 comprises two columns, i.e., 'User ID' and 'User Data'. Column 'User ID' stores the user IDs, and each user ID is an identification of the corresponding user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area H80b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

Paragraph [0079]—This Paragraph [0079] illustrate(s) the data stored in Purchased eCard Type Data Storage Area H80b3 (Paragraph [0076]). In the present embodiment, Purchased eCard Type Data Storage Area H80b3 comprises two columns, i.e., 'User ID' and 'Purchased eCard Type Data'. Column 'User ID' stores the user IDs described hereinbefore. Column 'Purchased eCard Type Data' stores the purchased ecard type data, and each purchased ecard type data represents the type of the carrier (e.g., train) prepaid ecard purchased by the user of the corresponding user ID. In the present embodiment, Purchased eCard Type Data Storage Area H80b3 stores the following data: the user ID 'User#1' and the corresponding purchased ecard type data 'Prepaid eCard Type Data#2'; the user ID 'User#2' and the corresponding purchased ecard type data 'Prepaid eCard Type Data#2'; the user ID 'User#3' and the corresponding purchased ecard type data 'Prepaid eCard Type Data#4'; and the user ID 'User#4' and the corresponding purchased ecard type data 'Prepaid eCard Type Data#4'. The foregoing data represents that the user whose user ID is 'User#1' has purchased the carrier prepaid ecard of the credit equivalent to the amount of $20; the user whose user ID is 'User#2' has purchased the carrier prepaid ecard of the credit equivalent to the amount of $20; the user whose user ID is 'User#3' has purchased the carrier prepaid ecard of the credit equivalent to the amount of $40; and the user whose user ID is 'User#4' has purchased the carrier prepaid ecard of the credit equivalent to the amount of $40.

Paragraph [0080]—This Paragraph [0080] illustrate(s) the data stored in Balance Data Storage Area H80b4 (Paragraph [0076]). In the present embodiment, Balance Data Storage Area H80b4 comprises two columns, i.e., 'User ID' and 'Balance Data'. Column 'User ID' stores the user IDs described hereinbefore. Column 'Balance Data' stores the balance data, and each balance data represents the outstanding balance or the remaining credit of the carrier prepaid ecard. In the present embodiment, Balance Data Storage Area H80b4 stores the following data: the user ID 'User#1' and the corresponding balance data 'Balance Data#1'; the user ID 'User#2' and the corresponding balance data 'Balance Data#2'; the user ID 'User#3' and the corresponding balance data 'Balance Data#3'; and the user ID 'User#4' and the corresponding balance data 'Balance Data#4'. Here, the balance data 'Balance Data#1' represents the credit equivalent to the amount of $20; the balance data 'Balance Data#2' represents the credit equivalent to the amount of $20; the balance data 'Balance Data#3' represents the credit equivalent to the amount of $40; and the balance data 'Balance Data#4' represents the credit equivalent to the amount of $35. The foregoing balance data indicates that the users whose user IDs are User#1 through #3 have not yet used the carrier prepaid ecard yet, whereas the user whose user ID is User#4 has used the carrier prepaid ecard for $5.

Paragraph [0081]—This Paragraph [0081] illustrate(s) the software programs stored in Carrier Prepaid eCard Software Storage Area H80c (Paragraph [0075]). In the present embodiment, Carrier Prepaid eCard Software Storage Area H80c stores Carrier Prepaid eCard Selecting Software H80c1, Charging Device Updating Software H80c2, eCard Authenticating Software H80c3, Balance Data Updating Software H80c5, and eCard Charged Notifying Software H80c6. Carrier Prepaid eCard Selecting Software H80c1 is the software program described in Paragraph [0091]. Charging Device Updating Software H80c2 is the software program described in Paragraph [0099]. eCard Authenticating Software H80c3 is the software program described in Paragraph [0101]. Balance Data Updating Software H80c5 is the software program described in Paragraph [0103]. eCard Charged Notifying Software H80c6 is the software program described in Paragraph [0104].

Paragraph [0082]—This Paragraph [0082] illustrate(s) the storage area included in RAM 206 (FIG. 1) of Communication Device 200 (e.g., Device A). In the present embodiment, RAM 206 includes Carrier Prepaid eCard Information Storage Area 20680a of which the data and the software programs stored therein are described in Paragraph [0083].

Paragraph [0083]—This Paragraph [0083] illustrate(s) the storage areas included in Carrier Prepaid eCard Information Storage Area 20680a (Paragraph [0082]). In the present embodiment, Carrier Prepaid eCard Information Storage Area 20680a includes Carrier Prepaid eCard Data Storage Area 20680b and Carrier Prepaid eCard Software Storage Area 20680c. Carrier Prepaid eCard Data Storage Area 20680b stores the data necessary to implement the present function on the side of Communication Device 200, such as the ones described in Paragraph [0085] through Paragraph [0089]. Carrier Prepaid eCard Software Storage Area 20680c stores the software programs necessary to implement the present function on the side of Communication Device 200, such as the ones described in Paragraph [0090].

Paragraph [0084]—The data and/or the software programs stored in Carrier Prepaid eCard Information Storage Area 20680a (Paragraph [0082]) may be downloaded from Host H (Paragraph [0022]) in the manner described in Paragraph [0416] through Paragraph [0422]. Paragraph [0085]—This Paragraph [0085] illustrate(s) the storage areas included in Carrier Prepaid eCard Data Storage Area 20680b (Paragraph [0083]). In the present embodiment, Carrier Prepaid eCard Data Storage Area 20680b includes Prepaid eCard Type Data Storage Area 20680b1, User Data Storage Area 20680b2, Purchased eCard Type Data Storage Area 20680b3, Balance Data Storage Area 20680b4, and Work Area 20680b5. Prepaid eCard Type Data Storage Area 20680b1 stores the data described in Paragraph [0086]. User Data Storage Area 20680b2 stores the data described in Paragraph [0087]. Purchased eCard Type Data Storage Area 20680b3 stores the data described in Paragraph [0088]. Balance Data Storage Area 20680b4 stores the data described in Paragraph [0089]. Work Area 20680b5 is utilized as a work area to perform calculation and temporarily store data.

Paragraph [0086]—This Paragraph [0086] illustrate(s) the data stored in Prepaid eCard Type Data Storage Area 20680b1 (Paragraph [0085]). In the present embodiment, Prepaid eCard Type Data Storage Area 20680b1 comprises two columns, i.e., 'Prepaid eCard Type ID' and 'Prepaid eCard Type Data'. Column 'Prepaid eCard Type ID' stores the prepaid ecard type IDs, and each prepaid ecard type ID is an identification of the corresponding prepaid ecard type data stored in column 'Prepaid eCard Type Data'. Column 'Prepaid eCard Type Data' stores the prepaid ecard type data, and each prepaid ecard type data represents the type of the prepaid ecard capable to be purchased. In the present embodiment, Prepaid eCard Type Data Storage Area 20680b1 stores the following data: the prepaid ecard type ID 'Prepaid eCard Type#1' and the corresponding prepaid ecard type data 'Prepaid eCard Type Data#1'; the prepaid ecard type ID 'Prepaid eCard Type#2' and the corresponding prepaid ecard type data 'Prepaid eCard Type Data#2'; the prepaid ecard type ID 'Prepaid eCard Type#3' and the corresponding prepaid ecard type data 'Prepaid eCard Type Data#3'; and the prepaid ecard type ID 'Prepaid eCard Type#4' and the corresponding prepaid ecard type data 'Prepaid eCard Type Data#4'. Here, the prepaid ecard type data 'Prepaid eCard Type Data#1' represents the credit equivalent to the amount of $10; the prepaid ecard type data 'Prepaid eCard Type Data#2' represents the credit equivalent to the amount of $20; the prepaid ecard type data 'Prepaid eCard Type Data#3' represents the credit equivalent to the amount of $30; and the prepaid ecard type data 'Prepaid eCard Type Data#4' represents the credit equivalent to the amount of $40.

Paragraph [0087]—This Paragraph [0087] illustrate(s) the data stored in User Data Storage Area 20680b2 (Paragraph [0085]). In the present embodiment, User Data Storage Area 20680b2 comprises two columns, i.e., 'User ID' and 'User Data'. Column 'User ID' stores the user ID which is an identification of the user data stored in column 'User Data'. Column 'User Data' stores the user data which includes name, home address, phone number, email address, and credit card information. Here, the name represents the name of the user of Communication Device 200 (e.g., device A), the home address represents the home address of the user of Communication Device 200 (e.g., device A), the phone number represents the phone number of the user of Communication Device 200 (e.g., device A), the email address represents the email address of the user of Communication Device 200 (e.g., device A), and the credit card information represents the credit card information of the user of Communication Device 200 (e.g., device A). In the present embodiment, User Data Storage Area 20680b2 stores the following data: the user ID 'User#4' and the user data 'User Data#4 (Name#4, Home Address#4, Phone Number#4, Email Address#4, Credit Card Information#4)'.

Paragraph [0088]—This Paragraph [0088] illustrate(s) the data stored in Purchased eCard Type Data Storage Area 20680b3 (Paragraph [0085]). In the present embodiment, Purchased eCard Type Data Storage Area 20680b3 comprises two columns, i.e., 'User ID' and 'Purchased eCard Type Data'. Column 'User ID' stores the user ID described hereinbefore. Column 'Purchased eCard Type Data' stores the purchased ecard type data which represents the type of the carrier (e.g., train) prepaid ecard purchased by the user of the corresponding user ID. In the present embodiment, Purchased eCard Type Data Storage Area 20680b3 stores the following data: the user ID 'User#4' of the user of Communication Device 200 (e.g., Device A) and the corresponding purchased ecard type data 'Prepaid eCard Type Data#4'. The foregoing data represents that the user whose user ID is 'User#4' has purchased the carrier prepaid ecard of the credit equivalent to the amount of $40.

Paragraph [0089]—This Paragraph [0089] illustrate(s) the data stored in Balance Data Storage Area 20680b4 (Paragraph [0085]). In the present embodiment, Balance Data Storage Area 20680b4 comprises two columns, i.e., 'User ID' and 'Balance Data'. Column 'User ID' stores the user IDs described hereinbefore. Column 'Balance Data' stores the balance data which represents the outstanding balance or the remaining credit of the carrier prepaid ecard. In the present embodiment, Balance Data Storage Area 20680b4 stores the following data: the user ID 'User#4' of the user of Communication Device 200 (e.g., Device A) and the corresponding balance data 'Balance Data#4'. Here, the balance data 'Balance Data#4' represents the credit equivalent to the amount of $35. The foregoing balance data indicates that the user whose user ID is User#4 has used the carrier prepaid ecard for $5.

Paragraph [0090]—This Paragraph [0090] illustrate(s) the software programs stored in Carrier Prepaid eCard Software Storage Area 20680c (Paragraph [0083]). In the present embodiment, Carrier Prepaid eCard Software Storage Area 20680c stores Carrier Prepaid eCard Selecting Software 20680c1, eCard Authenticating Software 20680c3, eCard Charging Software 20680c4, and eCard Charged Notifying Software 20680e6. Carrier Prepaid eCard Selecting Software 20680c1 is the software program described in Paragraph [0091]. eCard Authenticating Software 20680c3 is the software program described in Paragraph [0101]. eCard Charging Software 20680c4 is the software program described in Paragraph [0102]. eCard Charged Notifying Software 20680c6 is the software program described in Paragraph [0104]. Paragraph [0091]—This Paragraph [0091] illustrate(s) Carrier Prepaid eCard Selecting Software H80c1 (Paragraph [0081]) of Host H (Paragraph [0022]) and Carrier Prepaid eCard Selecting Software 20680c1 (Paragraph [0090]) of Communication Device 200, which select and purchase the carrier prepaid ecard. In the present embodiment, Host H retrieves all prepaid ecard type IDs and prepaid ecard type data from Prepaid eCard Type Data Storage Area H80b1 (Paragraph [0077]) and sends the data to Communication Device 200 (S1). CPU 211 (FIG. 1) of Communication Device 200 receives the prepaid ecard type ID and the prepaid ecard type data from Host H and stores the data in Prepaid eCard Type Data Storage Area 20680b1 (Paragraph [0086]) (S2). CPU 211 retrieves all prepaid ecard type data from Prepaid eCard Type Data Storage Area 20680b1 (Paragraph [0086]) and displays a list of prepaid ecard type data on LCD 201 (FIG. 1) (S3). The user of Communication Device 200 (e.g., Device A) selects a prepaid ecard type data (e.g., Prepaid eCard Type Data#4) (S4). CPU 211 stores the prepaid ecard type data (e.g., Prepaid eCard Type Data#4) selected in previous step in Purchased eCard Type Data Storage Area 20680b3 (Paragraph [0088]) (S5). CPU 211 retrieves the user ID (e.g., User#4) and the user data (e.g., User Data#4) from User Data Storage Area 20680b2 (Paragraph [0087]) (S6). CPU 211 sends the prepaid ecard type ID (e.g., Prepaid eCard Type#4) of the prepaid ecard type Data (e.g., Prepaid eCard Type Data#4) stored in S5, the user ID (e.g., User#4) and the user data (e.g., User Data#4), which are received by Host H (S7). Host H stores the user ID (e.g., User#4) and the user data (e.g., User Data#4) in User Data Storage Area H80b2 (Paragraph [0078]) (S8). Host H stores the user ID (e.g., User#4) and the prepaid ecard type ID (e.g., Prepaid eCard Type#4) in Purchased eCard Type Data Storage Area H80b3 (Paragraph [0079]) (S9). Host H retrieves the credit card information (e.g., Credit Card Information#4) from User Data Storage Area H80b2 and charges thereto for the carrier prepaid ecard (e.g., $40) (S10).

Paragraph [0092]—This Paragraph [0092] illustrate(s) the function of Carrier Prepaid eCard Charging Device TPCC80, Admission Gate Controller AGC80, and Admission Gate AG80. In the present embodiment, Carrier Prepaid eCard Charging Device TPCC80 is connected to Admission Gate Controller AGC80, and Admission Gate Controller AGC80 is connected to Admission Gate AG80. Admission Gate AG80 is the gate installed near or at the boarding entrance of a carrier. Admission Gate AG80 is normally closed, and opens only when an admission gate signal is sent from Admission Gate Controller AGC80. Passengers are able to go through Admission Gate AG80 when it is open. Admission Gate Controller AGC80 is a device to control Admission Gate AG80. Admission Gate Controller AGC80 sends the admission gate signal which is a command to open the gate of Admission Gate AG80. The admission gate signal is sent when Admission Gate Controller AGC80 receives an admission signal sent from Carrier Prepaid eCard Charging Device TPCC80. Here, the admission signal is a signal which indicates that a carrier prepaid ecard is authenticated of which the process therefor is explained hereinafter. The location of Admission Gate AG80 may differ depending on the type of the carrier. For example, Admission Gate AG80 may be installed in a railway station if the carrier is a railway train. Admission Gate AG80 may be installed in the carrier if the carrier is a bus. Admission Gate AG80 may be installed in the carrier if the carrier is a taxi. Admission Gate AG80 may be installed in an airport if the carrier is an airplane.

Paragraph [0093]—This Paragraph [0093] illustrate(s) the storage areas included in Carrier Prepaid eCard Charging Information Storage Area TPCC80a (Paragraph [0092]). In the present embodiment, Carrier Prepaid eCard Charging Information Storage Area TPCC80a includes Carrier Prepaid eCard Charging Data Storage Area TPCC80b and Carrier Prepaid eCard Authenticating Software Storage Area TPCC80c. Carrier Prepaid eCard Charging Data Storage Area TPCC80b stores the data necessary to implement the present function on the side of Carrier Prepaid eCard Charging Device TPCC80 (Paragraph [0092]), such as the ones described in Paragraph [0094] through Paragraph [0097]. Carrier Prepaid eCard Authenticating Software Storage Area TPCC80c stores the software programs necessary to implement the present function on the side of Carrier Prepaid eCard Charging Device TPCC80, such as the ones described in Paragraph [0098].

Paragraph [0094]—This Paragraph [0094] illustrate(s) the storage areas included in Carrier Prepaid eCard Charging Data Storage Area TPCC80b (Paragraph [0093]). In the present embodiment, Carrier Prepaid eCard Charging Data Storage Area TPCC80b includes User Data Storage Area TPCC80b2, Purchased eCard Type Data Storage Area TPCC80b3, Balance Data Storage Area TPCC80b4, and Work Area TPCC80b5. User Data Storage Area TPCC80b2 stores the data described in Paragraph [0095]. Purchased eCard Type Data Storage Area TPCC80b3 stores the data described in Paragraph [0096]. Balance Data Storage Area TPCC80b4 stores the data described in Paragraph [0097]. Work Area TPCC80b5 is utilized as a work area to perform calculation and temporarily store data.

Paragraph [0095]—This Paragraph [0095] illustrate(s) the data stored in User Data Storage Area TPCC80b2 (Paragraph [0094]). In the present embodiment, User Data Storage Area TPCC80b2 comprises two columns, i.e., 'User ID' and User Data'. Column 'User ID' stores the user IDs, and each user ID is an identification of the corresponding user data stored in column 'User Data'. Column 'User Data' stores the user data, and each user data includes name, home address, phone number, email address, and credit card information. Here, the name represents the name of the user of Communication Device 200, the home address represents the home address of the user, the phone number represents the phone number of the user, the email address represents the email address of the user, and the credit card information represents the credit card information of the user. In the present embodiment, User Data Storage Area TPCC80b2 stores the following data: the user ID 'User#1' and the user data 'User Data#1 (Name#1, Home Address#1, Phone Number#1, Email Address#1, Credit Card Information#1)'; the user ID 'User#2' and the user data 'User Data#2 (Name#2, Home Address#2, Phone Number#2, Email Address#2, Credit Card Information#2)'; the user ID 'User#3' and the user data 'User Data#3 (Name#3, Home Address#3, Phone Number#3, Email Address#3, Credit Card Information#3)'; and the user ID 'User#4' and the user data 'User Data#4 (Name#4, Home Address#4, Phone Number#4, Email Address#4, Credit Card Information#4)'.

Paragraph [0096]—This Paragraph [0096] illustrate(s) the data stored in Purchased eCard Type Data Storage Area TPCC80b3 (Paragraph [0094]). In the present embodiment, Purchased eCard Type Data Storage Area TPCC80b3 comprises two columns, i.e., 'User ID' and 'Purchased eCard Type Data'. Column 'User ID' stores the user IDs described hereinbefore. Column 'Purchased eCard Type Data' stores the purchased ecard type data, and each purchased ecard type data represents the type of the carrier (e.g., train) prepaid ecard purchased by the user of the corresponding user ID. In the present embodiment, Purchased eCard Type Data Storage Area TPCC80b3 stores the following data: the user ID 'User#1' and the corresponding purchased ecard type data 'Prepaid eCard Type Data#2'; the user ID 'User#2' and the corresponding purchased ecard type data 'Prepaid eCard Type Data#2'; the user ID 'User#3' and the corresponding purchased ecard type data 'Prepaid eCard Type Data#4'; and the user ID 'User#4' and the corresponding purchased ecard type data 'Prepaid eCard Type Data#4'. The foregoing data represents that the user whose user ID is 'User#1' has purchased the carrier prepaid ecard of the credit equivalent to the amount of $20; the user whose user ID is 'User#2' has purchased the carrier prepaid ecard of the credit equivalent to the amount of $20; the user whose user ID is 'User#3' has purchased the carrier prepaid ecard of the credit equivalent to the amount of $40; and the user whose user ID is 'User#4' has purchased the carrier prepaid ecard of the credit equivalent to the amount of $40.

Paragraph [0097]—This Paragraph [0097] illustrate(s) the data stored in Balance Data Storage Area TPCC80b4 (Paragraph [0094]). In the present embodiment, Balance Data Storage Area TPCC80b4 comprises two columns, i.e., 'User ID' and 'Balance Data'. Column 'User ID' stores the user IDs described hereinbefore. Column 'Balance Data' stores the balance data, and each balance data represents the outstanding balance or the remaining credit of the carrier prepaid ecard. In the present embodiment, Balance Data Storage Area TPCC80b4 stores the following data: the user ID 'User#1' and the corresponding balance data 'Balance Data#1'; the user ID 'User#2' and the corresponding balance data 'Balance Data#2'; the user ID 'User#3' and the corresponding balance data 'Balance Data#3'; and the user ID 'User#4' and the corresponding balance data 'Balance Data#4'. Here, the balance data 'Balance Data#1' represents the credit equivalent to the amount of $20; the balance data 'Balance Data#2' represents the credit equivalent to the amount of $20; the balance data 'Balance Data#3' represents the credit equivalent to the amount of $40; and the balance data 'Balance Data#4' represents the credit equivalent to the amount of $35. The foregoing balance data indicates that the users whose user IDs are User#1 through #3 have not yet used the carrier prepaid ecard yet, whereas the user whose user ID is User#4 has used the carrier prepaid ecard for $5.

Paragraph [0098]—This Paragraph [0098] illustrate(s) the software programs stored in Carrier Prepaid eCard Authenticating Software Storage Area TPCC80c (Paragraph [0093]). In the present embodiment, Carrier Prepaid eCard Authenticating Software Storage Area TPCC80c stores Charging Device Updating Software TPCC80c2, eCard Authenticating Software TPCC80c3, eCard Charging Software TPCC80c4, and Balance Data Updating Software TPCC80c5. Charging Device Updating Software TPCC80c2 is the software program described in Paragraph [0099]. eCard Authenticating Software TPCC80c3 is the software program described in Paragraph [0101]. eCard Charging Software TPCC80c4 is the software program described in Paragraph [0102]. Balance Data Updating Software TPCC80c5 is the software program described in Paragraph [0103].

Paragraph [0099]—This Paragraph [0099] illustrate(s) Charging Device Updating Software H80c2 (Paragraph [0081]) of Host H (Paragraph [0022]) and Charging Device Updating Software TPCC80c2 (Paragraph [0098]) of Carrier Prepaid eCard Charging Device TPCC80 (Paragraph [0092]), which update all data stored in Carrier Prepaid eCard Charging Data Storage Area TPCC80b (Paragraph [0094]). In the present embodiment, Host H retrieves all data stored in User Data Storage Area H80b2 (Paragraph [0078]), Purchased eCard Type Data Storage Area H80b3 (Paragraph [0079]), and Balance Data Storage Area H80b4 (Paragraph [0080]) and sends the data to Carrier Prepaid eCard Charging Device TPCC80 (S1). Carrier Prepaid eCard Charging Device TPCC80 receives the data selected in S1 from Host H (S2). Carrier Prepaid eCard Charging Device TPCC80 stores the User IDs and the user data in User Data Storage Area TPCC80b2 (Paragraph [0095]) (S3). Carrier Prepaid eCard Charging Device TPCC80 stores the User IDs and the Purchased eCard Type Data in Purchased eCard Type Data Storage Area TPCC80b3 (Paragraph [0096]) (S4). Carrier Prepaid eCard Charging Device TPCC80 stores the User IDs and the balance data in Balance Data Storage Area H80b4 (Paragraph [0080]) (S5). The foregoing sequence is performed periodically, for example every morning at the predetermined time.

Paragraph [0100]—This Paragraph [0100] illustrate(s) eCard Authenticating Software TPCC80c3 (Paragraph [0098]) of Carrier Prepaid eCard Charging Device TPCC80 (Paragraph [0092]) and eCard Authenticating Software 20680c3 (Paragraph [0090]) of Communication Device 200, which authenticate Communication Device 200 before allowing the user to go through Admission Gate AG80. In the present embodiment, CPU 211 (FIG. 1) of Communication Device 200 retrieves the user data (e.g., User Data#4) from User Data Storage Area 20680b2 (Paragraph [0087]) and sends the data to Carrier Prepaid eCard Charging Device TPCC80 for authentication purposes (S1). Carrier Prepaid eCard Charging Device TPCC80 receives the user data (e.g., User Data#4) and stores the data in Work Area TPCC80b5 (Paragraph [0094]) (S2). Carrier Prepaid eCard Charging Device TPCC80 (Paragraph [0092]) performs the user data authentication process (i.e., scans User Data Storage Area TPCC80b2 (Paragraph [0095]) for matching user data) (TPCC80) (S3).

Paragraph [0101]—This Paragraph [0101] illustrate(s) eCard Authenticating Software H80c3 (Paragraph [0081]) of Host H (Paragraph [0022]) and eCard Authenticating Software TPCC80c3 (Paragraph [0098]) of Carrier Prepaid eCard Charging Device TPCC80 (Paragraph [0092]), which authenticate Communication Device 200 before allowing the user to go through Admission Gate AG80. The present embodiment illustrate(s) another embodiment of the sequence described in Paragraph [0100], wherein the user data authentication process is performed by Host H instead. In the present embodiment, CPU 211 (FIG. 1) of Communication Device 200 retrieves the user data (e.g., User Data#4) from User Data Storage Area 20680b2 (Paragraph [0087]) and sends the data to Carrier Prepaid eCard Charging Device TPCC80 for authentication purposes (S1). Carrier Prepaid eCard Charging Device TPCC80 receives the user data (e.g., User Data#4) and stores the data in Work Area TPCC80b5 (Paragraph [0094]) (S2). Carrier Prepaid eCard Charging Device TPCC80 retrieves the user data (e.g., User Data#4) from Work Area TPCC80b5 (Paragraph [0094]) and sends the data to Host H (S3). Upon receiving the user data (e.g., User Data#4), Host H performs the user data authentication process (i.e., scans User Data Storage Area H80b2 (Paragraph [0078]) for matching user data) (S4). If the matching user data (e.g., User Data#4) is found, Host H sends the user data authenticated signal, which is received by Carrier Prepaid eCard Charging Device TPCC80 (Paragraph [0092]) (S5). Here, the user data authenticated signal is a signal indicating that the user data (e.g., User Data#4) sent from Carrier Prepaid eCard Charging Device TPCC80 is authenticated and thereby the user thereof is allowed to go through Admission Gate AG80.

Paragraph [0102]—This Paragraph [0102] illustrate(s) eCard Charging Software TPCC80c4 (Paragraph [0098]) of Carrier Prepaid eCard Charging Device TPCC80 (Paragraph [0092]) and eCard Charging Software 20680c4 (Paragraph [0090]) of Communication Device 200, which charge the carrier prepaid ecard. In the present embodiment, Carrier Prepaid eCard Charging Device TPCC80 (Paragraph [0092]) sends the ecard charge data in a wireless fashion, which is received by Communication Device 200 (S1). Here, the ecard charge data is the data representing the carrier ticket fare charged (e.g., $5) to the carrier prepaid ecard stored in Communication Device 200 to purchase the carrier ticket. eCard Charge Data also includes the name of the carrier station where the carrier prepaid ecard is charged and the date charged. CPU 211 (FIG. 1) of Communication Device 200 deducts the ecard charge data (e.g., $5) from Balance Data#4 (e.g., $40) stored in Balance Data Storage Area 20680b4 (Paragraph [0089]) and updates Balance Data#4 (e.g., $35) (S2). Carrier Prepaid eCard Charging Device TPCC80 deducts the ecard charge data (e.g., $5) from Balance Data#4 (e.g., $40) stored in Balance Data Storage Area TPCC80b4 (Paragraph [0097]) and updates Balance Data#4 (e.g., $35) (S3). CPU 211 displays the data included in ecard charge data (for example, the amount charged (e.g., $5), the name of the carrier station where charged, and the date charged) on LCD 201 (FIG. 1) (S4). Carrier Prepaid eCard Charging Device TPCC80 sends the admission signal to Admission Gate Controller AGC80, and Admission Gate AG80 (Paragraph [0092]) is open (S5). Here, admission signal is a signal which instructs Admission Gate AG80 to open its gate.

Paragraph [0103]—This Paragraph [0103] illustrate(s) Balance Data Updating Software H80c5 (Paragraph [0081]) of Host H (Paragraph [0022]) and Balance Data Updating Software TPCC80c5 (Paragraph [0098]) of Carrier Prepaid eCard Charging Device TPCC80 (Paragraph [0092]), which update the balance data stored in Balance Data Storage Area H80b4 (Paragraph [0080]) of Host H. In the present embodiment, Carrier Prepaid eCard Charging Device TPCC80 retrieves all user IDs and balance data from Balance Data Storage Area TPCC80b4 (Paragraph [0097]) and sends the data to Host H (S1). Host H receives the data retrieved in S1 and updates the balance data stored in Balance Data Storage Area H80b4 (Paragraph [0080]), if any (S2). Paragraph [0104]—This Paragraph [0104] illustrate(s) eCard Charged Notifying Software H80c6 (Paragraph [0081]) of Host H (Paragraph [0022]) and eCard Charged Notifying Software 20680c6 (Paragraph [0090]) of Communication Device 200, which send an email to the user of Communication Device 200 notifying that his/her carrier prepaid ecard has been charged. In the present embodiment, Host H scans Balance Data Storage Area H80b4 (Paragraph [0080]) for any updated balance data (S1). Host H identifies the updated balance data (e.g., Balance Data#4) (S2). Host H identifies the corresponding user ID (e.g., User#4) in User Data Storage Area H80b2 (Paragraph [0078]) and retrieves the corresponding email address (e.g., Email Address#4) (S3). Host H sends the carrier prepaid ecard charged data to the email address (e.g., Email Address#4) stating the amount charged to the carrier prepaid ecard and the date charged, which is received by Communication Device 200 (S4).

Paragraph [0105]—<<Communication Device 200 Installed In Carrier>>

Paragraph [0106]—This Paragraph [0106] illustrate(s) Communication Device 200 which is installed in a carrier. In the present embodiment, Communication Device 200 can be installed in Carrier C82. Here, Carrier C82 is a carrier or transportation system designed to carry passenger(s), such as automobile, motorcycle, railway train, taxi, bus, airplane, space ship, and space station. Communication Device 200 is the device described in FIG. 1.

Paragraph [0107]—<<In-Carrier Notifying Function>>

Paragraph [0108]—Paragraph [0109] through Paragraph [0127] illustrate(s) the in-carrier notifying function wherein a predetermined notice indicating that the user of Communication Device 200 is currently in carrier is announced while the user is utilizing the voice communication mode of Communication Device 200. The present function is useful when the user receives a phone call, however, needs to suggest the caller that the user is required to hang up since he/she is currently riding a carrier. Here, the carrier may be any carrier or transportation system designed to carry passenger(s), such as automobile, motorcycle, railway train, taxi, bus, space ship, and space station.

Paragraph [0109]—This Paragraph [0109] illustrate(s) the antennas installed in Carrier CR83. Here, Carrier CR83 may be any carrier or transportation system designed to carry passenger(s), such as automobile, motorcycle, railway train, taxi, bus, space ship, and space station. In the present embodiment, six antennas, i.e., Antenna Ant83a, Antenna Ant83b, Antenna Ant83c, Antenna Ant83d, Antenna Ant83e, and Antenna Ant83f are installed in Carrier CR83. These antennas send and receive data in a wireless fashion.

Paragraph [0110]—This Paragraph [0110] illustrate(s) the storage area included in Carrier CR83 (Paragraph [0109]). In the present embodiment, Carrier CR83 includes In-Carrier Notifying Information Storage Area CR83a of which the data and the software programs stored therein are described in Paragraph [0111].

Paragraph [0111]—This Paragraph [0111] illustrate(s) the storage areas included in In-Carrier Notifying Information Storage Area CR83a (Paragraph [0110]). In the present embodiment, In-Carrier Notifying Information Storage Area CR83a includes In-Carrier Notifying Data Storage Area CR83b and In-Carrier Notifying Software Storage Area CR83c. In-Carrier Notifying Data Storage Area CR83b stores the data necessary to implement the present function on the side of Carrier CR83 (Paragraph [0109]), such as the ones described in Paragraph and Paragraph [0113]. In-Carrier Notifying Software Storage Area CR83c stores the software programs necessary to implement the present function on the side of Carrier CR83 (Paragraph [0109]), such as the one described in Paragraph [0114]. Paragraph [0112]—This Paragraph [0112] illustrate(s) the storage areas included in In-Carrier Notifying Data Storage Area CR83b (Paragraph [0111]). In the present embodiment, In-Carrier Notifying Data Storage Area CR83b includes In-Carrier Notifying Data Storage Area CR83b1 and Work Area CR83b2. In-Carrier Notifying Data Storage Area CR83b1 stores the data described in Paragraph [0113]. Work Area CR83b2 is utilized as a work area to perform calculation and temporarily store data.

Paragraph [0113]—This Paragraph [0113] illustrate(s) the data stored in In-Carrier Notifying Data Storage Area CR83b1 (Paragraph [0112]). In the present embodiment, In-Carrier Notifying Data Storage Area CR83b1 stores the in-carrier notifying data. Here, the in-carrier notifying data is the data designed to be output from Antenna Ant83a (Paragraph [0109]), Antenna Ant83b (Paragraph [0109]), Antenna Ant83c (Paragraph [0109]), Antenna Ant83d (Paragraph [0109]), Antenna Ant83e (Paragraph [0109]), and Antenna Ant83f (Paragraph [0109]) in a wireless fashion respectively, which induces Communication Device 200 to output the message data described hereinafter.

Paragraph [0114]—This Paragraph [0114] illustrate(s) the software programs stored in In-Carrier Notifying Software Storage Area CR83c (Paragraph [0111]). In the present embodiment, In-Carrier Notifying Software Storage Area CR83c stores In-Carrier Notifying Data Transmitting Software CR83c1. In-Carrier Notifying Data Transmitting Software CR83c1 is the software program described in Paragraph [0115].

Paragraph [0115]—This Paragraph [0115] illustrate(s) In-Carrier Notifying Data Transmitting Software CR83 (Paragraph [0114]) of Carrier CR83 (Paragraph [0109]), which transmits the in-carrier notifying data periodically in a wireless fashion. In the present embodiment, Carrier CR83 (Paragraph [0109]) retrieves the in-carrier notifying data from In-Carrier Notifying Data Storage Area CR83b1 (Paragraph [0113]) (S1). Carrier CR83 (Paragraph [0109]) transmits the in-carrier notifying data from Antenna Ant83a (Paragraph [0109]), Antenna Ant83b (Paragraph [0109]), Antenna Ant83c (Paragraph [0109]), Antenna Ant83d (Paragraph [0109]), Antenna Ant83e (Paragraph [0109]), and Antenna Ant83f (Paragraph [0109]), respectively (S2). The foregoing sequence is performed periodically.

Paragraph [0116]—This Paragraph [0116] illustrate(s) the storage area included in RAM 206 (FIG. 1) of Communication Device 200. In the present embodiment, RAM 206 includes In-Carrier Notifying Information Storage Area 20683a of which the data and the software programs stored therein are described in Paragraph [0118].

Paragraph [0117]—The data and/or the software programs stored in In-Carrier Notifying Information Storage Area 20683a (Paragraph [0116]) may be downloaded from Host H (Paragraph [0022]) in the manner described in Paragraph [0416] through Paragraph [0422].

Paragraph [0118]—This Paragraph [0118] illustrate(s) the storage areas included in In-Carrier Notifying Information Storage Area 20683a (Paragraph [0116]). In the present embodiment, In-Carrier Notifying Information Storage Area 20683a includes In-Carrier Notifying Data Storage Area 20683b and In-Carrier Notifying Software Storage Area 20683c. In-Carrier Notifying Data Storage Area 20683b stores the data necessary to implement the present function on the side of Communication Device 200, such as the ones described in Paragraph [0119] through Paragraph [0122]. In-Carrier Notifying Software Storage Area 20683c stores the software programs necessary to implement the present function on the side of Communication Device 200, such as the ones described in Paragraph [0123].

Paragraph [0119]—This Paragraph [0119] illustrate(s) the storage areas included in In-Carrier Notifying Data Storage Area 20683b (Paragraph [0118]). In the present embodiment, In-Carrier Notifying Data Storage Area 20683b includes Message Data Storage Area 20683b1, Selected Message ID Storage Area 20683b2, User's Name Data Storage Area 20683b3, and Work Area 20683b4. Message Data Storage Area 20683b1 stores the data described in Paragraph [0120]. Selected Message ID Storage Area 20683b2 stores the data described in Paragraph [0121]. User's Name Data Storage Area 20683b3 stores the data described in Paragraph [0122]. Work Area 20683b4 is utilized as a work area to perform calculation and temporarily store data.

Paragraph [0120]—This Paragraph [0120] illustrate(s) the data stored in Message Data Storage Area 20683b1 (Paragraph [0119]). In the present embodiment, Message Data Storage Area 20683b1 comprises two columns, i.e., 'Message ID' and 'Message Data'. Column 'Message ID' stores the message IDs, and each message ID is the identification of the corresponding message data stored in column 'Message Data'. Column 'Message Data' stores the message data, and each message data is an audio data indicating the following sentence in different expressions: 'The user is currently in carrier.' In the present embodiment, Message Data Storage Area 20683b1 stores the following data: the message ID 'Message#1' and the corresponding message data 'Message Data#1'; the message ID 'Message#2' and the corresponding message data 'Message Data#2'; the message ID 'Message#3' and the corresponding message data 'Message Data#3'; and the message ID 'Message#4' and the corresponding message data 'Message Data#4'. Here, Message Data#1 is the audio data stating the following message in male voice: 'The user is currently in carrier.' Message Data#2 is the audio data stating the following message in female voice: 'The user is currently in carrier.' Message Data#3 is the audio data stating the following message in male voice: 'Please kindly understand that the user is not allowed to talk on the phone in carrier.' Message Data#4 is the audio data stating the following message in female voice: 'Please kindly understand that the user is not allowed to talk on the phone in carrier.'

Paragraph [0121]—This Paragraph [0121] illustrate(s) the data stored in Selected Message ID Storage Area 20683b2 (Paragraph [0119]). Selected Message ID Storage Area 20683b2 stores one of the message IDs stored in Message Data Storage Area 20683b1 (Paragraph [0120]). In the present example, Selected Message ID Storage Area 20683b2 stores the message ID 'Message#1'.

Paragraph [0122]—This Paragraph [0122] illustrate(s) the data stored in User's Name Data Storage Area 20683b3 (Paragraph [0119]). User's Name Data Storage Area 20683b3 stores the user's name data. Here, the user's name data is an audio data representing the name of the user of Communication Device 200.

Paragraph [0123]—This Paragraph [0123] illustrate(s) the software programs stored in In-Carrier Notifying Software Storage Area 20683c (Paragraph [0118]). In the present embodiment, In-Carrier Notifying Software Storage Area 20683c stores In-Carrier Notifying Data Detecting Software 20683c2, Message Data Outputting Software 20683c3, and Message Data Selecting Software 20683c4. In-Carrier Notifying Data Detecting Software 20683c2 is the software program described in Paragraph [0124]. Message Data Outputting Software 20683c3 is the software program described in Paragraph [0125]. Message Data Selecting Software 20683c4 is the software program described in Paragraph [0127].

Paragraph [0124]—This Paragraph [0124] illustrate(s) In-Carrier Notifying Data Detecting Software 20683c2 (Paragraph [0123]) of Communication Device 200, which detects the in-carrier notifying data transmitted from Antenna Ant83a, Antenna Ant83b, Antenna Ant83c, Antenna Ant83d, Antenna Ant83e, and/or Antenna Ant83f. In the present embodiment, CPU 211 (FIG. 1) of Communication Device 200 periodically checks the incoming data received from Antenna 218 (FIG. 1) (S1). If the incoming data is the in-carrier notifying data (S2), CPU 211 executes Message Data Outputting Software 20683c3 (Paragraph [0125]) (S3).

Paragraph [0125]—This Paragraph [0125] illustrate(s) Message Data Outputting Software 20683c3 (Paragraph [0123]) of Communication Device 200, which outputs the selected message data. In the present embodiment, CPU 211 (FIG. 1) of Communication Device 200 periodically checks the voice communication mode status (S1). If Communication Device 200 is in the voice communication mode (S2), CPU 211 identifies the message ID (e.g., Message#1) stored in Selected Message ID Storage Area 20683b2 (Paragraph

[0121]) (S3). CPU 211 retrieves the corresponding message data (e.g., Message Data#1) from Message Data Storage Area 20683b1 (Paragraph [0120]) (S4), and outputs the message data (e.g., Message Data#1) from Speaker 216 (FIG. 1) (S5). In addition, CPU 211 merges the message data (e.g., Message Data#1) with the outgoing user's voice data and sends the data to the counter party whom user is conversing with (S6). As a result, the counter party hears the message data (e.g., Message Data#1) from the speaker of his/her device (e.g., cellular phone).

Paragraph [0126]—This Paragraph [0126] illustrate(s) Message Data Outputting Software 20683c3 (Paragraph [0123]) of Communication Device 200, which outputs the selected message data. The present embodiment illustrate(s) another embodiment of the sequence described in Paragraph [0125]. In the present embodiment, CPU 211 (FIG. 1) of Communication Device 200 periodically checks the voice communication mode status (S1). If Communication Device 200 is in the voice communication mode (S2), CPU 211 identifies the message ID (e.g., Message#1) stored In Selected Message ID Storage Area 20683b2 (Paragraph [0121]) (S3). CPU 211 retrieves the corresponding message data (e.g., Message Data#1) from Message Data Storage Area 20683b1 (Paragraph [0120]) (S4). CPU 211 retrieves the user's name data from User's Name Data Storage Area 20683b3 (Paragraph [0122]) (S5). CPU 211 embeds the user's name data to the message data (e.g., Message Data#1) and outputs the message data (e.g., Message Data#1) with user's name embedded from Speaker 216 (FIG. 1) (S6). CPU 211 merges the message data (e.g., Message Data#1) with the user's name embedded to outgoing user's voice data and sends the data to counter party whom user is conversing with (S7). As a result, the counter party hears the message data (e.g., Message Data#1) with the user's name embedded from the speaker of his/her device (e.g., cellular phone). Assuming that the user's name is 'Mr. John Doe'. The following is the message data (e.g., Message Data#1) without the user's name embedded: 'The user is currently in carrier.' The following is the message data (e.g., Message Data#1) with the user's name embedded: 'Mr. John Doe is currently in carrier.'

Paragraph [0127]—This Paragraph [0127] illustrate(s) Message Data Selecting Software 20683c4 (Paragraph [0123]) of Communication Device 200, which selects the message data which is output when Message Data Outputting Software 20683c3 (Paragraph [0125]) is executed. In the present embodiment, CPU 211 (FIG. 1) of Communication Device 200 retrieves all message IDs from Message Data Storage Area 20683b1 (Paragraph [0120]) and displays a list of the message IDs on LCD 201 (FIG. 1) (S1). The user of Communication Device 200 selects a message ID (e.g., Message#1) by utilizing Input Device 210 (FIG. 1) or via voice recognition system (S2). CPU 211 stores the message ID (e.g., Message#1) selected in the previous step in Selected Message ID Storage Area 20683b2 (Paragraph [0121]) (S3).

Paragraph [0128]—<<Station Name Notifying Function>>

Paragraph [0129]—Paragraph [0130] through Paragraph [0147] illustrate(s) the station name notifying function which outputs the name of the next station at which the carrier is about to arrive. Here, the carrier may be any carrier or transportation system designed to carry passenger(s), such as automobile, motorcycle, railway train, taxi, bus, space ship, or space station. Here, the station is a location where the carrier picks up and/or drops off passenger(s). The station may be a railway station (if the carrier is a train), a bus stop (if the carrier is a bus), an airport (if the carrier is an airplane).

Paragraph [0130]—This Paragraph [0130] illustrate(s) the antennas installed in Carrier CR84. Here, Carrier CR84 may be any carrier or transportation system designed to carry passenger(s), such as automobile, motorcycle, railway train, taxi, bus, space ship, or space station. In the present embodiment, six antennas, i.e., Antenna Ant84a, Antenna Ant84b, Antenna Ant84c, Antenna Ant84d, Antenna Ant84e, and Antenna Ant84f are installed in Carrier CR84. These antennas send and receive data in a wireless fashion.

Paragraph [0131]—This Paragraph [0131] illustrate(s) the storage area included in Carrier CR84 (Paragraph [0130]). In the present embodiment, Carrier CR84 includes Station Name Notifying Information Storage Area CR84a of which the data and the software programs stored therein are described in Paragraph [0132].

Paragraph [0132]—This Paragraph [0132] illustrate(s) the storage areas included in Station Name Notifying Information Storage Area CR84a (Paragraph [0131]). In the present embodiment, Station Name Notifying Information Storage Area CR84a includes Station Name Notifying Data Storage Area CR84b and Station Name Notifying Software Storage Area CR84c. Station Name Notifying Data Storage Area CR84b stores the data necessary to implement the present function on the side of Carrier CR84 (Paragraph [0130]), such as the ones described in Paragraph [0133] through Paragraph [0135]. Station Name Notifying Software Storage Area CR84c stores the software programs necessary to implement the present function on the side of Carrier CR84 (Paragraph [0130]), such as the ones described in Paragraph [0136].

Paragraph [0133]—This Paragraph [0133] illustrate(s) the storage areas included in Station Name Notifying Data Storage Area CR84b (Paragraph [0132]). In the present embodiment, Station Name Notifying Data Storage Area CR84b includes Station Name Text Data Storage Area CR84b1, Station Name Sound Data Storage Area CR84b2, and Work Area CR84b3. Station Name Text Data Storage Area CR84b1 stores the data described in Paragraph [0134]. Station Name Sound Data Storage Area CR84b2 stores the data described in Paragraph [0135]. Work Area CR84b3 is utilized as a work area to perform calculation and temporarily store data.

Paragraph [0134]—This Paragraph [0134] illustrate(s) the data stored in Station Name Text Data Storage Area CR84b1 (Paragraph [0133]). In the present embodiment, Station Name Text Data Storage Area CR84b1 comprises two columns, i.e., 'Station Name ID' and 'Station Name Text Data'. Column 'Station Name ID' stores the station name IDs, and each station name ID is an identification of the corresponding station name text data stored in column 'Station Name Text Data'. Column 'Station Name Text Data' stores the station name text data, and each station name text data is an alphanumeric data indicating the name of the station designed to be displayed on LCD 201 (FIG. 1). In the present embodiment, Station Name Text Data Storage Area CR84b1 stores the following data: the station name ID 'Station Name#1' and the corresponding station name text data 'Station Name Text Data#1'; the station name ID 'Station Name#2' and the corresponding station name text data 'Station Name Text Data#2'; the station name ID 'Station Name#3' and the corresponding station name text data 'Station Name Text Data#3'; and the station name ID 'Station Name#4' and the corresponding station name text data 'Station Name Text Data#4'.

Paragraph [0135]—This Paragraph [0135] illustrate(s) the data stored in Station Name Sound Data Storage Area CR84b2 (Paragraph [0133]). In the present embodiment, Station Name Sound Data Storage Area CR84b2 comprises two columns, i.e., 'Station Name ID' and 'Station Name Sound Data'. Column 'Station Name ID' stores the station name IDs, and each station name ID is an identification of the corresponding station name sound data stored in column 'Station Name Sound Data'. The station name IDs stored in Station Name Sound Data Storage Area CR84b2 are identical to the ones stored in Station Name Text Data Storage Area CR84b1. Column 'Station Name Sound Data' stores the station name sound data, and each station name sound data is a sound data indicating the name of the station designed to be output from Speaker 216 (FIG. 1). In the present embodiment, Station Name Sound Data Storage Area CR84b2 stores the following data: the station name ID 'Station Name#1' and the corresponding station name sound data 'Station Name Sound Data#1'; the station name ID 'Station Name#2' and the corresponding station name sound data 'Station Name Sound Data#2'; the station name ID 'Station Name#3' and the corresponding station name sound data 'Station Name Sound Data#3'; and the station name ID 'Station Name#4' and the corresponding station name sound data 'Station Name Sound Data#4'. Here, the station name sound data 'Station Name Sound Data#1' represents the sound of the station name text data 'Station Name Text Data#1' stored in Station Name Text Data Storage Area CR84b1 (Paragraph [0134]); the station name sound data 'Station Name Sound Data#2' represents the sound of the station name text data 'Station Name Text Data#2' stored in Station Name Text Data Storage Area CR84b1 (Paragraph [0134]); the station name sound data 'Station Name Sound Data#3' represents the sound of the station name text data 'Station Name Text Data#3' stored in Station Name Text Data Storage Area CR84b1 (Paragraph [0134]); and the station name sound data 'Station Name Sound Data#4' represents the sound of the station name text data 'Station Name Text Data#4' stored in Station Name Text Data Storage Area CR84b1 (Paragraph [0134]).

Paragraph [0136]—This Paragraph [0136] illustrate(s) the software programs stored in Station Name Notifying Software Storage Area CR84c (Paragraph [0132]). In the present embodiment, Station Name Notifying Software Storage Area CR84c stores Next Station Identifying Software CR84c1 and Station Name Data Sending/Receiving Software CR84c2. Next Station Identifying Software CR84c1 is the software program described in Paragraph [0137]. Station Name Data Sending/Receiving Software CR84c2 is the software program described in Paragraph [0145].

Paragraph [0137]—This Paragraph [0137] illustrate(s) Next Station Identifying Software CR84c1 (Paragraph [0136]) of Carrier CR84 (Paragraph [0130]), which identifies the next station at which Carrier CR84 (Paragraph [0130]) is about to arrive. In the present embodiment, Carrier CR84 (Paragraph [0130]) identifies the next station at which Carrier CR84 is about to arrive (S1). Carrier CR84 stores the station name ID of the next station in Work Area CR84b3 (Paragraph [0133]) (S2).

Paragraph [0138]—This Paragraph [0138] illustrate(s) the storage area included in RAM 206 (FIG. 1) of Communication Device 200. In the present embodiment, RAM 206 includes Station Name Notifying Information Storage Area 20684a of which the data and the software programs stored therein are described in Paragraph [0140].

Paragraph [0139]—The data and/or the software programs stored in Station Name Notifying Information Storage Area 20684a (Paragraph [0138]) may be downloaded from Host H (Paragraph [0022]) in the manner described in Paragraph [0416] through Paragraph [0422].

Paragraph [0140]—This Paragraph [0140] illustrate(s) the storage areas included in Station Name Notifying Information Storage Area 20684a (Paragraph [0138]). In the present embodiment, Station Name Notifying Information Storage Area 20684a includes Station Name Notifying Data Storage Area 20684b and Station Name Notifying Software Storage Area 20684c. Station Name Notifying Data Storage Area 20684b stores the data necessary to implement the present function on the side of Communication Device 200, such as the ones described in Paragraph [0141] through Paragraph [0143]. Station Name Notifying Software Storage Area 20684c stores the software programs necessary to implement the present function on the side of Communication Device 200, such as the ones described in Paragraph [0144].

Paragraph [0141]—This Paragraph [0141] illustrate(s) the storage areas included in Station Name Notifying Data Storage Area 20684b (Paragraph [0140]). In the present embodiment, Station Name Notifying Data Storage Area 20684b includes Station Name Text Data Storage Area 20684b1, Station Name Sound Data Storage Area 20684b2, and Work Area 20684b3. Station Name Text Data Storage Area 20684b1 stores the data described in Paragraph [0142]. Station Name Sound Data Storage Area 20684b2 stores the data described in Paragraph [0143]. Work Area 20684b3 is utilized as a work area to perform calculation and temporarily store data.

Paragraph [0142]—This Paragraph [0142] illustrate(s) the data stored in Station Name Text Data Storage Area 20684b1 (Paragraph [0141]). In the present embodiment, Station Name Text Data Storage Area 20684b1 comprises two columns, i.e., 'Station Name ID' and 'Station Name Text Data'. Column 'Station Name ID' stores the station name ID which is an identification of the corresponding station name text data stored in column 'Station Name Text Data'. Column 'Station Name Text Data' stores the station name text data which is an alphanumeric data designed to be displayed on LCD 201 (FIG. 1) indicating the name of the station at which Carrier CR84 (Paragraph [0130]) is about to arrive. In the present embodiment, Station Name Text Data Storage Area 20684b1 stores the following data: the station name ID 'Station Name#1' and the corresponding station name text data 'Station Name Text Data#1'.

Paragraph [0143]—This Paragraph [0143] illustrate(s) the data stored in Station Name Sound Data Storage Area 20684b2 (Paragraph [0141]). In the present embodiment, Station Name Sound Data Storage Area 20684b2 comprises two columns, i.e., 'Station Name Sound ID' and 'Station Name Sound Data'. Column 'Station Name Sound ID' stores the station name ID which is an identification of the corresponding station name sound data stored in column 'Station Name Sound Data'. The station name ID stored in Station Name Sound Data Storage Area CR84b2 (Paragraph [0135]) is identical to the one stored in Station Name Text Data Storage Area CR84b1 (Paragraph [0134]). Column 'Station Name Sound Data' stores the station name sound data which is the sound data designed to be output from Speaker 216 (FIG. 1) indicating the name of the station at which Carrier CR84 (Paragraph [0130]) is about to arrive. In the present embodiment, Station Name Sound Data Storage Area 20684b2 stores the following data: the station name ID 'Station Name#1' and the corresponding station name sound data 'Station Name Sound Data#1'. Here, the station name sound data 'Station Name Sound Data#1' represents the sound of the station name text data 'Station Name Text Data#1' stored in Station Name Text Data Storage Area 20684b1 (Paragraph [0142]).

Paragraph [0144]—This Paragraph [0144] illustrate(s) the software programs stored in Station Name Notifying Software Storage Area 20684c (Paragraph [0140]). In the present embodiment, Station Name Notifying Software Storage Area 20684c stores Station Name Data Sending/Receiving Software 20684c1, Station Name Text Data Notifying Software 20684c2, and Station Name Sound Data Notifying Software 20684c3. Station Name Data Sending/Receiving Software 20684c1 is the software program described in Paragraph [0145]. Station Name Text Data Notifying Software 20684c2 is the software program described in Paragraph [0146]. Station Name Sound Data Notifying Software 20684c3 is the software program described in Paragraph [0147].

Paragraph [0145]—This Paragraph [0145] illustrate(s) Station Name Data Sending/Receiving Software CR84c2 (Paragraph [0136]) of Carrier CR84 (Paragraph [0130]) and Station Name Data Sending/Receiving Software 20684c1 (Paragraph [0144]) of Communication Device 200, which send the station name text data and the station name sound data to Communication Device 200. In the present embodiment, Carrier CR84 retrieves the station name ID (e.g., Station Name#1) of the next station from Work Area CR84b3 (Paragraph [0133]) (S1). Carrier CR84 retrieves the corresponding station name text data (e.g., Station Name Text Data#1) from Station Name Text Data Storage Area CR84b1 (Paragraph [0134]) (S2). Carrier CR84 retrieves the corresponding station name sound data (e.g., Station Name Sound Data#1) from Station Name Sound Data Storage Area CR84b2 (Paragraph [0135]) (S3). Carrier CR84 sends the data retrieved in S1 through S3, which are received by Communication Device 200 via Antenna 218 (FIG. 1) (S4). CPU 211 (FIG. 1) of Communication Device 200 stores the station name ID (e.g., Station Name#1) and the corresponding station name text data (e.g., Station Name Text Data#1) in Station Name Text Data Storage Area 20684b1 (Paragraph [0142]) (S5). CPU 211 stores the station name ID (e.g., Station Name#1) and the corresponding station name sound data (e.g., Station Name Sound Data#1) in Station Name Sound Data Storage Area 20684b2 (Paragraph [0143]) (S6).

Paragraph [0146]—This Paragraph [0146] illustrate(s) Station Name Text Data Notifying Software 20684c2 (Paragraph [0144]) of Communication Device 200, which displays the station name text data on LCD 201 (FIG. 1). In the present embodiment, CPU 211 (FIG. 1) of Communication Device 200 retrieves the station name text data (e.g., Station Name Text Data#1) from Station Name Text Data Storage Area 20684b1 (Paragraph [0142]) (S1) and displays the data on LCD 201 (FIG. 1) (S2). The foregoing sequence is performed periodically.

Paragraph [0147]—This Paragraph [0147] illustrate(s) Station Name Sound Data Notifying Software 20684c3 (Paragraph [0144]) of Communication Device 200, which outputs the station name sound data from Speaker 216 (FIG. 1). In the present embodiment, CPU 211 (FIG. 1) of Communication Device 200 retrieves the station name sound data (e.g., Station Name Sound Data#1) from Station Name Sound Data Storage Area 20684b2 (Paragraph [0143]) (S1) and outputs the data from Speaker 216 (FIG. 1) (S2). The foregoing sequence is performed periodically.

Paragraph [0148]—<<Restaurant eMenu Function>>

Paragraph [0149]—Paragraph [0150] through Paragraph [0183] illustrate(s) the restaurant emenu function which enables the customer of a restaurant, i.e., the user of Communication Device 200, to display the restaurant menu on LCD 201 (FIG. 1) and order menu via Communication Device 200.

Paragraph [0150]—This Paragraph [0150] illustrate(s) the location where Host H (Paragraph [0022]) is installed. In the present embodiment, Host H is installed in a restaurant, Restaurant Rst85.

Paragraph [0151]—This Paragraph [0151] illustrate(s) the storage area included in Host H (Paragraph [0022]). In the present embodiment, Host H includes Restaurant eMenu Information Storage Area H85a of which the data and the software programs stored therein are described in Paragraph [0152].

Paragraph [0152]—This Paragraph [0152] illustrate(s) the storage areas included in Restaurant eMenu Information Storage Area H85a (Paragraph [0151]). In the present embodiment, Restaurant eMenu Information Storage Area H85a includes Restaurant eMenu Text Data Storage Area H85b and Restaurant eMenu Software Storage Area H85c. Restaurant eMenu Text Data Storage Area H85b stores the data necessary to implement the present function on the side of Host H (Paragraph [0022]), such as the ones described in Paragraph [0153] through Paragraph [0163]. Restaurant eMenu Software Storage Area H85c stores the software programs necessary to implement the present function on the side of Host H, such as the ones described in Paragraph [0164].

Paragraph [0153]—This Paragraph [0153] illustrate(s) the storage areas included in Restaurant eMenu Text Data Storage Area H85b (Paragraph [0152]). In the present embodiment, Restaurant eMenu Text Data Storage Area H85b includes Menu Text Data Storage Area H85b1, Menu Image Data Storage Area H85b2, Menu Price Data Storage Area H85b3, Selected Menu Data Storage Area H85b4, Order Status Data Storage Area H85b5, Total Price Data Storage Area H85b6, and Work Area H85b7. Menu Text Data Storage Area H85b1 stores the data described in Paragraph [0154]. Menu Image Data Storage Area H85b2 stores the data described in Paragraph [0155]. Menu Price Data Storage Area H85b3 stores the data described in Paragraph [0156]. Selected Menu Data Storage Area H85b4 stores the data described in Paragraph [0157]. Order Status Data Storage Area H85b5 stores the data described in Paragraph [0160]. Total Price Data Storage Area H85b6 stores the data described in Paragraph [0163]. Work Area H85b7 is utilized as a work area to perform calculation and temporarily store data.

Paragraph [0154]—This Paragraph [0154] illustrate(s) the data stored in Menu Text Data Storage Area H85b1 (Paragraph [0153]). In the present embodiment, Menu Text Data Storage Area H85b1 comprises two columns, i.e., 'Menu ID' and 'Menu Text Data'. Column 'Menu ID' stores the menu IDs, and each menu ID is an identification of the corresponding menu text data stored in column 'Menu Text Data'. Column 'Menu Text Data' stores the menu text data, and each menu text data represents the name of food or beverage. In the present embodiment, Menu Text Data Storage Area H85b1 stores the following data: the menu ID 'Menu#1' and the corresponding menu text data 'Menu Text Data#1'; the menu ID 'Menu#2' and the corresponding menu text data 'Menu Text Data#2'; the menu ID 'Menu#3' and the corresponding menu text data 'Menu Text Data#3'; and the menu ID 'Menu#4' and the corresponding menu text data 'Menu Text Data#4'. In the present example, the menu text data 'Menu Text Data#1' represents 'corn soup'; the menu text data 'Menu Text Data#2' represents 'salad'; the menu text data 'Menu Text Data#3' represents 'beefsteak'; and the menu text data 'Menu Text Data#4' represents 'orange juice'.

Paragraph [0155]—This Paragraph [0155] illustrate(s) the data stored in Menu Image Data Storage Area H85b2 (Paragraph [0153]). In the present embodiment, Menu Image Data Storage Area H85b2 comprises two columns, i.e., 'Menu ID' and 'Menu Image Data'. Column 'Menu ID' stores the menu IDs, and each menu ID is an identification of the corresponding menu image data stored in column 'Menu Image Data'. The menu IDs described in the present embodiment are identical to the ones described in the previous embodiment. Column 'Menu Image Data' stores the menu image data, and each menu image data is the image data describing the menu text data stored in Menu Text Data Storage Area H85b1 (Paragraph [0154]) of the corresponding menu ID. In the example described in the present embodiment, Menu Image Data Storage Area H85b2 stores the following data: the menu ID 'Menu#1' and the corresponding menu image data 'Menu Image Data#1'; the menu ID 'Menu#2' and the corresponding menu image data 'Menu Image Data#2'; the menu ID 'Menu#3' and the corresponding menu image data 'Menu Image Data#3'; and the menu ID 'Menu#4' and the corresponding menu image data 'Menu Image Data#4'.

Paragraph [0156]—This Paragraph [0156] illustrate(s) the data stored in Menu Price Data Storage Area H85b3 (Paragraph [0153]). In the present embodiment, Menu Price Data Storage Area H85b3 comprises two columns, i.e., 'Menu ID' and 'Menu Price Data'. Column 'Menu ID' stores the menu IDs, and each menu ID is an identification of the corresponding menu price data stored in column 'Menu Price Data'. The menu IDs described in the present embodiment are identical to the ones described in the previous two embodiments. Column 'Menu Price Data' stores the menu price data, and each menu price data indicates the price of the menu of the corresponding menu ID. In the present embodiment, Menu Price Data Storage Area H85b3 stores the following data: the menu ID 'Menu#1' and the corresponding menu price data 'Menu Price Data#1'; the menu ID 'Menu#2' and the corresponding menu price data 'Menu Price Data#2'; the menu ID 'Menu#3' and the corresponding menu price data 'Menu Price Data#3'; and the menu ID 'Menu#4' and the corresponding menu price data 'Menu Price Data#4'. In the present example, the menu price data 'Menu Price Data#1' represents '$5'; the menu price data 'Menu Price Data#2' represents '$5'; the menu price data 'Menu Price Data#3' represents '$10'; and the menu price data 'Menu Price Data#4' represents '$5'.

Paragraph [0157]—This Paragraph [0157] illustrate(s) the data stored in Selected Menu Data Storage Area H85b4 (Paragraph [0153]). In the present embodiment, Selected Menu Data Storage Area H85b4 comprises two columns, i.e., 'Order ID' and 'Selected Menu Data'. Column 'Order ID' stores the order IDs, and each order ID is an identification of the corresponding selected menu data stored in column 'Selected Menu Data'. Column 'Selected Menu Data' stores the selected menu data, and each selected menu data includes the data regarding the menu selected by a customer (i.e., the user of Communication Device 200). In the present embodiment, Selected Menu Data Storage Area H85b4 stores the following data: the order ID 'Order#1' and the corresponding selected menu data 'Selected Menu Data#1'; the order ID 'Order#2' and the corresponding selected menu data 'Selected Menu Data#2'; the order ID 'Order#3' and the corresponding selected menu data 'Selected Menu Data#3'; and the order ID 'Order#4' and the corresponding selected menu data 'Selected Menu Data#4'.

Paragraph [0158]—This Paragraph [0158] illustrate(s) the selected menu data 'Selected Menu Data#1' as an example of the data stored in Selected Menu Data Storage Area H85b4 (Paragraph [0157]). In the present embodiment, Selected Menu Data#1 includes the menu IDs 'Menu#1, Menu#2, and Menu#3'. Referring to the data stored in Menu Text Data Storage Area H85b1 (Paragraph [0154]), the selected menu data described in the present embodiment indicates that a customer (i.e., a user of Communication Device 200) represented by the order ID 'Order#1' selected corn soup, salad, and beefsteak.

Paragraph [0159]—This Paragraph [0159] illustrate(s) the selected menu data 'Selected Menu Data#2' as an example of the selected menu data stored in Selected Menu Data Storage Area H85b4 (Paragraph [0157]). In the present embodiment, Selected Menu Data#2 includes the menu ID 'Menu#4'. Referring to the data stored in Menu Text Data Storage Area H85b1 (Paragraph [0154]), the selected menu data described in the present embodiment indicates that another customer (i.e., another user of Communication Device 200) represented by the order ID 'Order#2' selected orange juice.

Paragraph [0160]—This Paragraph [0160] illustrate(s) the data stored in Order Status Data Storage Area H85b5 (Paragraph [0153]). In the present embodiment, Order Status Data Storage Area H85b5 comprises two columns, i.e., 'Order ID' and 'Order Status Data'. Column 'Order ID' stores the order IDs, and each order ID is an identification of the corresponding order status data stored in column 'Order Status Data'. The order IDs described in the present embodiment are identical to the ones stored in Selected Menu Data Storage Area H85b4 (Paragraph [0157]). Column 'Order Status Data' stores the order status data, and each order status data represents the current status of the order of each food or beverage, i.e., whether the corresponding food or beverage is served to the corresponding customer or not. In the present embodiment, Order Status Data Storage Area H85b5 stores the following data: the order ID 'Order#1' and the corresponding order status data 'Order Status Data#1'; the order ID 'Order#2' and the corresponding order status data 'Order Status Data#2'; the order ID 'Order#3' and the corresponding order status data 'Order Status Data#3'; and the order ID 'Order#4' and the corresponding order status data 'Order Status Data#4'.

Paragraph [0161]—This Paragraph [0161] illustrate(s) the order status data 'Order Status Data#1' as an example of the data stored in Order Status Data Storage Area H85b5 (Paragraph [0160]). In the present embodiment, Order Status Data#1 includes two columns, i.e., 'Menu ID' and 'Status Data'. Column 'Menu ID' stores the menu IDs, and each menu ID is an identification of the corresponding status data stored in column 'Status Data'. The menu IDs described in the present embodiment are identical to the ones stored in Menu Text Data Storage Area H85b1 (Paragraph [0154]). Column 'Status Data' stores the status data, and each status data represents the current status of the order of the food or beverage of the corresponding menu ID, i.e., whether the food or beverage of the corresponding menu ID is served to the corresponding customer or not. The status data is indicated by either 'Served' or Not Served'. In the present embodiment, Order Status Data#1 stores the following data: the menu ID 'Menu#1' and the corresponding status data 'Served'; the menu ID 'Menu#2' and the corresponding status data 'Served'; and the menu ID 'Menu#3' and the corresponding status data Not Served'. The present example indicates that the ordered corn soup is served, the ordered salad is served, however, the ordered beefsteak is not yet served.

Paragraph [0162]—This Paragraph [0162] illustrate(s) the order status data 'Order Status Data#2' as an example of the data stored in Order Status Data Storage Area H85b5 (Paragraph [0160]). In the present embodiment, Order Status Data#2 includes two columns, i.e., 'Menu ID' and 'Status Data'. Column 'Menu ID' stores the menu IDs, and each menu ID is an identification of the corresponding status data stored in column 'Status Data'. The menu IDs described in the present embodiment are identical to the ones stored in Menu Text Data Storage Area H85b1 (Paragraph [0154]). Column 'Status Data' stores the status data, and each status data represents the current status of the order of the food or beverage of the corresponding menu ID, i.e., whether the food or beverage of the corresponding menu ID is served to the corresponding customer or not. The status data is indicated by either 'Served' or 'Not Served'. In the present embodiment, Order Status Data#2 stores the following data: the menu ID 'Menu#4' and the corresponding status data Not Served'. The present example indicates that the ordered orange juice is not yet served.

Paragraph [0163]—This Paragraph [0163] illustrate(s) the data stored in Total Price Data Storage Area H85b6 (Paragraph [0153]). In the present embodiment, Total Price Data Storage Area H85b6 comprises two columns, i.e., 'Order ID' and Total Price Data'. Column 'Order ID' stores the order IDs, and each order ID is an identification of the corresponding total price data stored in column 'Total Price Data'. The order IDs described in the present embodiment are identical to the ones stored in Selected Menu Data Storage Area H85b4 (Paragraph [0157]). Column 'Total Price Data' stores the total price data, and each total price data indicates the total amount charged to the customer, i.e., the user of Communication Device 200, of the corresponding order ID. In the example described in the present embodiment, Total Price Data Storage Area H85b6 stores the following data: the order ID 'Order#1' and the corresponding total price data 'Total Price Data#1'; the order ID 'Order#2' and the corresponding total price data 'Total Price Data#2'; the order ID 'Order#3' and the corresponding total price data 'Total Price Data#3'; and the order ID 'Order#4' and the corresponding total price data 'Total Price Data#4'. In the present example, the customer represented by the order ID 'Order#1' is charged $25; the customer represented by the order ID 'Order#2' is charged $5; the customer represented by the order ID 'Order#3' is charged $25; and the customer represented by the order ID 'Order#4' is charged $25.

Paragraph [0164]—This Paragraph [0164] illustrate(s) the software programs stored in Restaurant eMenu Software Storage Area H85c (Paragraph [0152]). In the present embodiment, Restaurant eMenu Software Storage Area H85c stores Menu Data Sending/Receiving Software H85c1, Selected Menu Data Sending/Receiving Software H85c4, Order Status Data Updating/Notifying Software H85c5, and Total Price Data Producing/Notifying Software H85c6. Menu Data Sending/Receiving Software H85c1 is the software program described in Paragraph [0177]. Selected Menu Data Sending/Receiving Software H85c4 is the software program described in Paragraph [0181]. Order Status Data Updating/Notifying Software H85c5 is the software program described in Paragraph [0182]. Total Price Data Producing/Notifying Software H85c6 is the software program described in Paragraph [0183].

Paragraph [0165]—This Paragraph [0165] illustrate(s) the storage area included in RAM 206 (FIG. 1) of Communication Device 200. In the present embodiment, RAM 206 includes Restaurant eMenu Information Storage Area 20685a of which the data and the software programs stored therein are described in Paragraph [0166].

Paragraph [0166]—This Paragraph [0166] illustrate(s) the storage areas included in Restaurant eMenu Information Storage Area 20685a (Paragraph [0165]). In the present embodiment, Restaurant eMenu Information Storage Area 20685a includes Restaurant eMenu Text Data Storage Area 20685b and Restaurant eMenu Software Storage Area 20685c. Restaurant eMenu Text Data Storage Area 20685b stores the data necessary to implement the present function on the side of Communication Device 200, such as the ones described in Paragraph [0167] through Paragraph [0175]. Restaurant eMenu Software Storage Area 20685c stores the software programs necessary to implement the present function on the side of Communication Device 200, such as the ones described in Paragraph [0176].

Paragraph [0167]—This Paragraph [0167] illustrate(s) the storage areas included in Restaurant eMenu Text Data Storage Area 20685b (Paragraph [0166]). In the present embodiment, Restaurant eMenu Text Data Storage Area 20685b includes Menu Text Data Storage Area 20685b1, Menu Image Data Storage Area 20685b2, Menu Price Data Storage Area 20685b3, Selected Menu Data Storage Area 20685b4, Order Status Data Storage Area 20685b5, Total Price Data Storage Area 20685b6, and Work Area 20685b7. Menu Text Data Storage Area 20685b1 stores the data described in Paragraph [0168]. Menu Image Data Storage Area 20685b2 stores the data described in Paragraph [0169]. Menu Price Data Storage Area 20685b3 stores the data described in Paragraph [0170]. Selected Menu Data Storage Area 20685b4 stores the data described in Paragraph [0171]. Order Status Data Storage Area 20685b5 stores the data described in Paragraph [0173]. Total Price Data Storage Area 20685b6 stores the data described in Paragraph [0175]. Work Area 20685b7 is utilized as a work area to perform calculation and temporarily store data.

Paragraph [0168]—This Paragraph [0168] illustrate(s) the data stored in Menu Text Data Storage Area 20685b1 (Paragraph [0167]). In the present embodiment, Menu Text Data Storage Area 20685b1 comprises two columns, i.e., 'Menu ID' and 'Menu Text Data'. Column 'Menu ID' stores the menu IDs, and each menu ID is an identification of the corresponding menu text data stored in column 'Menu Text Data'. Column 'Menu Text Data' stores the menu text data, and each menu text data represents the name of food or beverage. In the present embodiment, Menu Text Data Storage Area 20685b1 stores the following data: the menu ID 'Menu#1' and the corresponding menu text data 'Menu Text Data#1'; the menu ID 'Menu#2' and the corresponding menu text data 'Menu Text Data#2'; the menu ID 'Menu#3' and the corresponding menu text data 'Menu Text Data#3'; and the menu ID 'Menu#4' and the corresponding menu text data 'Menu Text Data#4'. In the present example, the menu text data 'Menu Text Data#1' represents 'corn soup'; the menu text data 'Menu Text Data#2' represents 'salad'; the menu text data 'Menu Text Data#3' represents 'beefsteak'; and the menu text data 'Menu Text Data#4' represents 'orange juice'.

Paragraph [0169]—This Paragraph [0169] illustrate(s) the data stored in Menu Image Data Storage Area 20685b2 (Paragraph [0167]). In the present embodiment, Menu Image Data Storage Area 20685b2 comprises two columns, i.e., 'Menu ID' and 'Menu Image Data'. Column 'Menu ID' stores the menu IDs, and each menu ID is an identification of the corresponding menu image data stored in column 'Menu Image Data'. The menu IDs described in the present embodiment are identical to the ones described in the previous embodiment. Column 'Menu Image Data' stores the menu image data, and each menu image data is the image data describing the menu text data stored in Menu Text Data Storage Area 20685b1 (Paragraph [0168]) of the corresponding menu ID. In the present embodiment, Menu Image Data Storage Area 20685b2 stores the following data: the menu ID 'Menu#1' and the corresponding menu image data 'Menu Image Data#1'; the menu ID 'Menu#2' and the corresponding menu image data 'Menu Image Data#2'; the menu ID 'Menu#3' and the corresponding menu image data 'Menu Image Data#3'; and the menu ID 'Menu#4' and the corresponding menu image data 'Menu Image Data#4'.

Paragraph [0170]—This Paragraph [0170] illustrate(s) the data stored in Menu Price Data Storage Area 20685b3 (Paragraph [0167]). In the present embodiment, Menu Price Data Storage Area 20685b3 comprises two columns, i.e., 'Menu ID' and 'Menu Price Data'. Column 'Menu ID' stores the menu IDs, and each menu ID is an identification of the corresponding menu price data stored in column 'Menu Price Data'. The menu IDs described in the present embodiment are identical to the ones described in the previous two embodiments. Column 'Menu Price Data' stores the menu price data, and each menu price data indicates the price of the menu of the corresponding menu ID. In the present embodiment, Menu Price Data Storage Area 20685b3 stores the following data: the menu ID 'Menu#1' and the corresponding menu price data 'Menu Price Data#1'; the menu ID 'Menu#2' and the corresponding menu price data 'Menu Price Data#2'; the menu ID 'Menu#3' and the corresponding menu price data 'Menu Price Data#3'; and the menu ID 'Menu#4' and the corresponding menu price data 'Menu Price Data#4'. In the present example, the menu price data 'Menu Price Data#1' represents '$5'; the menu price data 'Menu Price Data#2' represents '$5'; the menu price data 'Menu Price Data#3' represents '$10'; and the menu price data 'Menu Price Data#4' represents '$5'.

Paragraph [0171]—This Paragraph [0171] illustrate(s) the data stored in Selected Menu Data Storage Area 20685b4 (Paragraph [0167]). In the present embodiment, Selected Menu Data Storage Area 20685b4 comprises two columns, i.e., 'Order ID' and 'Selected Menu Data'. Column 'Order ID' stores the order ID which is an identification of the corresponding selected menu data stored in column 'Selected Menu Data'. Column 'Selected Menu Data' stores the selected menu data which includes the data regarding the menu selected by the customer (i.e., the user of Communication Device 200) represented by the order ID 'Order#1'. In the present embodiment, Selected Menu Data Storage Area 20685b4 stores the following data: the order ID 'Order#1' and the corresponding selected menu data 'Selected Menu Data#1'.

Paragraph [0172]—This Paragraph [0172] illustrate(s) the selected menu data 'Selected Menu Data#1' stored in Selected Menu Data Storage Area 20685b4 (Paragraph [0171]). In the present embodiment, Selected Menu Data#1 includes the menu IDs 'Menu#1, Menu#2, and Menu#3'. Referring to the data stored in Menu Text Data Storage Area 20685b1 (Paragraph [0168]), the selected menu data described in the present embodiment indicates that the customer (i.e., the user of Communication Device 200, for example Device A) represented by the order ID 'Order#1' selected corn soup, salad, and beefsteak.

Paragraph [0173]—This Paragraph [0173] illustrate(s) the data stored in Order Status Data Storage Area 20685b5 (Paragraph [0167]). In the present embodiment, Order Status Data Storage Area 20685b5 comprises two columns, i.e., 'Order ID' and 'Order Status Data'. Column 'Order ID' stores the order ID which is an identification of the corresponding order status data stored in column 'Order Status Data'. The order ID described in the present embodiment is identical to the one stored in Selected Menu Data Storage Area 20685b4 (Paragraph [0171]). Column 'Order Status Data' stores the order status data which represents the current status of the order of each food or beverage, i.e., whether the corresponding food or beverage is served to the customer represented by the order ID 'Order#1' or not. In the present embodiment, Order Status Data Storage Area 20685b5 stores the following data: the order ID 'Order#1' and the corresponding order status data 'Order Status Data#1'.

Paragraph [0174]—This Paragraph [0174] illustrate(s) the order status data 'Order Status Data#1' stored in Order Status Data Storage Area 20685b5 (Paragraph [0173]). In the present embodiment, Order Status Data#1 includes two columns, i.e., 'Menu ID' and 'Status Data'. Column 'Menu ID' stores the menu IDs, and each menu ID is an identification of the corresponding status data stored in column 'Status Data'. The menu IDs described in the present embodiment are identical to the ones stored in Menu Text Data Storage Area 20685b1 (Paragraph [0168]). Column 'Status Data' stores the status data, and each status data represents the current status of the order of the food or beverage of the corresponding menu ID, i.e., whether the food or beverage of the corresponding menu ID is served to the customer represented by the order ID 'Order#1' or not. The status data is indicated by either 'served' or 'not served'. In the present embodiment, Order Status Data#1 stores the following data: the menu ID 'Menu#1' and the corresponding status data 'Served'; the menu ID 'Menu#2' and the corresponding status data 'Served'; and the menu ID 'Menu#3' and the corresponding status data 'Not Served'. The present example indicates that the ordered corn soup is served, the ordered salad is served, however, the ordered beefsteak is not yet served.

Paragraph [0175]—This Paragraph [0175] illustrate(s) the data stored in Total Price Data Storage Area 20685b6 (Paragraph [0167]). In the present embodiment, Total Price Data Storage Area 20685b6 comprises two columns, i.e., 'Order ID' and Total Price Data'. Column 'Order ID' stores the order ID which is an identification of the corresponding total price data stored in column 'Total Price Data'. The order ID described in the present embodiment is identical to the one stored in Selected Menu Data Storage Area 20685b4 (Paragraph [0171]). Column 'Total Price Data' stores the total price data which indicates the total amount charged to the customer, i.e., the user of Communication Device 200, represented by the order ID 'Order#1'. In the present embodiment, Total Price Data Storage Area 20685b6 stores the following data: the order ID 'Order#1' and the corresponding total price data 'Total Price Data#1'.

Paragraph [0176]—This Paragraph [0176] illustrate(s) the software programs stored in Restaurant eMenu Software Storage Area 20685c (Paragraph [0166]). In the present embodiment, Restaurant eMenu Software Storage Area 20685c stores Menu Data Sending/Receiving Software 20685c1, Menu Data Displaying Software 20685c2, Menu Data Selecting Software 20685c3, Selected Menu Data Sending/Receiving Software 20685c4, Order Status Data Updating/Notifying Software 20685c5, and Total Price Data Producing/Notifying Software 20685c6. Menu Data Sending/Receiving Software 20685c1 is the software program described in Paragraph [0177]. Menu Data Displaying Software 20685c2 is the software program described in Paragraph [0178]. Menu Data Selecting Software 20685c3 is the software program described in Paragraph [0180]. Selected Menu Data Sending/Receiving Software 20685c4 is the software program described in Paragraph [0181]. Order Status Data Updating/Notifying Software 20685c5 is the software program described in Paragraph [0182]. Total Price Data Producing/Notifying Software 20685c6 is the software program described in Paragraph [0183].

Paragraph [0177]—This Paragraph [0177] illustrate(s) Menu Data Sending/Receiving Software H85c1 (Paragraph [0164]) of Host H (Paragraph [0022]) and Menu Data Sending/Receiving Software 20685c1 (Paragraph [0176]) of Communication Device 200, which transfer the menu data (i.e., the menu text data, the menu image data, and the menu price data) from Host H to Communication Device 200 in order to have the menu data displayed on LCD 201 (FIG. 1) of Communication Device 200. In the present embodiment, CPU 211 (FIG. 1) of Communication Device 200 sends a menu data request, which is received by Host H (S1). Here, the menu data request is a signal sent to Host H which requests to send the menu text data, the menu image data, and the menu price data to Communication Device 200. Host H retrieves all menu IDs and menu text data from Menu Text Data Storage Area H85b1 (Paragraph [0154]) (S2). Host H retrieves all menu IDs and menu image data from Menu Image Data Storage Area H85b2 (Paragraph [0155]) (S3). Host H retrieves all menu IDs and menu price data from Menu Price Data Storage Area H85b3 (Paragraph [0156]) (S4). Host H sends the data retrieved in S2 through S4, which are received by Communication Device 200 (S5). CPU 211 stores the menu IDs and the menu text data in Menu Text Data Storage Area 20685b1 (Paragraph [0168]) (S6). CPU 211 stores the menu IDs and the menu image data in Menu Image Data Storage Area 20685b2 (Paragraph [0169]) (S7). CPU 211 stores the menu IDs and the menu price data in Menu Price Data Storage Area 20685b3 (Paragraph [0170]) (S8).

Paragraph [0178]—This Paragraph [0178] illustrate(s) Menu Data Displaying Software 20685c2 (Paragraph [0176]) of Communication Device 200, which displays the menu data (i.e., the menu text data, the menu image data, and the menu price data) on LCD 201 (FIG. 1) of Communication Device 200. In the present embodiment, CPU 211 (FIG. 1) of Communication Device 200 retrieves all menu text data from Menu Text Data Storage Area 20685b1 (Paragraph [0168]) (S1). CPU 211 retrieves all menu image data from Menu Image Data Storage Area 20685b2 (Paragraph [0169]) (S2). CPU 211 retrieves all menu price data from Menu Price Data Storage Area 20685b3 (Paragraph [0170]) (S3). CPU 211 displays the data retrieved in S1 through S3 on LCD 201 (FIG. 1) (S4).

Paragraph [0179]—This Paragraph [0179] illustrate(s) the menu list including the menu data (i.e., the menu text data, the menu image data, and the menu price data) displayed on LCD 201 (FIG. 1) of Communication Device 200. In the present embodiment, Menu List ML85 is displayed on LCD 201 (FIG. 1). Menu List ML85 comprises three types of data, i.e., the menu text data, the menu image data, and the menu price data. In the present embodiment, Menu List ML85 comprises the following data: the menu text data 'Menu Text Data#1' and the corresponding menu image data 'Menu Image Data#1' and the corresponding menu price data 'Menu Price Data#1'; the menu text data 'Menu Text Data#2' and the corresponding menu image data 'Menu Image Data#2' and the corresponding menu price data 'Menu Price Data#2'; the menu text data 'Menu Text Data#3' and the corresponding menu image data 'Menu Image Data#3' and the corresponding menu price data 'Menu Price Data#3'; and the menu text data 'Menu Text Data#4' and the corresponding menu image data 'Menu Image Data#4' and the corresponding menu price data 'Menu Price Data#4'.

Paragraph [0180]—This Paragraph [0180] illustrate(s) Menu Data Selecting Software 20685c3 (Paragraph [0176]) of Communication Device 200, which selects a menu from Menu List ML85 described in the previous embodiment. In the present embodiment, the user of Communication Device 200 selects menu(s) from Menu List ML85 (S1). CPU 211 (FIG. 1) of Communication Device 200 identifies the corresponding menu IDs (e.g., Menu#1, Menu#2, and Menu#3) (S2). CPU 211 produces the selected menu data (e.g., Selected Menu Data#1) (S3). Here, the selected menu data is the data representing the menu(s) selected in the previous step. CPU 211 stores the selected menu data (e.g., Selected Menu Data#1) in Selected Menu Data Storage Area 20685b4 (Paragraph [0171]) (S4).

Paragraph [0181]—This Paragraph [0181] illustrate(s) Selected Menu Data Sending/Receiving Software H85c4 (Paragraph [0164]) of Host H (Paragraph [0022]) and Selected Menu Data Sending/Receiving Software 20685c4 (Paragraph [0176]) of Communication Device 200, which transfer the selected menu data from Communication Device 200 to Host H. In the present embodiment, CPU 211 (FIG. 1) of Communication Device 200 retrieves the selected menu data (e.g., Selected Menu Data#1) from Selected Menu Data Storage Area 20685b4 (Paragraph [0171]) (S1). CPU 211 sends the selected menu data (e.g., Selected Menu Data#1), which is received by Host H (S2). Host H stores the selected menu data (e.g., Selected Menu Data#1) in Selected Menu Data Storage Area H85b4 (Paragraph [0157]) (S3).

Paragraph [0182]—This Paragraph [0182] illustrate(s) Order Status Data Updating/Notifying Software H85c5 (Paragraph [0164]) of Host H (Paragraph [0022]) and Order Status Data Updating/Notifying Software 20685c5 (Paragraph [0176]) of Communication Device 200, which update the order status data stored in Order Status Data Storage Area H85b5 (Paragraph [0160]) of Host H and notifies the customer, i.e., the user of Communication Device 200, of the latest status of his/her order. In the present embodiment, the restaurant owner inputs a new order status (e.g., corn soup and salad are served for Order#1) (S1), and Host H updates the order status data (e.g., Order Status Data#1) stored in Order Status Data Storage Area H85b5 (Paragraph [0160]) (S2). Host H retrieves the updated order status data (e.g., Order Status Data#1) from Order Status Data Storage Area H85b5 (Paragraph [0160]), which is sent to Communication Device 200 (S3). CPU 211 (FIG. 1) of Communication Device 200 receives the updated order status data (e.g., Order Status Data#1) from Host H, and stores the data in Order Status Data Storage Area 20685b5 (Paragraph [0173]) (S4). CPU 211 retrieves the updated order status data (e.g., Order Status Data#1) from Order Status Data Storage Area 20685b5 (Paragraph [0173]) and displays the data on LCD 201 (FIG. 1) (S5).

Paragraph [0183]—This Paragraph [0183] illustrate(s) Total Price Data Producing/Notifying Software H85c6 (Paragraph [0164]) of Host H (Paragraph [0022]) and Total Price Data Producing/Notifying Software 20685c6 (Paragraph [0176]) of Communication Device 200, which produce the total price data and notifies the total amount charged to the customer, i.e., the user of Communication Device 200, of the corresponding order ID. In the present embodiment, Host H retrieves the selected menu data (e.g., Selected Menu Data#1) from Selected Menu Data Storage Area H85b4 (Paragraph [0157]) (S1). Host H identifies the menu IDs (e.g., Menu#1, Menu#2, Menu#3) included in Selected Menu Data (e.g., Selected Menu Data#1) (S2). Host H identifies the menu price data (e.g., Menu Price Data#1, Menu Price Data#2, Menu Price Data#3) of the corresponding menu IDs (e.g., Menu#1, Menu#2, Menu#3) (S3). Host H calculates the total price data (e.g., Total Price Data#1) from each menu price data (e.g., Menu Price Data#1 ($5)+Menu Price Data#2 ($5)+Menu Price Data#3 ($10)) (S4). Host H stores the total price data (e.g., Total Price Data#1) in Total Price Data Storage Area H85b6 (Paragraph [0163]) at the corresponding order ID (e.g., Order#1) (S5). Host H retrieves the total price data (e.g., Total Price Data#1) from Total Price Data Storage Area H85b6 (Paragraph [0163]) and sends the data to Communication Device 200 (S6). CPU 211 (FIG. 1) of Communication Device 200 receives the total price data (e.g., Total Price Data#1) from Host H and stores the data in Total Price Data Storage Area 20685b6 (Paragraph [0175]) (S7). CPU 211 retrieves the total price data (e.g., Total Price Data#1) from Total Price Data Storage Area 20685b6 (Paragraph [0175]) and displays the data on LCD 201 (FIG. 1) (S8).

Paragraph [0184]—<<Geographic Location Recording Function>>

Paragraph [0185]—Paragraph [0186] through Paragraph [0219] illustrate(s) the geographic location recording function which records the geographic location of Device A, a Communication Device 200, and/or Device B, another Communication Device 200. Assume that user A owns Device A, a Communication Device 200, and user B owns Device B, another Communication Device 200.

Paragraph [0186]—This Paragraph [0186] illustrate(s) the storage area included in RAM 206 (FIG. 1) of Device A. In the present embodiment, RAM 206 includes Geographic Location Recording Information Storage Area 20686aA of which the data and the software programs stored therein are described in Paragraph [0188].

Paragraph [0187]—The data and/or the software programs stored in Geographic Location Recording Information Storage Area 20686aA (Paragraph [0186]) may be downloaded from Host H (Paragraph [0022]) in the manner described in Paragraph [0416] through Paragraph [0422].

Paragraph [0188]—This Paragraph [0188] illustrate(s) the storage areas included in Geographic Location Recording Information Storage Area 20686aA (Paragraph [0186]). In the present embodiment, Geographic Location Recording Information Storage Area 20686aA includes Geographic Location Recording Data Storage Area 20686bA and Geographic Location Recording Software Storage Area 20686cA. Geographic Location Recording Data Storage Area 20686bA stores the data necessary to implement the present function on the side of Device A, such as the ones described in Paragraph [0189] through Paragraph [0194]. Geographic Location Recording Software Storage Area 20686cA stores the software programs necessary to implement the present function on the side of Device A, such as the ones described in Paragraph [0195].

Paragraph [0189]—This Paragraph [0189] illustrate(s) the storage areas included in Geographic Location Recording Data Storage Area 20686bA (Paragraph [0188]). In the present embodiment, Geographic Location Recording Data Storage Area 20686bA includes Device A's Location Data Storage Area 20686b1A, Device B's Location Data Storage Area 20686b2A, 3D Map Data Storage Area 20686b3A, Street Address Location Storage Area 20686b4A, Phone Number Location Storage Area 20686b5A, Icon Image Data Storage Area 20686b6A, and Work Area 20686b7A. Device A's Location Data Storage Area 20686b1A stores the data described in Paragraph [0190]. Device B's Location Data Storage Area 20686b2A stores the data described in Paragraph [0191]. 3D Map Data Storage Area 20686b3A stores the 3D map data. Here, the 3D map data is a map data covering the entire nation composed of a plurality of three-dimensional data. Street Address Location Storage Area 20686b4A stores the data described in Paragraph [0192]. Phone Number Location Storage Area 20686b5A stores the data described in Paragraph [0193]. Icon Image Data Storage Area 20686b6A stores the data described in Paragraph [0194]. Work Area 20686b7A is utilized as a work area to perform calculation and temporarily store data.

Paragraph [0190]—This Paragraph [0190] illustrate(s) the data stored in Device A's Location Data Storage Area 20686b1A (Paragraph [0189]). In the present embodiment, Device A's Location Data Storage Area 20686b1A comprises two columns, i.e., 'Time Data' and 'Device A's Location Data'. Column 'Time Data' stores the time data, and each time data is an identification of the Device A's location data stored in column Device A's Location Data'. Each time data represents the time at which the corresponding Device A's location data is stored in Device A's Location Data Storage Area 20686b1A. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device A's Location Data' stores the Device A's location data, and each Device A's location data represents the geographic location in (x,y,z) format of Device A at the time indicated by the corresponding time data. In the present embodiment, Device A's Location Data Storage Area 20686b1A stores the following data: the time data 'Time Data#1' and the corresponding Device A's location data 'Device A's Location Data#1; the time data Time Data#2' and the corresponding Device A's location data 'Device A's Location Data#2'; the time data 'Time Data#3' and the corresponding Device A's location data 'Device A's Location Data#3'; and the time data 'Time Data#4' and the corresponding Device A's location data 'Device A's Location Data#4'.

Paragraph [0191]—This Paragraph [0191] illustrate(s) the data stored in Device B's Location Data Storage Area 20686b2A (Paragraph [0189]). In the present embodiment, Device B's Location Data Storage Area 20686b2A comprises two columns, i.e., 'Time Data' and 'Device B's Location Data'. Column 'Time Data' stores the time data, and each time data is an identification of the Device B's location data stored in column 'Device B's Location Data'. Each time data represents the time at which the corresponding Device B's location data is stored in Device B's Location Data Storage Area 20686b2A. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device B's Location Data' stores the Device B's location data, and each Device B's location data represents the geographic location in (x,y,z) format of Device B at the time indicated by the corresponding time data. In the present embodiment, Device B's Location Data Storage Area 20686b2A stores the following data: the time data 'Time Data#5' and the corresponding Device B's location data 'Device B's Location Data#5'; the time data 'Time Data#6' and the corresponding Device B's location data 'Device B's Location Data#6'; the time data 'Time Data#7' and the corresponding Device B's location data 'Device B's Location Data#7'; and the time data 'Time Data#8' and the corresponding Device B's location data 'Device B's Location Data#8'.

Paragraph [0192]—This Paragraph [0192] illustrate(s) the data stored in Street Address Location Storage Area 20686b4A (Paragraph [0189]). In the present embodiment, Street Address Location Storage Area 20686b4A comprises two columns, i.e., 'Street Address Data' and 'Street Address Location Data'. Column 'Street Address Data' stores the street address data, and each street address data represents a street address. The street address data includes the name of the state, the name of county, the name of street, and/or the street number. Column 'Street Address Location Data' stores the street address location data, and each street address location data represents the geographic location in (x,y,z) format of the corresponding street address data. In the present embodiment, Street Address Location Storage Area 20686b4A stores the following data: the street address data 'Street Address Data#1' and the corresponding street address location data 'Street Address Location Data#1'; the street address data 'Street Address Data#2' and the corresponding street address location data 'Street Address Location Data#2'; the street address data 'Street Address Data#3' and the corresponding street address location data 'Street Address Location Data#3'; and the street address data 'Street Address Data#4' and the corresponding street address location data 'Street Address Location Data#4'.

Paragraph [0193]—This Paragraph [0193] illustrate(s) the data stored in Phone Number Location Storage Area 20686b5A (Paragraph [0189]). In the present embodiment, Phone Number Location Storage Area 20686b5A comprises two columns, i.e., 'Phone Number Data' and 'Phone Number Location Data'. Column 'Phone Number Data' stores the phone number data, and each phone number data represents a phone number. Column 'Phone Number Location Data' stores the phone number location data, and each phone number location data represents the geographic location of the premises (e.g., a restaurant or a hotel) in (x,y,z) format at which the corresponding phone number data is utilized. In the present embodiment, Phone Number Location Storage Area 20686b5A stores the following data: the phone number data 'Phone Number Data#1' and the corresponding phone number location data 'Phone Number Location Data#1'; the phone number data 'Phone Number Data#2' and the corresponding phone number location data 'Phone Number Location Data#2'; the phone number data 'Phone Number Data#3' and the corresponding phone number location data 'Phone Number Location Data#3'; and the phone number data 'Phone Number Data#4' and the corresponding phone number location data 'Phone Number Location Data#4'.

Paragraph [0194]—This Paragraph [0194] illustrate(s) the data stored in Icon Image Data Storage Area 20686b6A (Paragraph [0189]). In the present embodiment, Icon Image Data Storage Area 20686b6A comprises two columns, i.e., 'Icon Image ID' and Icon Image Data'. Column 'Icon Image ID' stores the icon image IDs, and each icon image ID is an identification of the corresponding icon image data stored in column 'Icon Image Data'. Column 'Icon Image Data' stores the icon image data, and each icon image data is an image data designed to be displayed on LCD 201 (FIG. 1) indicating the geographic location of Device A or Device B. In the present embodiment, Icon Image Data Storage Area 20686b6A stores the following data: the icon image ID 'Icon Image#1' and the corresponding icon image data 'Icon Image Data#1'; and the icon image ID 'Icon Image#2' and the corresponding icon image data 'Icon Image Data#2'. In the present example, the icon image data 'Icon Image Data#1' represents Device A and the icon image data 'Icon Image Data#2' represents Device B.

Paragraph [0195]—This Paragraph [0195] illustrate(s) the software programs stored in Geographic Location Recording Software Storage Area 20686cA (Paragraph [0188]). In the present embodiment, Geographic Location Recording Software Storage Area 20686cA stores Device A's Location One Time Recording Software 20686c1A, Device A's Location Continuous Recording Software 20686c2A, Device A's Location Displaying Software 20686c3A, Device A's Location Replaying Software 20686c4A, Device A's Location Street Address Displaying Software 20686c5A, Device A's Location Phone Number Displaying Software 20686c6A, Device A's Location Information Sending/Receiving Software 20686c7A, Device B's Location One Time Recording Software 20686c8A, Device B's Location Continuous Recording Software 20686c9A, Device B's Location Displaying Software 20686c10A, Device B's Location Replaying Software 20686c11A, Device B's Location Street Address Displaying Software 20686c12A, Device B's Location Phone Number Displaying Software 20686c13A, and Device B's Location Information Sending/Receiving Software 20686c14A. Device A's Location One Time Recording Software 20686c1A is the software program described in Paragraph [0206]. Device A's Location Continuous Recording Software 20686c2A is the software program described in Paragraph [0207]. Device A's Location Displaying Software 20686c3A is the software program described in Paragraph [0208]. Device A's Location Replaying Software 20686c4A is the software program described in Paragraph [0209]. Device A's Location Street Address Displaying Software 20686c5A is the software program described in Paragraph [0210]. Device A's Location Phone Number Displaying Software 20686c6A is the software program described in Paragraph [0211]. Device A's Location Information Sending/Receiving Software 20686c7A is the software program described in Paragraph [0212]. Device B's Location One Time Recording Software 20686c8A is the software program described in Paragraph [0213]. Device B's Location Continuous Recording Software 20686c9A is the software program described in Paragraph [0214]. Device B's Location Displaying Software 20686c10A is the software program described in Paragraph [0215]. Device B's Location Replaying Software 20686c11A is the software program described in Paragraph [0216]. Device B's Location Street Address Displaying Software 20686c12A is the software program described in Paragraph [0217]. Device B's Location Phone Number Displaying Software 20686c13A is the software program described in Paragraph [0218]. Device B's Location Information Sending/Receiving Software 20686c14A is the software program described in Paragraph [0205].

Paragraph [0196]—This Paragraph [0196] illustrate(s) the storage area included in RAM 206 (FIG. 1) of Device B. In the present embodiment, RAM 206 includes Geographic Location Recording Information Storage Area 20686aB of which the data and the software programs stored therein are described in Paragraph [0198].

Paragraph [0197]—The data and/or the software programs stored in Geographic Location Recording Information Storage Area 20686aB (Paragraph [0196]) may be downloaded from Host H (Paragraph [0022]) in the manner described in Paragraph [0416] through Paragraph [0422].

Paragraph [0198]—This Paragraph [0198] illustrate(s) the storage areas included in Geographic Location Recording Information Storage Area 20686aB (Paragraph [0196]). In the present embodiment, Geographic Location Recording Information Storage Area 20686aB includes Geographic Location Recording Data Storage Area 20686bB and Geographic Location Recording Software Storage Area 20686cB. Geographic Location Recording Data Storage Area 20686bB stores the data necessary to implement the present function on the side of Device B, such as the ones described in Paragraph [0199] through Paragraph [0204]. Geographic Location Recording Software Storage Area 20686cB stores the software programs necessary to implement the present function on the side of Device B, such as the ones described in Paragraph [0205].

Paragraph [0199]—This Paragraph [0199] illustrate(s) the storage areas included in Geographic Location Recording Data Storage Area 20686bB (Paragraph [0198]). As described in the present embodiment, Geographic Location Recording Data Storage Area 20686bB includes Device B's Location Data Storage Area 20686b1B, Device A's Location Data Storage Area 20686b2B, 3D Map Data Storage Area 20686b3B, Street Address Location Storage Area 20686b4B, Phone Number Location Storage Area 20686b5B, Icon Image Data Storage Area 20686b6B, and Work Area 20686b7B. Device B's Location Data Storage Area 20686b1B stores the data described in Paragraph [0200]. Device A's Location Data Storage Area 20686b2B stores the data described in Paragraph [0201]. 3D Map Data Storage Area 20686b3B stores the 3D map data. Here, the 3D map data is a map data covering the entire nation composed of a plurality of three-dimensional data. Street Address Location Storage Area 20686b4B stores the data described in Paragraph [0202]. Phone Number Location Storage Area 20686b5B stores the data described in Paragraph [0203]. Icon Image Data Storage Area 20686b6B stores the data described in Paragraph [0204]. Work Area 20686b7B is utilized as a work area to perform calculation and temporarily store data.

Paragraph [0200]—This Paragraph [0200] illustrate(s) the data stored in Device B's Location Data Storage Area 20686b1B (Paragraph [0199]). In the present embodiment, Device B's Location Data Storage Area 20686b1B comprises two columns, i.e., 'Time Data' and 'Device B's Location Data'. Column 'Time Data' stores the time data, and each time data is an identification of the Device B's location data stored in column 'Device B's Location Data'. Each time data represents the time at which the corresponding Device B's location data is stored in Device B's Location Data Storage Area 20686b1B. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device B's Location Data' stores the Device B's location data, and each Device B's location data represents the geographic location in (x,y,z) format of Device B at the time indicated by the corresponding time data. In the present embodiment, Device B's Location Data Storage Area 20686b1B stores the following data: the time data 'Time Data#5' and the corresponding Device B's location data 'Device B's Location Data#5'; the time data 'Time Data#6' and the corresponding Device B's location data 'Device B's Location Data#6'; the time data 'Time Data#7' and the corresponding Device B's location data 'Device B's Location Data#7'; and the time data 'Time Data#8' and the corresponding Device B's location data 'Device B's Location Data#8'.

Paragraph [0201]—This Paragraph [0201] illustrate(s) the data stored in Device A's Location Data Storage Area 20686b2B (Paragraph [0199]). In the present embodiment, Device A's Location Data Storage Area 20686b2B comprises two columns, i.e., 'Time Data' and 'Device A's Location Data'. Column 'Time Data' stores the time data, and each time data is an identification of the Device A's location data stored in column 'Device A's Location Data'. Each time data represents the time at which the corresponding Device A's location data is stored in Device A's Location Data Storage Area 20686b2B. The time data is stored in (yyyy/mm/dd/hh/mm/ss) format, wherein 'yyyy' represents the year, 'mm' represents the month 'dd' represents the day, 'hh' represents the hour, 'mm' represents the minute, and 'ss' represents the second. Column 'Device A's Location Data' stores the Device A's location data, and each Device A's location data represents the geographic location in (x,y,z) format of Device A at the time indicated by the corresponding time data. In the present embodiment, Device A's Location Data Storage Area 20686b2B stores the following data: the time data 'Time Data#1' and the corresponding Device A's location data 'Device A's Location Data#1'; the time data 'Time Data#2' and the corresponding Device A's location data 'Device A's Location Data#2'; the time data 'Time Data#3' and the corresponding Device A's location data 'Device A's Location Data#3'; and the time data 'Time Data#4' and the corresponding Device A's location data 'Device A's Location Data#4'.

Paragraph [0202]—This Paragraph [0202] illustrate(s) the data stored in Street Address Location Storage Area 20686b4B (Paragraph [0199]). In the present embodiment, Street Address Location Storage Area 20686b4B comprises two columns, i.e., 'Street Address Data' and 'Street Address Location Data'. Column 'Street Address Data' stores the street address data, and each street address data represents a street address. The street address data includes the name of state, the name of county, the name of street, and/or the street number. Column 'Street Address Location Data' stores the street address location data, and each street address location data represents the geographic location in (x,y,z) format of the corresponding street address data. In the present embodiment, Street Address Location Storage Area 20686b4B stores the following data: the street address data 'Street Address Data#1' and the corresponding street address location data 'Street Address Location Data#1'; the street address data 'Street Address Data#2' and the corresponding street address location data 'Street Address Location Data#2'; the street address data 'Street Address Data#3' and the corresponding street address location data 'Street Address Location Data#3'; and the street address data 'Street Address Data#4' and the corresponding street address location data 'Street Address Location Data#4'.

Paragraph [0203]—This Paragraph [0203] illustrate(s) the data stored in Phone Number Location Storage Area 20686b5B (Paragraph [0199]). In the present embodiment, Phone Number Location Storage Area 20686b5B comprises two columns, i.e., 'Phone Number Data' and 'Phone Number Location Data'. Column 'Phone Number Data' stores the phone number data, and each phone number data represents a phone number. Column 'Phone Number Location Data' stores the phone number location data, and each phone number location data represents the geographic location of the premises (e.g., a restaurant or a hotel) in (x,y,z) format at which the corresponding phone number data is utilized. In the present embodiment, Phone Number Location Storage Area 20686b5B stores the following data: the phone number data 'Phone Number Data#1' and the corresponding phone number location data 'Phone Number Location Data#1'; the phone number data 'Phone Number Data#2' and the corresponding phone number location data 'Phone Number Location Data#2'; the phone number data 'Phone Number Data#3' and the corresponding phone number location data 'Phone Number Location Data#3'; and the phone number data 'Phone Number Data#4' and the corresponding phone number location data 'Phone Number Location Data#4'.

Paragraph [0204]—This Paragraph [0204] illustrate(s) the data stored in Icon Image Data Storage Area 20686b6B (Paragraph [0199]). In the present embodiment, Icon Image Data Storage Area 20686b6B comprises two columns, i.e., 'Icon Image ID' and 'Icon Image Data'. Column 'Icon Image ID' stores the icon image IDs, and each icon image ID is an identification of the corresponding icon image data stored in column 'Icon Image Data'. Column 'Icon Image Data' stores the icon image data, and each icon image data is an image data designed to be displayed on LCD 201 (FIG. 1) indicating the geographic location of Device A or Device B. In the example described in the present embodiment, Icon Image Data Storage Area 20686b6B stores the following data: the icon image ID 'Icon Image#1' and the corresponding icon image data 'Icon Image Data#1'; the icon image ID 'Icon Image#2' and the corresponding icon image data 'Icon Image Data#2'; and In the present example, the icon image data 'Icon Image Data#1' represents Device A and the icon image data 'Icon Image Data#2' represents Device B.

Paragraph [0205]—This Paragraph [0205] illustrate(s) the software programs stored in Geographic Location Recording Software Storage Area 20686cB (Paragraph [0198]). In the present embodiment, Geographic Location Recording Software Storage Area 20686cB stores Device B's Location One Time Recording Software 20686c1B, Device B's Location Continuous Recording Software 20686c2B, Device B's Location Displaying Software 20686c3B, Device B's Location Replaying Software 20686c4B, Device B's Location Street Address Displaying Software 20686c5B, Device B's Location Phone Number Displaying Software 20686c6B, Device B's Location Information Sending Software 20686c7B, Device A's Location One Time Recording Software 20686c8B, Device A's Location Continuous Recording Software 20686c9B, Device A's Location Displaying Software 20686c10B, Device A's Location Replaying Software 20686c11B, Device A's Location Street Address Displaying Software 20686c12B, Device A's Location Phone Number Displaying Software 20686c13B, and Device A's Location Information Sending/Receiving Software 20686c14B. Device B's Location One Time Recording Software 20686c1B is the software program described in Paragraph [0213]. Device B's Location Continuous Recording Software 20686c2B is the software program described in Paragraph [0214]. The sequence of Device B's Location Displaying Software 20686c3B is similar to the sequence of Device A's Location Displaying Software 20686c3A (Paragraph [0208]). The sequence of Device B's Location Replaying Software 20686c4B is similar to the sequence of Device A's Location Replaying Software 20686c4A (Paragraph [0209]). The sequence of Device B's Location Street Address Displaying Software 20686c5B is similar to the sequence of Device A's Location Street Address Displaying Software 20686c5A (Paragraph [0210]). The sequence of Device B's Location Phone Number Displaying Software 20686c6B is similar to the sequence of Device A's Location Phone Number Displaying Software 20686c6A (Paragraph [0211]). Device A's Location One Time Recording Software 20686c8B is the software program described in Paragraph [0206]. Device A's Location Continuous Recording Software 20686c9B is the software program described in Paragraph [0207]. The sequence of Device A's Location Displaying Software 20686c10B is similar to the sequence of Device B's Location Displaying Software 20686c10A (Paragraph [0215]). The sequence of Device A's Location Replaying Software 20686c11B is similar to the sequence of Device B's Location Replaying Software 20686c11A (Paragraph [0216]). The sequence of Device A's Location Street Address Displaying Software 20686c12B is similar to the sequence of Device B's Location Street Address Displaying Software 20686c12A (Paragraph [0217]). The sequence of Device A's Location Phone Number Displaying Software 20686c13B is similar to the sequence of Device B's Location Phone Number Displaying Software 20686c13A (Paragraph [0218]). The sequence of Device A's Location Info Sending/Receiving Software 20686c14B is similar to the sequence of Device B's Location Info Sending/Receiving Software 20686c14A.

Paragraph [0206]—This Paragraph [0206] illustrate(s) Device A's Location One Time Recording Software 20686c1A (Paragraph [0195]) of Device A and Device A's Location One Time Recording Software 20686c8B (Paragraph [0205]) of Device B, which store the current location of Device A for one time. In the present embodiment, the user of Device A inputs a Device A's location one time recording signal (S1). Here, the Device A's location one time recording signal is a signal which instructs CPU 211 (FIG. 1) of Device A to initiate implementing the following steps. CPU 211 (FIG. 1) of Device A identifies the current time and stores the data in column 'Time Data' (e.g., Time Data#1) of Device A's Location Data Storage Area 20686b1A (Paragraph [0190]) (S2). CPU 211 of Device A identifies the current geographic location data of Device A and stores the data in column 'Device A's Location Data' (e.g., Device A's Location Data#1) of Device A's Location Data Storage Area 20686b1A (Paragraph [0190]) (S3). CPU 211 of Device A retrieves the time data and the Device A's location data from Device A's Location Data Storage Area 20686b1A (Paragraph [0190]) and sends the data to Device B via Antenna 218 (FIG. 1) (S4). CPU 211 of Device B receives the time data and the Device A's location data from Device A and stores the data in Device A's Location Data Storage Area 20686b2B (Paragraph [0201]) (S5).

Paragraph [0207]—This Paragraph [0207] illustrate(s) Device A's Location Continuous Recording Software 20686c2A (Paragraph [0195]) of Device A and Device A's Location Continuous Recording Software 20686c9B (Paragraph [0205]) of Device B, which continuously store the current location of Device A. In the present embodiment, the user of Device A inputs a Device A's location continuous recording signal (Device A) (S1). Here, the Device A's location continuous recording signal is a signal which instructs CPU 211 (FIG. 1) of Device A to initiate implementing the following steps. CPU 211 of Device A identifies the current time and adds the data as a new time data in column 'Time Data' (e.g., Time Data#1) of Device A's Location Data Storage Area 20686b1A (Paragraph [0190]) (S2). CPU 211 of Device A identifies the current geographic location data of Device A and adds the data as a new Device A's location data in column 'Device A's Location Data' (e.g., Device A's Location Data#1) of Device A's Location Data Storage Area 20686b1A (Paragraph [0190]) (S3). CPU 211 of Device A retrieves the new time data and Device A's location data from Device A's Location Data Storage Area 20686b1A (Paragraph [0190]) and sends the data to Device B via Antenna 218 (FIG. 1) (S4). The sequence of S2 through S4 is repeated Periodically (S5).

Paragraph [0208]—This Paragraph [0208] illustrate(s) Device A's Location Displaying Software 20686c3A (Paragraph [0195]) of Device A, which displays the current location of Device A on LCD 201 (FIG. 1) of Device A. In the present embodiment, CPU 211 (FIG. 1) of Device A retrieves all time data from Device A's Location Data Storage Area 20686b1A (Paragraph [0190]) and displays a list of time data on LCD 201 (FIG. 1) (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A retrieves the 3D map data from 3D Map Data Storage Area 20686b3A and displays the data on LCD 201 (FIG. 1) of Device A (S4). CPU 211 of Device A retrieves Icon Image Data#1 from Icon Image Data Storage Area 20686b6A (Paragraph [0194]) (S5), and displays the data on LCD 201 of Device A at the location corresponding to the Device A's location data (e.g., Device A's Location Data#1) retrieved in S3 (S6).

Paragraph [0209]—This Paragraph [0209] illustrate(s) Device A's Location Replaying Software 20686c4A (Paragraph [0195]) of Device A, which replays the location of Device A. In the present embodiment, CPU 211 (FIG. 1) of Device A retrieves the 3D map from 3D Map Data Storage Area 20686b3A and the data is displayed on LCD 201 (FIG. 1) of Device A (S1). CPU 211 of Device A retrieves the 1st time data (e.g., Time Data#1) stored in Device A's Location Data Storage Area 20686b1A (Paragraph [0190]) (S2). CPU 211 of Device A retrieves the corresponding Device A's location data (e.g., Device A's Location Data#1) (S3). CPU 211 of Device A retrieves Icon Image Data#1 from Icon Image Data Storage Area 20686b6A (Paragraph [0194]) (S4), and displays the data on LCD 201 of Device A at the location corresponding to Device A's location data (e.g., Device A's Location Data#1) retrieved in S3 (S5). The sequence of S2 through S5 is performed with the 2nd time data (e.g., Time Data#2), the 3rd time data (e.g., Time Data#3), and the 4th time data (e.g., Time Data#4) (S6).

Paragraph [0210]—This Paragraph [0210] illustrate(s) Device A's Location Street Address Displaying Software 20686c5A (Paragraph [0195]) of Device A, which displays the street address of the premises (e.g., a hotel or a restaurant) where Device A is currently located. In the present embodiment, CPU 211 of Device A retrieves all time data from Device A's Location Data Storage Area 20686b1A (Paragraph [0190]) and displays a list of time data on LCD 201 (FIG. 1) of Device A (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A identifies the closest street address location data (e.g., Street Address Location Data#1) stored in Street Address Location Storage Area 20686b4A (Paragraph [0192]) (S4). CPU 211 of Device A retrieves the corresponding street address data (e.g., Street Address Data#1) from Street Address Location Storage Area 20686b4A (Paragraph [0192]) and displays the data on LCD 201 (FIG. 1) of Device A (S5).

Paragraph [0211]—This Paragraph [0211] illustrate(s) Device A's Location Phone Number Displaying Software 20686c6A (Paragraph [0195]) of Device A, which displays the phone number of the premises (e.g., a hotel or restaurant) where Device A is currently located. In the present embodiment, CPU 211 (FIG. 1) of Device A retrieves all time data from Device A's Location Data Storage Area 20686b1A (Paragraph [0190]) and displays a list of time data on LCD 201 (FIG. 1) of Device A (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A identifies the closest phone number location data (e.g., Phone Number Location Data#1) stored in Phone Number Location Storage Area 20686b5A (Paragraph [0193]) (S4). CPU 211 of Device A retrieves the corresponding phone number data (e.g., Phone Number Data#1) from Phone Number Location Storage Area 20686b5A (Paragraph [0193]) and displays the data on LCD 201 (FIG. 1) of Device A (S5).

Paragraph [0212]—This Paragraph [0212] illustrate(s) Device A's Location Information Sending/Receiving Software 20686c7A (Paragraph [0195]) of Device A and Device A's Location Information Sending Software 20686cB (Paragraph [0205]) of Device B, which send the Device A's location data, the Device A's location street address, and the Device A's location phone number to Device B. In the present embodiment, CPU 211 of Device A retrieves all time data from Device A's Location Data Storage Area 20686b1A (Paragraph [0190]) and displays a list of time data on LCD 201 (FIG. 1) of Device A (S1). The user of Device A selects a time data (e.g., Time Data#1) by utilizing Input Device 210 (FIG. 1) or via voice recognition system (S2). CPU 211 of Device A retrieves the corresponding Device A's location data (e.g., Device A's Location Data#1) (S3). CPU 211 of Device A identifies the closest street address location data (e.g., Street Address Location Data#1) stored in Street Address Location Storage Area 20686b4A (Paragraph [0192]) (S4). CPU 211 of Device A retrieves the corresponding street address data (e.g., Street Address Data#1) from Street Address Location Storage Area 20686b4A (Paragraph [0192]) and displays the data on LCD 201 (FIG. 1) of Device A (S5). CPU 211 of Device A identifies the closest phone number location data (e.g., Phone Number Location Data#1) stored in Phone Number Location Storage Area 20686b5A (Paragraph [0193]) (S6). CPU 211 of Device A retrieves the corresponding phone number data (e.g., Phone Number Data#1) from Phone Number Location Storage Area 20686b5A (Paragraph [0193]) and displays the data on LCD 201 (FIG. 1) of Device A (S7). CPU 211 of Device A sends the Device A's location data, the Device A's location street address, and the Device A's location phone number, which are received by Device B (S8).

Paragraph [0213]—This Paragraph [0213] illustrate(s) Device B's Location One Time Recording Software 20686c8A (Paragraph [0195]) of Device A and Device B's Location One Time Recording Software 20686c1B (Paragraph [0205]) of Device B, which store the current location of Device B for one time. In the present embodiment, the user of Device B inputs a Device B's location one time recording signal (S1). Here, the Device B's location one time recording signal is a signal which instructs CPU 211 (FIG. 1) of Device B to initiate implementing the following steps. CPU 211 (FIG. 1) of Device B identifies the current time and stores the data in column 'Time Data' (e.g., Time Data#5) of Device B's Location Data Storage Area 20686b1B (Paragraph [0200]) (S2). CPU 211 of Device B identifies the current geographic location data of Device B and stores the data in column 'Device B's Location Data' (e.g., Device B's Location Data#5) of Device B's Location Data Storage Area 20686b1B (Paragraph [0200]) (S3). CPU 211 of Device B retrieves the time data and the Device B's location data from Device B's Location Data Storage Area 20686b1B (Paragraph [0200]) and sends the data to Device A via Antenna 218 (FIG. 1) (S4). CPU 211 of Device A receives the time data and the Device B's location data from Device B and stores the data in Device B's Location Data Storage Area 20686b2A (Paragraph [0191]) (S5).

Paragraph [0214]—This Paragraph [0214] illustrate(s) Device B's Location Continuous Recording Software 20686c9A (Paragraph [0195]) of Device A and Device B's Location Continuous Recording Software 20686c2B (Paragraph [0205]) of Device B, which continuously store the current location of Device B. In the present embodiment, the user of Device B inputs a Device B's location continuous recording signal (S1). Here, the Device B's location continuous recording signal is a signal which instructs CPU 211 (FIG. 1) of Device B to initiate implementing the following steps. CPU 211 (FIG. 1) of Device B identifies the current time and adds the data as a new time data in column 'Time Data' (e.g., Time Data#5) of Device B's Location Data Storage Area 20686b1B (Paragraph [0200]) (S2). CPU 211 of Device B identifies the current geographic location data of Device B and adds the data as a new Device B's location data in column 'Device B's Location Data' (e.g., Device B's Location Data#5) of Device B's Location Data Storage Area 20686b1B (Paragraph [0200]) (S3). CPU 211 of Device B retrieves the new time data and Device B's location data from Device B's Location Data Storage Area 20686b1B (Paragraph [0200]) and sends the data to Device A via Antenna 218 (FIG. 1) (S4). The sequence of S2 through S4 is repeated Periodically (S5).

Paragraph [0215]—This Paragraph [0215] illustrate(s) Device B's Location Displaying Software 20686c10A (Paragraph [0195]) of Device A, which displays the current location of Device B on LCD 201 (FIG. 1) of Device A. In the present embodiment, CPU 211 (FIG. 1) of Device A retrieves all time data from Device B's Location Data Storage Area 20686b2A (Paragraph [0191]) and displays a list of time data on LCD 201 (FIG. 1) of Device A (S1). The user of Device A selects a time data (e.g., Time Data#5) by utilizing Input Device 210 (FIG. 1) or via voice recognition system (S2). CPU 211 of Device A retrieves the corresponding Device B's location data (e.g., Device B's Location Data#5) (S3). CPU 211 of Device A retrieves the 3D map data from 3D Map Data Storage Area 20686b3A and displays the data on LCD 201 (FIG. 1) of Device A (S4). CPU 211 of Device A retrieves Icon Image Data#2 from Icon Image Data Storage Area 20686b6A (Paragraph [0194]) (S5). CPU 211 of Device A displays the data on LCD 201 of Device A at the location corresponding to the Device B's Location Data (e.g., Device B's Location Data#5) retrieved in S3 (S6).

Paragraph [0216]—This Paragraph [0216] illustrate(s) Device B's Location Replaying Software 20686c11A (Paragraph [0195]) of Device A, which replays the location of Device B. In the present embodiment, CPU 211 (FIG. 1) of Device A retrieves the 3D map data from 3D Map Data Storage Area 20686b3A and displays the data on LCD 201 (FIG. 1) of Device A (S1). CPU 211 of Device A retrieves the 1st time data (e.g., Time Data#5) stored in Device B's Location Data Storage Area 20686b2A (Paragraph [0191]) (S2). CPU 211 of Device A retrieves the corresponding Device B's location data (e.g., Device B's Location Data#5) (S3). CPU 211 of Device A retrieves Icon Image Data#2 from Icon Image Data Storage Area 20686b6A (Paragraph [0194]) (S4). CPU 211 of Device A displays the date on LCD 201 of Device A at the location corresponding to the Device B's location data (e.g., Device B's Location Data#5) retrieved in S3 (S5). The sequence of S2 through S5 is repeated with the 2nd time data (e.g., Time Data#6), the 3rd time data (e.g., Time Data#7), and the 4th time data (e.g., Time Data#8) (S6).

Paragraph [0217]—This Paragraph [0217] illustrate(s) Device B's Location Street Address Displaying Software 20686c12A (Paragraph [0195]) of Device A, which displays the street address of the premises (e.g., a hotel or restaurant) where Device B is currently located. In the present embodiment, CPU 211 (FIG. 1) of Device A retrieves all time data from Device B's Location Data Storage Area 20686b2A (Paragraph [0191]) and displays a list of time data on LCD 201 (FIG. 1) of Device A (S1). The user of Device A selects a time data (e.g., Time Data#5) by utilizing Input Device 210 (FIG. 1) or via voice recognition system (S2). CPU 211 of Device A retrieves the corresponding Device B's location data (e.g., Device B's Location Data#5) (S3). CPU 211 of Device A identifies the closest street address location data (e.g., Street Address Location Data#5) stored in Street Address Location Storage Area 20686b4A (Paragraph [0192]) (S4). CPU 211 of Device A retrieves the corresponding street address data (e.g., Street Address Data#5) from Street Address Location Storage Area 20686b4A (Paragraph [0192]) and displays the data on LCD 201 (FIG. 1) of Device A (S5).

Paragraph [0218]—This Paragraph [0218] illustrate(s) Device B's Location Phone Number Displaying Software 20686c13A (Paragraph [0195]) of Device A, which displays the phone number of the premises (e.g., a hotel or restaurant) where Device B is currently located. In the present embodiment, CPU 211 (FIG. 1) of Device A retrieves all time data from Device B's Location Data Storage Area 20686b2A (Paragraph [0191]) and displays a list of time data on LCD 201 (FIG. 1) of Device A (S1). The user of Device A selects a time data (e.g., Time Data#5) by utilizing Input Device 210 (FIG. 1) or via voice recognition system (S2). CPU 211 of Device A retrieves the corresponding Device B's location data (e.g., Device B's Location Data#5) (S3). CPU 211 of Device A identifies the closest phone number location data (e.g., Phone Number Location Data#5) stored in Phone Number Location Storage Area 20686b5A (Paragraph [0193]) (S4). CPU 211 of Device A retrieves the corresponding phone number data (e.g., Phone Number Data#5) from Phone Number Location Storage Area 20686b5A (Paragraph [0193]) and displays the data on LCD 201 (FIG. 1) of Device A (S5).

Paragraph [0219]—This Paragraph [0219] illustrate(s) Device B's Location Information Sending/Receiving Software 20686c14A (Paragraph [0195]) of Device A and Device B's Location Information Sending Software 20686c7B (Paragraph [0205]) of Device B, which send the Device B's location data, the Device B's location street address, and the Device B's location phone number to Device A. In the present embodiment, CPU 211 (FIG. 1) of Device B retrieves all time data from Device B's Location Data Storage Area 20686b2B and displays a list of time data on LCD 201 (FIG. 1) of Device B (S1). The user of Device B selects a time data (e.g., Time Data#5) by utilizing Input Device 210 (FIG. 1) or via voice recognition system (S2). CPU 211 of Device B retrieves the corresponding Device B's location data (e.g., Device B's Location Data#5) (S3). CPU 211 of Device B identifies the closest street address location data (e.g., Street Address Location Data#5) stored in Street Address Location Storage Area 20686b4B (Paragraph [0202]) (S4). CPU 211 of Device B retrieves the corresponding street address data (e.g., Street Address Data#5) from Street Address Location Storage Area 20686b4B (Paragraph [0202]) and displays the data on LCD 201 (FIG. 1) of Device B (S5). CPU 211 of Device B identifies the closest phone number location data (e.g., Phone Number Location Data#5) stored in Phone Number Location Storage Area 20686b5B (Paragraph [0203]) (S6). CPU 211 of Device B retrieves the corresponding phone number data (e.g., Phone Number Data#5) from Phone Number Location Storage Area 20686b5B (Paragraph [0203]) and displays the data on LCD 201 (FIG. 1) of Device B (S7). CPU 211 of Device B sends the Device B's location data, the Device B's location street address, and the Device B's location phone number, which are received by Device A (S8).

Paragraph [0220]—<<CCD Dictionary Function>>

Paragraph [0221]—Paragraph [0222] through Paragraph [0241] illustrate(s) the CCD dictionary function which enables the user of Communication Device 200 to utilize Communication Device 200 as a language dictionary.

Paragraph [0222]—This Paragraph [0222] illustrate(s) the storage area included in Host H (Paragraph [0022]). In the present embodiment, Host H includes CCD Dictionary Information Storage Area H87a of which the data and the software programs stored therein are described in Paragraph [0223].

Paragraph [0223]—This Paragraph [0223] illustrate(s) the storage areas included in CCD Dictionary Information Storage Area H87a (Paragraph [0222]). In the present embodiment, CCD Dictionary Information Storage Area H87a includes CCD Dictionary Data Storage Area H87b and CCD Dictionary Software Storage Area H87c. CCD Dictionary Data Storage Area H87b stores the data necessary to implement the present function on the side of Host H (Paragraph [0022]), such as the ones described in Paragraph [0224] through Paragraph [0227]. CCD Dictionary Software Storage Area H87c stores the software programs necessary to implement the present function on the side of Host H, such as the ones described in Paragraph [0228].

Paragraph [0224]—This Paragraph [0224] illustrate(s) the storage areas included in CCD Dictionary Data Storage Area H87b (Paragraph [0223]). In the present embodiment, CCD Dictionary Data Storage Area H87b includes Dictionary Data Storage Area H87b1 and Work Area H87b2. Dictionary Data Storage Area H87b1 stores the data described in Paragraph [0225]. Work Area H87b2 is utilized as a work area to perform calculation and temporarily store data.

Paragraph [0225]—This Paragraph [0225] illustrate(s) the storage areas included in Dictionary Data Storage Area H87b1 (Paragraph [0224]). In the present embodiment, Dictionary Data Storage Area H87b1 includes English/English Dictionary Data Storage Area H87b1a and English/Japanese Dictionary Data Storage Area H87b1b. English/English Dictionary Data Storage Area H87b1a stores the data described in Paragraph [0226]. English/Japanese Dictionary Data Storage Area H87b1b stores the data described in Paragraph [0227].

Paragraph [0226]—This Paragraph [0226] illustrate(s) the data stored in English/English Dictionary Data Storage Area H87b1a (Paragraph [0225]). In the present embodiment, English/English Dictionary Data Storage Area H87b1a comprises two columns, i.e., 'English Term' and 'English Explanation Data'. Column 'English Term' stores the English terms, and each English term represents an English word. Each English term includes alphanumeric data. Column 'English Explanation Data' stores the English explanation data, and each English explanation data represents the explanation in English of the corresponding English term. Each English explanation data includes alphanumeric data. In the present embodiment, English/English Dictionary Data Storage Area H87b1a stores the following data: the English term 'English Term#1' and the corresponding English explanation data 'English Explanation Data#1'; the English term 'English Term#2' and the corresponding English explanation data 'English Explanation Data#2'; the English term 'English Term#3' and the corresponding English explanation data 'English Explanation Data#3'; and the English term 'English Term#4' and the corresponding English explanation data 'English Explanation Data#4'.

Paragraph [0227]—This Paragraph [0227] illustrate(s) the data stored in English/Japanese Dictionary Data Storage Area H87b1b (Paragraph [0225]). In the present embodiment, English/Japanese Dictionary Data Storage Area H87b1b comprises two columns, i.e., 'English Term' and 'Japanese Explanation Data'. Column 'English Term' stores the English terms, and each English term represents an English word. Each English term includes alphanumeric data. The English terms stored in English/Japanese Dictionary Data Storage Area H87b1b (Paragraph [0227]) are identical to the ones stored in English/English Dictionary Data Storage Area H87b1a (Paragraph [0226]). Column 'Japanese Explanation Data' stores the Japanese explanation data, and each Japanese explanation data represents the explanation in Japanese of the corresponding English term. Each Japanese explanation data includes alphanumeric data. In the present embodiment, English/Japanese Dictionary Data Storage Area H87b1b stores the following data: the English term 'English Term#1' and the corresponding Japanese explanation data 'Japanese Explanation Data#1'; the English term 'English Term#2' and the corresponding Japanese explanation data 'Japanese Explanation Data#2'; the English term 'English Term#3' and the corresponding Japanese explanation data 'Japanese Explanation Data#3; and the English term 'English Term#4' and the corresponding Japanese explanation data Japanese Explanation Data#4'.

Paragraph [0228]—This Paragraph [0228] illustrate(s) the software programs stored in CCD Dictionary Software Storage Area H87c (Paragraph [0223]). In the present embodiment, CCD Dictionary Software Storage Area H87c stores Dictionary Data Downloading Software H87c1 and Explanation Data Retrieving Software H87c2. Dictionary Data Downloading Software H87c1 is the software program described in Paragraph [0237]. Explanation Data Retrieving Software H87c2 is the software program described in Paragraph [0238]. Paragraph [0229]—This Paragraph [0229] illustrate(s) the storage area included in RAM 206 (FIG. 1) of Communication Device 200. In the present embodiment, RAM 206 includes CCD Dictionary Information Storage Area 20687a of which the data and the software programs stored therein are described in Paragraph [0231].

Paragraph [0230]—The data and/or the software programs stored in CCD Dictionary Information Storage Area 20687a (Paragraph [0229]) may be downloaded from Host H (Paragraph [0022]) in the manner described in Paragraph [0416] through Paragraph [0422]. Paragraph [0231]—This Paragraph [0231] illustrate(s) the storage areas included in CCD Dictionary Information Storage Area 20687a (Paragraph [0229]). In the present embodiment, CCD Dictionary Information Storage Area 20687a includes CCD Dictionary Data Storage Area 20687b and CCD Dictionary Software Storage Area 20687c. CCD Dictionary Data Storage Area 20687b stores the data necessary to implement the present function on the side of Communication Device 200, such as the ones described in Paragraph [0232] through Paragraph [0235]. CCD Dictionary Software Storage Area 20687c stores the software programs necessary to implement the present function on the side of Communication Device 200, such as the ones described in Paragraph [0236].

Paragraph [0232]—This Paragraph [0232] illustrate(s) the storage areas included in CCD Dictionary Data Storage Area 20687b (Paragraph [0231]). In the present embodiment, CCD Dictionary Data Storage Area 20687b includes Dictionary Data Storage Area 20687b1 and Work Area 20687b2. Dictionary Data Storage Area 20687b1 stores the data described in Paragraph [0233]. Work Area 20687b2 is utilized as a work area to perform calculation and temporarily store data.

Paragraph [0233]—This Paragraph [0233] illustrate(s) the storage areas included in Dictionary Data Storage Area 20687b1 (Paragraph [0232]). In the present embodiment, Dictionary Data Storage Area 20687b1 includes English/English Dictionary Data Storage Area 20687b1a and English/Japanese Dictionary Data Storage Area 20687b1b. English/English Dictionary Data Storage Area 20687b1a stores the data described in Paragraph [0234]. English/Japanese Dictionary Data Storage Area 20687b1b stores the data described in Paragraph [0235].

Paragraph [0234]—This Paragraph [0234] illustrate(s) the data stored in English/English Dictionary Data Storage Area 20687b1a (Paragraph [0233]). In the present embodiment, English/English Dictionary Data Storage Area 20687b1a comprises two columns, i.e., 'English Term' and 'English Explanation Data'. Column 'English Term' stores the English terms, and each English term represents an English word. Each English term includes alphanumeric data. Column 'English Explanation Data' stores the English explanation data, and each English explanation data represents the explanation in English of the corresponding English term. Each English explanation data includes alphanumeric data. In the present embodiment, English/English Dictionary Data Storage Area 20687b1a stores the following data: the English term 'English Term#1' and the corresponding English explanation data 'English Explanation Data#1'; the English term 'English Term#2' and the corresponding English explanation data 'English Explanation Data#2'; the English term 'English Term#3' and the corresponding English explanation data 'English Explanation Data#3'; and the English term 'English Term#4' and the corresponding English explanation data 'English Explanation Data#4'.

Paragraph [0235]—This Paragraph [0235] illustrate(s) the data stored in English/Japanese Dictionary Data Storage Area 20687b1b (Paragraph [0233]). In the present embodiment, English/Japanese Dictionary Data Storage Area 20687b1b comprises two columns, i.e., 'English Term' and 'Japanese Explanation Data'. Column 'English Term' stores the English terms, and each English term represents an English word. Each English term includes alphanumeric data. The English terms stored in English/Japanese Dictionary Data Storage Area 20687b1b (Paragraph [0235]) are identical to the ones stored in English/English Dictionary Data Storage Area 20687b1a (Paragraph [0234]). Column 'Japanese Explanation Data' stores the Japanese explanation data, and each Japanese explanation data represents the explanation in Japanese of the corresponding English term. Each Japanese explanation data includes alphanumeric data. In the present embodiment, English/Japanese Dictionary Data Storage Area 20687b1b stores the following data: the English term 'English Term#1' and the corresponding Japanese explanation data 'Japanese Explanation Data#1'; the English term 'English Term#2' and the corresponding Japanese explanation data 'Japanese Explanation Data#2; the English term 'English Term#3' and the corresponding Japanese explanation data 'Japanese Explanation Data#3'; and the English term 'English Term#4' and the corresponding Japanese explanation data Japanese Explanation Data#4'.

Paragraph [0236]—This Paragraph [0236] illustrate(s) the software programs stored in CCD Dictionary Software Storage Area 20687c (Paragraph [0231]). In the present embodiment, CCD Dictionary Software Storage Area 20687c stores Dictionary Data Downloading Software 20687c1, Explanation Data Retrieving Software 20687c2, and CCD Dictionary Software 20687c3. Dictionary Data Downloading Software 20687c1 is the software program described in Paragraph [0237]. Explanation Data Retrieving Software 20687c2 is the software program described in Paragraph [0238], Paragraph [0240]. CCD Dictionary Software 20687c3 is the software program described in Paragraph [0239], and Paragraph [0241].

Paragraph [0237]—This Paragraph [0237] illustrate(s) Dictionary Data Downloading Software H87c1 (Paragraph [0228]) of Host H (Paragraph [0022]) and Dictionary Data Downloading Software 20687c1 (Paragraph [0236]) of Communication Device 200, which download the data stored in Dictionary Data Storage Area H87b1 (Paragraph [0225]). In the present embodiment, CPU 211 (FIG. 1) of Communication Device 200 sends, in a wireless fashion via Antenna 218 (FIG. 1), a dictionary data downloading request, which is received by Host H (S1). Here, the dictionary data downloading request is a request to download the data stored in Dictionary Data Storage Area H87b1 (Paragraph [0225]) of Host H. In response, Host H retrieves all data from Dictionary Data Storage Area H87b1 (Paragraph [0225]) and sends the data to Communication Device 200 (S2). CPU 211 receives the data and stores them in Dictionary Data Storage Area 20687b1 (Paragraph [0233]) (S3).

Paragraph [0238]—This Paragraph [0238] illustrate(s) Explanation Data Retrieving Software 20687c2 (Paragraph [0236]) of Communication Device 200, which displays on LCD 201 (FIG. 1) the explanations of the English term input by utilizing Input Device 210 (FIG. 1) or via voice recognition system. In the present embodiment, the user of Communication Device 200 inputs an English term (e.g., English Term#1) by utilizing Input Device 210 (FIG. 1) or via voice recognition system (S1). CPU 211 (FIG. 1) of Communication Device 200 searches English/English Dictionary Data Storage Area 20687b1a (Paragraph [0234]) for the matching term (S2). CPU 211 then searches English/Japanese Dictionary Data Storage Area 20687b1b (Paragraph [0235]) for the matching term (S3). CPU 211 stores the corresponding English explanation data (e.g., English Explanation Data#1) in Work Area 20687b2 (Paragraph [0232]) (S4). CPU 211 stores the corresponding Japanese explanation data (e.g., Japanese Explanation Data#1) in Work Area 20687b2 (Paragraph [0232]) (S5). CPU 211 retrieves the corresponding English explanation data (e.g., English Explanation Data#1) and the corresponding Japanese explanation data (e.g., Japanese Explanation Data#1) from Work Area 20687b2 (Paragraph [0232]) and displays both data on LCD 201 (FIG. 1) (S6).

Paragraph [0239]—This Paragraph [0239] illustrate(s) CCD Dictionary Software 20687c3 (Paragraph [0236]) of Communication Device 200, which displays on LCD 201 (FIG. 1) the explanations of the English term input via CCD Unit 214 (FIG. 1). In the present embodiment, CPU 211 (FIG. 1) of Communication Device 200 inputs an image data from CCD Unit 214 (FIG. 1) (S1). CPU 211 stores the image data input In S1 in Work Area 20687b2 (Paragraph [0232]) (S2), and converts the image data to text data and retrieves an English term (e.g., English Term#1) therefrom (S3). CPU 211 searches English/English Dictionary Data Storage Area 20687b1a (Paragraph [0234]) for the matching term (S4). CPU 211 then searches English/Japanese Dictionary Data Storage Area 20687b1b (Paragraph [0235]) for the matching term (S5). CPU 211 stores the corresponding English explanation data (e.g., English Explanation Data#1) in Work Area 20687b2 (Paragraph [0232]) (S6). CPU 211 stores the corresponding Japanese explanation data (e.g., Japanese Explanation Data#1) in Work Area 20687b2 (Paragraph [0232]) (S7). CPU 211 retrieves the corresponding English explanation data and the corresponding Japanese explanation data from Work Area 20687b2 (Paragraph [0232]) and displays both data on LCD 201 (FIG. 1) (S8).

Paragraph [0240]—This Paragraph [0240] illustrate(s) Explanation Data Retrieving Software H87c2 (Paragraph [0228]) of Host H (Paragraph [0022]) and Explanation Data Retrieving Software 20687c2 (Paragraph [0236]) of Communication Device 200, which display on LCD 201 (FIG. 1) the explanations of the English term input by utilizing Input Device 210 (FIG. 1) or via voice recognition system. The explanation data are retrieved from Host H (Paragraph [0022]) in this embodiment. Referring to the present embodiment, the user of Communication Device 200 inputs an English term (e.g., English Term#1) by utilizing Input Device 210 (FIG. 1) or via voice recognition system (S1). CPU 211 (FIG. 1) of Communication Device 200 sends, in a wireless fashion via Antenna 218 (FIG. 1), the English term (e.g., English Term#1) input In S1, which is received by Host H (S2). Host H searches English/English Dictionary Data Storage Area H87b1a (Paragraph [0226]) for the matching term (S3). Host H searches English/Japanese Dictionary Data Storage Area H87b1b (Paragraph [0227]) for the matching term (S4). Host H sends the corresponding English explanation data (e.g., English Explanation Data#1) and the corresponding Japanese explanation data (e.g., Japanese Explanation Data#1), which are received by Communication Device 200 (S5). CPU 211 of Communication Device 200 stores the corresponding English explanation data (e.g., English Explanation Data#1) in Work Area 20687b2 (Paragraph [0232]) (S6). CPU 211 stores the corresponding Japanese explanation data (e.g., Japanese Explanation Data#1) in Work Area 20687b2 (Paragraph [0232]) (S7). CPU 211 retrieves the corresponding English explanation data and the corresponding Japanese explanation data from Work Area 20687b2 (Paragraph [0232]) and displays both data on LCD 201 (FIG. 1) (S8).

Paragraph [0241]—This Paragraph [0241] illustrate(s) Explanation Data Retrieving Software H87c2 (Paragraph [0228]) of Host H (Paragraph [0022]) and CCD Dictionary Software 20687c3 (Paragraph [0236]) of Communication Device 200, which display on LCD 201 (FIG. 1) the explanations of the English term input via CCD Unit 214 (FIG. 1). The explanation data are retrieved from Host H (Paragraph [0022]) in this embodiment. In the present embodiment, CPU 211 (FIG. 1) of Communication Device 200 inputs an image data from CCD Unit 214 (FIG. 1) (S1). CPU 211 stores the image data input In S1 in Work Area 20687b2 (Paragraph [0232]) (S2), and converts the image data to text data and retrieves an English term (e.g., English Term#1) therefrom (S3). CPU 211 sends, in a wireless fashion via Antenna 218 (FIG. 1), the English term (e.g., English Term#1) input In S1, which is received by Host H (S4). Host H searches English/ English Dictionary Data Storage Area H87b1a (Paragraph [0226]) for the matching term (S5). Host H searches English/ Japanese Dictionary Data Storage Area H87b1b (Paragraph [0227]) for the matching term (S6). Host H sends the corresponding English explanation data (e.g., English Explanation Data#1) and the corresponding Japanese explanation data (e.g., Japanese Explanation Data#1), which are received by Communication Device 200 (S7). CPU 211 of Communication Device 200 stores the corresponding English explanation data (e.g., English Explanation Data#1) in Work Area 20687b2 (Paragraph [0232]) (S8). CPU 211 stores the corresponding Japanese explanation data (e.g., Japanese Explanation Data#1) in Work Area 20687b2 (Paragraph [0232]) (S9). CPU 211 retrieves the corresponding English explanation data and the corresponding Japanese explanation data from Work Area 20687b2 (Paragraph [0232]) and displays both data on LCD 201 (FIG. 1) (S10).

Paragraph [0242]—<<Multiple Type TV Program Distributing System>>

Paragraph [0243]—This Paragraph [0243] illustrate(s) the connections between Host H (Paragraph [0022]) and the three broadcast centers, i.e., Satellite TV Broadcast Center 94TVBC1 (Paragraph [0243]), Ground Wave TV Broadcast Center 94TVBC2 (Paragraph [0243]), and Cable TV Broadcast Center 94TVBC3 (Paragraph [0243]). Satellite TV Broadcast Center 94TVBC1 (Paragraph [0243]) is the broadcast center which broadcasts the satellite TV program data. Here, the satellite TV program data is the data distributed from Satellite TV Broadcast Center 94TVBC1 (Paragraph [0243]) which is designed to be output from displays, such as TV monitors. Ground Wave TV Broadcast Center 94TVBC2 (Paragraph [0243]) is the broadcast center which broadcasts the ground wave TV program data. Here, the ground wave TV program data is the data distributed from Ground Wave TV Broadcast Center 94TVBC2 (Paragraph [0243]) which is designed to be output from displays, such as TV monitors. Cable TV Broadcast Center 94TVBC3 (Paragraph [0243]) is the broadcast center which broadcasts the cable TV program data. Here, the cable TV program data is the data distributed from Cable TV Broadcast Center 94TVBC3 (Paragraph [0243]) which is designed to be output from displays, such as TV monitors. The foregoing three broadcast centers broadcast the TV program data in their ordinary manner, and also distribute the same TV program data to Host H via Network NT (e.g., the Internet) in order for Communication Device 200 to display the TV program data by implementing the present system. Host H receives the TV program data from the foregoing three broadcast centers realtime, twenty-four hour a day and seven days a week of which the details are described hereinafter.

Paragraph [0244]—This Paragraph [0244] illustrate(s) another embodiment of the connection between Host H (Paragraph [0022]) and Satellite TV Broadcast Center 94TVBC1 (Paragraph [0243]). Satellite TV Broadcast Center 94TVBC1 (Paragraph [0243]) is the broadcast center which broadcasts the satellite TV program data. Here, the satellite TV program data is the data distributed from Satellite TV Broadcast Center 94TVBC1 (Paragraph [0243]) which is designed to be output from displays, such as TV monitors. Satellite TV Broadcast Center 94TVBC1 (Paragraph [0243]) broadcasts the satellite TV program data in their ordinary manner via Artificial Satellite AS94, which is received by Host H in order for Communication Device 200 to display the satellite TV program data by implementing the present system.

Paragraph [0245]—This Paragraph [0245] illustrate(s) another embodiment of the connection between Host H (Paragraph [0022]) and Ground Wave TV Broadcast Center 94TVBC2 (Paragraph [0243]). Ground Wave TV Broadcast Center 94TVBC2 (Paragraph [0243]) is the broadcast center which broadcasts the ground wave TV program data. Here, the ground wave TV program data is the data distributed from Ground Wave TV Broadcast Center 94TVBC2 (Paragraph [0243]) which is designed to be output from displays, such as TV monitors. Ground Wave TV Broadcast Center 94TVBC2 (Paragraph [0243]) broadcasts the ground wave TV program data in their ordinary manner via Antenna Ant94, which is received by Host H in order for Communication Device 200 to display the ground wave TV program data by implementing the present system and/or the cellular TV function.

Paragraph [0246]—This Paragraph [0246] illustrate(s) another embodiment of the connection between Host H (Paragraph [0022]) and Cable TV Broadcast Center 94TVBC3 (Paragraph [0243]). Cable TV Broadcast Center 94TVBC3 (Paragraph [0243]) is the broadcast center which broadcasts the cable TV program data. Here, the cable TV program data is the data distributed from Cable TV Broadcast Center 94TVBC3 (Paragraph [0243]) which is designed to be output from displays, such as TV monitors. Cable TV Broadcast Center 94TVBC3 (Paragraph [0243]) broadcasts the cable TV program data in their ordinary manner via Cable Cbl94, which is received by Host H in order for Communication Device 200 to display the cable TV program data by implementing the present system and/or the cellular TV function.

Paragraph [0247]—This Paragraph [0247] illustrate(s) the storage area included in Host H (Paragraph [0022]). In the present embodiment, Host H includes Multiple Type TV Program Information Storage Area H94a of which the data and the software programs stored therein are described in Paragraph [0248].

Paragraph [0248]—This Paragraph [0248] illustrate(s) the storage areas included in Multiple Type TV Program Information Storage Area H94a (Paragraph [0247]). In the present embodiment, Multiple Type TV Program Information Storage Area H94a includes Multiple Type TV Program Data Storage Area H94b and Multiple Type TV Program Data Software Storage Area H94c. Multiple Type TV Program Data Storage Area H94b stores the data necessary to implement the present function on the side of Host H (Paragraph [0022]), such as the ones described in Paragraph [0249] through Paragraph [0252]. Multiple Type TV Program Data Software Storage Area H94c stores the software programs necessary to implement the present function on the side of Host H, such as the ones described in Paragraph [0253].

Paragraph [0249]—This Paragraph [0249] illustrate(s) the storage areas included in Multiple Type TV Program Data Storage Area H94b (Paragraph [0248]). In the present embodiment, Multiple Type TV Program Data Storage Area H94b includes Satellite TV Program Data Storage Area H94b1, Ground Wave TV Program Data Storage Area H94b2, Cable TV Program Data Storage Area H94b3, and Work Area H94b4. Satellite TV Program Data Storage Area H94b1 stores the data described in Paragraph [0250]. Ground Wave TV Program Data Storage Area H94b2 stores the data described in Paragraph [0251]. Cable TV Program Data Storage Area H94b3 stores the data described in Paragraph [0252]. Work Area H94b4 is utilized as a work area to perform calculation and temporarily store data.

Paragraph [0250]—This Paragraph [0250] illustrate(s) the data stored in Satellite TV Program Data Storage Area H94b1 (Paragraph [0248]). In the present embodiment, Satellite TV Program Data Storage Area H94b1 comprises two columns, i.e., 'Satellite TV Program ID' and 'Satellite TV Program Data'. Column 'Satellite TV Program ID' stores the satellite TV program IDs, and each satellite TV program ID is an identification of the corresponding satellite TV program data stored in column 'Satellite TV Program Data'. Column 'Satellite TV Program Data' stores the satellite TV program data, and each satellite TV program data is the data received from Satellite TV Broadcast Center 94TVBC1 (Paragraph [0243]). In the present embodiment, Satellite TV Program Data Storage Area H94b1 stores the following data: the satellite TV program ID 'Satellite TV Program#1' and the corresponding satellite TV program data 'Satellite TV Program Data#1'; the satellite TV program ID 'Satellite TV Program#2' and the corresponding satellite TV program data 'Satellite TV Program Data#2'; the satellite TV program ID 'Satellite TV Program#3' and the corresponding satellite TV program data 'Satellite TV Program Data#3'; and the satellite TV program ID 'Satellite TV Program#4' and the corresponding satellite TV program data 'Satellite TV Program Data#4'.

Paragraph [0251]—This Paragraph [0251] illustrate(s) the data stored in Ground Wave TV Program Data Storage Area H94b2 (Paragraph [0248]). In the present embodiment, Ground Wave TV Program Data Storage Area H94b2 comprises two columns, i.e., 'Ground Wave TV Program ID' and 'Ground Wave TV Program Data'. Column 'Ground Wave TV Program ID' stores the ground wave TV program IDs, and each ground wave TV program ID is an identification of the corresponding ground wave TV program data stored in column 'Satellite TV Program Data'. Column 'Ground Wave TV Program Data' stores the ground wave TV program data, and each ground wave TV program data is the data received from Ground Wave TV Broadcast Center 94TVBC2 (Paragraph [0243]). In the present embodiment, Ground Wave TV Program Data Storage Area H94b2 stores the following data: the ground wave TV program ID 'Ground Wave TV Program#1' and the corresponding ground wave TV program data 'Ground Wave TV Program Data#1'; the ground wave TV program ID 'Ground Wave TV Program#2' and the corresponding ground wave TV program data 'Ground Wave TV Program Data#2'; the ground wave TV program ID 'Ground Wave TV Program#3' and the corresponding ground wave TV program data 'Ground Wave TV Program Data#3'; and the ground wave TV program ID 'Ground Wave TV Program#4' and the corresponding ground wave TV program data 'Ground Wave TV Program Data#4'.

Paragraph [0252]—This Paragraph [0252] illustrate(s) the data stored in Cable TV Program Data Storage Area H94b3 (Paragraph [0248]). In the present embodiment, Cable TV Program Data Storage Area H94b3 comprises two columns, i.e., 'Cable TV Program ID' and 'Cable TV Program Data'. Column 'Cable TV Program ID' stores the cable TV program IDs, and each cable TV program ID is an identification of the corresponding cable TV program data stored in column 'Satellite TV Program Data'. Column 'Cable TV Program Data' stores the cable TV program data, and each cable TV program data is the data received from Cable TV Broadcast Center 94TVBC3 (Paragraph [0243]). In the present embodiment, Cable TV Program Data Storage Area H94b3 stores the following data: the cable TV program ID 'Cable TV Program#1' and the corresponding cable TV program data 'Cable TV Program Data#1'; the cable TV program ID 'Cable TV Program#2' and the corresponding cable TV program data 'Cable TV Program Data#2'; the cable TV program ID 'Cable TV Program#3' and the corresponding cable TV program data 'Cable TV Program Data#3'; and the cable TV program ID 'Cable TV Program#4' and the corresponding cable TV program data 'Cable TV Program Data#4'.

Paragraph [0253]—This Paragraph [0253] illustrate(s) the software programs stored in Multiple Type TV Program Data Software Storage Area H94c (Paragraph [0248]). In the present embodiment, Multiple Type TV Program Data Software Storage Area H94c stores Satellite TV Program Data Receiving Software H94c1, Ground Wave TV Program Data Receiving Software H94c2, Cable TV Program Data Receiving Software H94c3, Satellite TV Program Data Sending/Receiving Software H94c4, Ground Wave TV Program Data Sending/Receiving Software H94c5, and Cable TV Program Data Sending/Receiving Software H94c6. Satellite TV Program Data Receiving Software H94c1 is the software program described in Paragraph [0262]. Ground Wave TV Program Data Receiving Software H94c2 is the software program described in Paragraph [0263]. Cable TV Program Data Receiving Software H94c3 is the software program described in Paragraph [0264]. Satellite TV Program Data Sending/Receiving Software H94c4 is the software program described in Paragraph [0265]. Ground Wave TV Program Data Sending/Receiving Software H94c5 is the software program described in Paragraph [0266]. Cable TV Program Data Sending/Receiving Software H94c6 is the software program described in Paragraph [0267].

Paragraph [0254]—This Paragraph [0254] illustrate(s) the storage area included in RAM 206 (FIG. 1) of Communication Device 200. In the present embodiment, RAM 206 includes Multiple Type TV Program Information Storage Area 20694a of which the data and the software programs stored therein are described in Paragraph [0256].

Paragraph [0255]—The data and/or the software programs stored in Multiple Type TV Program Information Storage Area 20694a (Paragraph [0254]) may be downloaded from Host H (Paragraph [0022]) in the manner described in Paragraph [0416] through Paragraph [0422].

Paragraph [0256]—This Paragraph [0256] illustrate(s) the storage areas included in Multiple Type TV Program Information Storage Area 20694a (Paragraph [0254]). In the present embodiment, Multiple Type TV Program Information Storage Area 20694a includes Multiple Type TV Program Data Storage Area 20694b and Multiple Type TV Program Data Software Storage Area 20694c. Multiple Type TV Program Data Storage Area 20694b stores the data necessary to implement the present function on the side of Communication Device 200, such as the ones described in Paragraph [0257] through Paragraph [0260]. Multiple Type TV Program Data Software Storage Area 20694c stores the software programs necessary to implement the present function on the side of Communication Device 200, such as the ones described in Paragraph [0261].

Paragraph [0257]—This Paragraph [0257] illustrate(s) the storage areas included in Multiple Type TV Program Data Storage Area 20694b (Paragraph [0256]). In the present embodiment, Multiple Type TV Program Data Storage Area 20694b includes Satellite TV Program Data Storage Area 20694b1, Ground Wave TV Program Data Storage Area 20694b2, Cable TV Program Data Storage Area 20694b3, and Work Area 20694b4. Satellite TV Program Data Storage Area 20694b1 stores the data described in Paragraph [0258]. Ground Wave TV Program Data Storage Area 20694b2 stores the data described in Paragraph [0259]. Cable TV Program Data Storage Area 20694b3 stores the data described in Paragraph [0260]. Work Area 20694b4 is utilized as a work area to perform calculation and temporarily store data.

Paragraph [0258]—This Paragraph [0258] illustrate(s) the data stored in Satellite TV Program Data Storage Area 20694b1 (Paragraph [0257]). In the present embodiment, Satellite TV Program Data Storage Area 20694b1 comprises two columns, i.e., 'Satellite TV Program ID' and 'Satellite TV Program Data'. Column 'Satellite TV Program ID' stores the satellite TV program IDs, and each satellite TV program ID is an identification of the corresponding satellite TV program data stored in column 'Satellite TV Program Data'. Column 'Satellite TV Program Data' stores the satellite TV program data, and each satellite TV program data is the data received from Host H. In the present embodiment, Satellite TV Program Data Storage Area 20694b1 stores the following data: the satellite TV program ID 'Satellite TV Program#1' and the corresponding satellite TV program data 'Satellite TV Program Data#1'; the satellite TV program ID 'Satellite TV Program#2' and the corresponding satellite TV program data 'Satellite TV Program Data#2'; the satellite TV program ID 'Satellite TV Program#3' and the corresponding satellite TV program data 'Satellite TV Program Data#3'; and the satellite TV program ID 'Satellite TV Program#4' and the corresponding satellite TV program data 'Satellite TV Program Data#4'.

Paragraph [0259]—This Paragraph [0259] illustrate(s) the data stored in Ground Wave TV Program Data Storage Area 20694b2 (Paragraph [0257]). In the present embodiment, Ground Wave TV Program Data Storage Area 20694b2 comprises two columns, i.e., 'Ground Wave TV Program ID' and 'Ground Wave TV Program Data'. Column 'Ground Wave TV Program ID' stores the ground wave TV program IDs, and each ground wave TV program ID is an identification of the corresponding ground wave TV program data stored in column 'Satellite TV Program Data'. Column 'Ground Wave TV Program Data' stores the ground wave TV program data, and each ground wave TV program data is the data received from Host H. In the present embodiment, Ground Wave TV Program Data Storage Area 20694b2 stores the following data: the ground wave TV program ID 'Ground Wave TV Program#1' and the corresponding ground wave TV program data 'Ground Wave TV Program Data#1'; the ground wave TV program ID 'Ground Wave TV Program#2' and the corresponding ground wave TV program data 'Ground Wave TV Program Data#2'; the ground wave TV program ID 'Ground Wave TV Program#3' and the corresponding ground wave TV program data 'Ground Wave TV Program Data#3'; and the ground wave TV program ID 'Ground Wave TV Program#4' and the corresponding ground wave TV program data 'Ground Wave TV Program Data#4'.

Paragraph [0260]—This Paragraph [0260] illustrate(s) the data stored in Cable TV Program Data Storage Area 20694b3 (Paragraph [0257]). In the present embodiment, Cable TV Program Data Storage Area 20694b3 comprises two columns, i.e., 'Cable TV Program ID' and 'Cable TV Program Data'. Column 'Cable TV Program ID' stores the cable TV program IDs, and each cable TV program ID is an identification of the corresponding cable TV program data stored in column 'Satellite TV Program Data'. Column 'Cable TV Program Data' stores the cable TV program data, and each cable TV program data is the data received from Host H. In the present embodiment, Cable TV Program Data Storage Area 20694b3 stores the following data: the cable TV program ID 'Cable TV Program#1' and the corresponding cable TV program data 'Cable TV Program Data#1'; the cable TV program ID 'Cable TV Program#2' and the corresponding cable TV program data 'Cable TV Program Data#2'; the cable TV program ID 'Cable TV Program#3' and the corresponding cable TV program data 'Cable TV Program Data#3'; and the cable TV program ID 'Cable TV Program#4' and the corresponding cable TV program data 'Cable TV Program Data#4'.

Paragraph [0261]—This Paragraph [0261] illustrate(s) the software programs stored in Multiple Type TV Program Data Software Storage Area 20694c (Paragraph [0256]). In the present embodiment, Multiple Type TV Program. Data Software Storage Area 20694c stores Satellite TV Program Data Sending/Receiving Software 20694c1, Ground Wave TV Program Data Sending/Receiving Software 20694c2, and Cable TV Program Data Sending/Receiving Software 20694c3. Satellite TV Program Data Sending/Receiving Software 20694c1 is the software program described in Paragraph [0262]. Ground Wave TV Program Data Sending/Receiving Software 20694c2 is the software program described in Paragraph [0263]. Cable TV Program Data Sending/Receiving Software 20694c3 is the software program described in Paragraph [0264].

Paragraph [0262]—This Paragraph [0262] illustrate(s) Satellite TV Program Data Receiving Software H94c1 (Paragraph [0253]) of Host H (Paragraph [0022]), which receives the satellite TV program data from Satellite TV Broadcast Center 94TVBC1 (Paragraph [0243]). In the present embodiment, Host H receives the satellite TV program data (e.g., Satellite TV Program Data#1 Through #4) from Satellite TV Broadcast Center 94TVBC1 (Paragraph [0243]) (S1). Host H stores the satellite TV program data (e.g., Satellite TV Program Data#1 Through #4) in Satellite TV Program Data Storage Area H94b1 (Paragraph [0250]) (S2). The foregoing sequence is repeated periodically.

Paragraph [0263]—This Paragraph [0263] illustrate(s) Ground Wave TV Program Data Receiving Software H94c2 (Paragraph [0253]) of Host H (Paragraph [0022]), which receives the ground wave TV program data from Ground Wave TV Broadcast Center 94TVBC2 (Paragraph [0243]). In the present embodiment, Host H receives the ground wave TV program data (e.g., Ground Wave TV Program Data#1 Through #4) from Ground Wave TV Broadcast Center 94TVBC2 (Paragraph [0243]) (S1). Host H stores the ground wave TV program data (e.g., Ground Wave TV Program Data#1 Through #4) in Ground Wave TV Program Data Storage Area H94b2 (Paragraph [0251]) (S2). The foregoing sequence is repeated periodically.

Paragraph [0264]—This Paragraph [0264] illustrate(s) Cable TV Program Data Receiving Software H94c3 (Paragraph [0253]) of Host H (Paragraph [0022]), which receives the cable TV program data from Cable TV Broadcast Center 94TVBC3 (Paragraph [0243]). In the present embodiment, Host H receives the cable TV program data (e.g., Cable TV Program Data#1 Through #4) from Cable TV Broadcast Center 94TVBC3 (Paragraph [0243]) (S1). Host H stores the cable TV program data (e.g., Cable TV Program Data#1 Through #4) in Cable TV Program Data Storage Area H94b3 (Paragraph [0252]) (S2). The foregoing sequence is repeated periodically.

Paragraph [0265]—This Paragraph [0265] illustrate(s) Satellite TV Program Data Sending/Receiving Software H94c4 (Paragraph [0253]) of Host H (Paragraph [0022]) and Satellite TV Program Data Sending/Receiving Software 20694c1 (Paragraph [0261]) of Communication Device 200, which sends and receives the satellite TV program data. In the present embodiment, Host H retrieves all satellite TV program data (e.g., Satellite TV Program Data#1 Through #4) from Satellite TV Program Data Storage Area H94b1 (Paragraph [0250]) and sends the data to Communication Device 200 (S1). CPU 211 (FIG. 1) of Communication Device 200 receives the satellite TV program data (e.g., Satellite TV Program Data#1 Through #4) from Host H via Antenna 218 (FIG. 1) (S2). CPU 211 stores the satellite TV program data (e.g., Satellite TV Program Data#1 Through #4) in Satellite TV Program Data Storage Area 20694b1 (Paragraph [0258]) (S3). The foregoing sequence is repeated periodically.

Paragraph [0266]—This Paragraph [0266] illustrate(s) Ground Wave TV Program Data Sending/Receiving Software H94c5 (Paragraph [0253]) of Host H (Paragraph [0022]) and Ground Wave TV Program Data Sending/Receiving Software 20694c2 (Paragraph [0261]) of Communication Device 200, which sends and receives the ground wave TV program data. In the present embodiment, Host H retrieves all ground wave TV program data (e.g., Ground Wave TV Program Data#1 Through #4) from Ground Wave TV Program Data Storage Area H94b2 (Paragraph [0251]) and sends the data to Communication Device 200 (S1). CPU 211 (FIG. 1) of Communication Device 200 receives the ground wave TV program data (e.g., Ground Wave TV Program Data#1 Through #4) from Host H (Paragraph [0022]) (S2). CPU 211 stores the ground wave TV program data (e.g., Ground Wave TV Program Data#1 Through #4) in Ground Wave TV Program Data Storage Area 20694b2 (Paragraph [0259]) (S3). The foregoing sequence is repeated periodically.

Paragraph [0267]—This Paragraph [0267] illustrate(s) Cable TV Program Data Sending/Receiving Software H94c6 (Paragraph [0253]) of Host H (Paragraph [0022]) and Cable TV Program Data Sending/Receiving Software 20694c3 (Paragraph [0261]) of Communication Device 200, which sends and receives the cable TV program data. In the present embodiment, Host H retrieves all cable TV program data (e.g., Cable TV Program Data#1 Through #4) from Cable TV Program Data Storage Area H94b3 (Paragraph [0252]) and sends the data to Communication Device 200 (S1). CPU 211 (FIG. 1) of Communication Device 200 receives the cable TV program data (e.g., Cable TV Program Data#1 Through #4) from Host H (Paragraph [0022]) (S2). CPU 211 stores the cable TV program data (e.g., Cable TV Program Data#1 Through #4) in Cable TV Program Data Storage Area 20694b3 (Paragraph [0260]) (S3). The foregoing sequence is repeated periodically.

Paragraph [0268]—<<Multiple TV Screen Displaying Function>>

Paragraph [0269]—Paragraph [0270] through Paragraph [0295] illustrate(s) the multiple TV screen displaying function which displays a plurality of TV screen on LCD 201 (FIG. 1) of Communication Device 200 wherein each TV screen displays a TV program, and the user of Communication Device 200 is enabled to select a TV program to watch therefrom.

Paragraph [0270]—This Paragraph [0270] illustrate(s) the storage area included in RAM 206 (FIG. 1) of Communication Device 200. In the present embodiment, RAM 206 includes Multiple TV Screen Displaying Information Storage Area 20695a of which the data and the software programs stored therein are described in Paragraph [0272].

Paragraph [0271]—The data and/or the software programs stored in Multiple TV Screen Displaying Information Storage Area 20695a (Paragraph [0270]) may be downloaded from Host H (Paragraph [0022]) in the manner described in Paragraph [0416] through Paragraph [0422].

Paragraph [0272]—This Paragraph [0272] illustrate(s) the storage areas included in Multiple TV Screen Displaying Information Storage Area 20695a (Paragraph [0270]). In the present embodiment, Multiple TV Screen Displaying Information Storage Area 20695a includes Multiple TV Screen Displaying Data Storage Area 20695b and Multiple TV Screen Displaying Software Storage Area 20695c. Multiple TV Screen Displaying Data Storage Area 20695b stores the data necessary to implement the present function on the side of Communication Device 200, such as the ones described in Paragraph [0273] through Paragraph [0276]. Multiple TV Screen Displaying Software Storage Area 20695c stores the software programs necessary to implement the present function on the side of Communication Device 200, such as the ones described in Paragraph [0277].

Paragraph [0273]—This Paragraph [0273] illustrate(s) the storage areas included in Multiple TV Screen Displaying Data Storage Area 20695b (Paragraph [0272]). In the present embodiment, Multiple TV Screen Displaying Data Storage Area 20695b includes TV Program Data Storage Area 20695b1, Multiple TV Screen Data Storage Area 20695b2, and Work Area 20695b3. TV Program Data Storage Area 20695b1 stores the data described in Paragraph [0274]. Multiple TV Screen Data Storage Area 20695b2 stores the data described in Paragraph [0275]. Work Area 20695b3 is utilized as a work area to perform calculation and temporarily store data.

Paragraph [0274]—This Paragraph [0274] illustrate(s) the data stored in TV Program Data Storage Area 20695b1 (Paragraph [0273]). In the present embodiment, TV Program Data Storage Area 20695b1 comprises two columns, i.e., 'TV Program ID' and 'TV Program Data'. Column 'TV Program ID' stores the TV program IDs, and each TV program ID is an identification of the corresponding TV program data stored in column 'TV Program Data'. Column 'TV Program Data' stores the TV program data, and each TV program data is a TV program data including audiovisual data designed to be output from LCD 201 (FIG. 1) and Speaker 216 (FIG. 1) of Communication Device 200. Here, the TV program data may be of the data utilized and/or may be stored in Communication Device 200 in the manner described in the function(s) and/or system(s) described in this specification, such as the multiple type TV program distributing system (Paragraph [0243] through Paragraph [0267]). In the present embodiment, TV Program Data Storage Area 20695b1 stores the following data: the TV program ID 'TV Program#1' and the corresponding TV program data 'TV Program Data#1'; the TV program ID 'TV Program#2' and the corresponding TV program data 'TV Program Data#2'; the TV program ID 'TV Program#3' and the corresponding TV program data 'TV Program Data#3; and the TV program ID TV Program#4' and the corresponding TV program data 'TV Program Data#4'.

Paragraph [0275]—This Paragraph [0275] illustrate(s) the data stored in Multiple TV Screen Data Storage Area 20695b2 (Paragraph [0273]). In the present embodiment, Multiple TV Screen Data Storage Area 20695b2 comprises two columns, i.e., 'Cell ID' and 'TV Program Data Displaying Cell'. Column 'Cell ID' stores the cell IDs, and each cell ID is an identification of the corresponding TV program data displaying cell stored in column TV Program Data Displaying Cell'. Column 'TV Program Data Displaying Cell' stores the TV program data displaying cell, and each TV program data displaying cell is the area in which a TV program data stored in TV Program Data Storage Area 20695b1 (Paragraph [0274]) is temporary stored and from which the TV program data is retrieved for purposes of being displayed on LCD 201 (FIG. 1) of Communication Device 200. In the present embodiment, Multiple TV Screen Data Storage Area 20695b2 stores the following data: the cell ID 'Cell#1' and the corresponding TV program data displaying cell TV Program Data Displaying Cell#1; the cell ID 'Cell#2' and the corresponding TV program data displaying cell 'TV Program Data Displaying Cell#2'; the cell ID 'Cell#3' and the corresponding TV program data displaying cell 'TV Program Data Displaying Cell#3'; and the cell ID 'Cell#4' and the corresponding TV program data displaying cell 'TV Program Data Displaying Cell#4'.

Paragraph [0276]—This Paragraph [0276] illustrate(s) the location of each TV program data displaying cell described in the previous embodiment. In the present embodiment, each TV program data displaying cell is arranged in a matrix fashion.

Paragraph [0277]—This Paragraph [0277] illustrate(s) the software programs stored in Multiple TV Screen Displaying Software Storage Area 20695c (Paragraph [0272]). In the present embodiment, Multiple TV Screen Displaying Software Storage Area 20695c stores Multiple TV Program Retrieving Software 20695c1, Multiple TV Program Displaying Software 20695c2, TV Program Selecting Software 20695c3, and Multiple TV Program Matrix Data Displaying Software 20695c5. Multiple TV Program Retrieving Software 20695c1 is the software program described in Paragraph [0278]. Multiple TV Program Displaying Software 20695c2 is the software program described in Paragraph [0280]. TV Program Selecting Software 20695c3 is the software program described in Paragraph [0281]. Multiple TV Program Matrix Data Displaying Software 20695c5 is the software program described in Paragraph [0293].

Paragraph [0278]—This Paragraph [0278] illustrate(s) Multiple TV Program Retrieving Software 20695c1 (Paragraph [0277]) of Communication Device 200, which retrieves all TV program data from TV Program Data Storage Area 20695b1 (Paragraph [0274]). In the present embodiment, CPU 211 (FIG. 1) of Communication Device 200 retrieves TV Program Data#1 through #4 from TV Program Data Storage Area 20695b1 (Paragraph [0274]) (S1). CPU 211 stores TV Program Data#1 in TV Program Data Displaying Cell#1 of Multiple TV Screen Data Storage Area 20695b2 (Paragraph [0275]) (S2). CPU 211 stores TV Program Data#2 in TV Program Data Displaying Cell#2 of Multiple TV Screen Data Storage Area 20695b2 (Paragraph [0275]) (S3). CPU 211 stores TV Program Data#3 in TV Program Data Displaying Cell#3 of Multiple TV Screen Data Storage Area 20695b2 (Paragraph [0275]) (S4). CPU 211 stores TV Program Data#4 in TV Program Data Displaying Cell#4 of Multiple TV Screen Data Storage Area 20695b2 (Paragraph [0275]) (S5).

Paragraph [0279]—This Paragraph [0279] illustrate(s) the display areas at which the TV program data are displayed. In the present embodiment, each TV program data stored in Multiple TV Screen Data Storage Area 20695b2 (Paragraph [0275]) is retrieved and displayed on LCD 201 (FIG. 1) of Communication Device 200 in a matrix fashion. Namely, TV Program Data#1 stored in TV Program Data Displaying Cell#1 of Multiple TV Screen Data Storage Area 20695b2 (Paragraph [0275]) is displayed at Display Area 20195a; TV Program Data#2 stored in TV Program Data Displaying Cell#2 of Multiple TV Screen Data Storage Area 20695b2 is displayed at Display Area 20195b; TV Program Data#3 stored in TV Program Data Displaying Cell#3 of Multiple TV Screen Data Storage Area 20695b2 is displayed at Display Area 20195c; and TV Program Data#4 stored in TV Program Data Displaying Cell#4 of Multiple TV Screen Data Storage Area 20695b2 is displayed at Display Area 20195d.

Paragraph [0280]—This Paragraph [0280] illustrate(s) Multiple TV Program Displaying Software 20695c2 (Paragraph [0277]) of Communication Device 200, which displays the TV program data stored in Multiple TV Screen Data Storage Area 20695b2 (Paragraph [0275]) in a matrix fashion. In the present embodiment, CPU 211 (FIG. 1) of Communication Device 200 retrieves TV Program Data#1 from TV Program Data Displaying WW1 of Multiple TV Screen Data Storage Area 20695b2 (Paragraph [0275]) and displays the data at Display Area 20195a (Paragraph [0279]) (S1). CPU 211 retrieves TV Program Data#2 from TV Program Data Displaying Cell#2 of Multiple TV Screen Data Storage Area 20695b2 (Paragraph [0275]) and displays the data at Display Area 20195b (Paragraph [0279]) (S2). CPU 211 retrieves TV Program Data#3 from TV Program Data Displaying Cell#3 of Multiple TV Screen Data Storage Area 20695b2 (Paragraph [0275]) and displays the data at Display Area 20195c (Paragraph [0279]) (S3). CPU 211 retrieves TV Program Data#4 from TV Program Data Displaying Cell#4 of Multiple TV Screen Data Storage Area 20695b2 (Paragraph [0275]) and displays the data at Display Area 20195d (Paragraph [0279]) (S4).

Paragraph [0281]—This Paragraph [0281] illustrate(s) TV Program Selecting Software 20695c3 (Paragraph [0277]) of Communication Device 200, which selects a TV program in order for the TV program to be displayed on LCD 201 (FIG. 1) in full screen. Referring to the present embodiment, the user of Communication Device 200 selects a display area (e.g., Display Area 20195a) by utilizing Input Device 210 (FIG. 1) or via voice recognition system (S1). CPU 211 (FIG. 1) of Communication Device 200 displays the TV program data (e.g., TV Program Data#1) displayed in display area (e.g., Display Area 20195a) selected in S1 in full screen (S2).

Paragraph [0282]—<<Multiple TV Screen Displaying Function—Another Embodiment>>

Paragraph [0283]—Paragraph [0284] through Paragraph [0295] illustrate(s) another embodiment, wherein Host H (Paragraph [0022]) plays a major role in implementing the present function.

Paragraph [0284]—This Paragraph [0284] illustrate(s) the storage area included in Host H (Paragraph [0022]). In the present embodiment, Host H includes Multiple TV Screen Displaying Information Storage Area H95a of which the data and the software programs stored therein are described in Paragraph [0285].

Paragraph [0285]—This Paragraph [0285] illustrate(s) the storage areas included in Multiple TV Screen Displaying Information Storage Area H95a (Paragraph [0284]). In the present embodiment, Multiple TV Screen Displaying Information Storage Area H95a includes Multiple TV Screen Displaying Data Storage Area H95b and Multiple TV Screen Displaying Software Storage Area H95c. Multiple TV Screen Displaying Data Storage Area H95b stores the data necessary to implement the present function on the side of Host H (Paragraph [0022]), such as the ones described in Paragraph [0286] through Paragraph [0289]. Multiple TV Screen Displaying Software Storage Area H95c stores the software programs necessary to implement the present function on the side of Host H, such as the ones described in Paragraph [0290].

Paragraph [0286]—This Paragraph [0286] illustrate(s) the storage areas included in Multiple TV Screen Displaying Data Storage Area H95b (Paragraph [0285]). In the present embodiment, Multiple TV Screen Displaying Data Storage Area H95b includes TV Program Data Storage Area H95b1, Multiple TV Screen Data Storage Area H95b2, and Work Area H95b3. TV Program Data Storage Area H95b1 stores the data described in Paragraph [0287]. Multiple TV Screen Data Storage Area H95b2 stores the data described in Paragraph [0288]. Work Area H95b3 is utilized as a work area to perform calculation and temporarily store data.

Paragraph [0287]—This Paragraph [0287] illustrate(s) the data stored in TV Program Data Storage Area H95b1 (Paragraph [0286]). In the present embodiment, TV Program Data Storage Area H95b1 comprises two columns, i.e., 'TV Program ID' and TV Program Data'. Column 'TV Program ID' stores the TV program IDs, and each TV each TV program ID is an identification of the corresponding TV program data stored in column 'TV Program Data'. Column 'TV Program Data' stores the TV program data, and each TV program data is a TV program data including audiovisual data designed to be output from LCD 201 (FIG. 1) and Speaker 216 (FIG. 1) of Communication Device 200. Here, the TV program data may be of the data utilized and/or may be stored in Host H (Paragraph [0022]) in the manner described in the function(s) and/or system(s) described in this specification, such as the multiple type TV program distributing system (Paragraph [0243] through Paragraph [0267]). In the present embodiment, TV Program Data Storage Area H95b1 stores the following data: the TV program ID 'TV Program#1' and the corresponding TV program data 'TV Program Data#1'; the TV program ID 'TV Program#2' and the corresponding TV program data 'TV Program Data#2'; the TV program ID 'TV Program#3' and the corresponding TV program data 'TV Program Data#3'; and the TV program ID 'TV Program#4' and the corresponding TV program data 'TV Program Data#4'.

Paragraph [0288]—This Paragraph [0288] illustrate(s) the data stored in Multiple TV Screen Data Storage Area H95b2 (Paragraph [0286]). In the present embodiment, Multiple TV Screen Data Storage Area H95b2 comprises two columns, i.e., 'Cell ID' and 'TV Program Data Displaying Cell'. Column 'Cell ID' stores the cell IDs, and each cell ID is an identification of the corresponding TV program data displaying cell stored in column 'TV Program Data Displaying Cell'. Column 'TV Program Data Displaying Cell' stores the TV program data displaying cell, and each TV program data displaying cell is the area in which a TV program data stored in TV Program Data Storage Area H95b1 (Paragraph [0287]) is temporary stored and from which the TV program data is retrieved for purposes of being displayed on LCD 201 (FIG. 1) of Communication Device 200. In the present embodiment, Multiple TV Screen Data Storage Area H95b2 stores the following data: the cell ID 'Cell#1' and the corresponding TV program data displaying cell 'TV Program Data Displaying Cell#1'; the cell ID 'Cell#2' and the corresponding TV program data displaying cell 'TV Program Data Displaying Cell#2'; the cell ID 'Cell#3' and the corresponding TV program data displaying cell 'TV Program Data Displaying Cell#3'; and the cell ID 'Cell#4' and the corresponding TV program data displaying cell 'TV Program Data Displaying Cell#4'.

Paragraph [0289]—This Paragraph [0289] illustrate(s) the location of each TV program data displaying cell described in the previous embodiment. In the present embodiment, each TV program data displaying cell is arranged in a matrix fashion.

Paragraph [0290]—This Paragraph [0290] illustrate(s) the software programs stored in Multiple TV Screen Displaying Software Storage Area H95c (Paragraph [0285]). In the present embodiment, Multiple TV Screen Displaying Software Storage Area H95c stores Multiple TV Program Retrieving Software H95c1, TV Program Selecting Software H95c3, Multiple TV Program Matrix Data Producing Software H95c4, and Multiple TV Program Matrix Data Displaying Software H95c5. Multiple TV Program Retrieving Software H95c1 is the software program described in Paragraph [0291]. TV Program Selecting Software H95c3 is the software program described in Paragraph [0295]. Multiple TV Program Matrix Data Producing Software H95c4 is the software program described in Paragraph [0292]. Multiple TV Program Matrix Data Displaying Software H95c5 is the software program described in Paragraph [0293].

Paragraph [0291]—This Paragraph [0291] illustrate(s) Multiple TV Program Retrieving Software H95c1 (Paragraph [0290]) of Host H (Paragraph [0022]), which retrieves all TV program data from TV Program Data Storage Area H95b1 (Paragraph [0287]). In the present embodiment, Host H retrieves TV Program Data#1 through #4 from TV Program Data Storage Area H95b1 (Paragraph [0287]) (S1). Host H stores TV Program Data#1 in TV Program Data Displaying Cell#1 of Multiple TV Screen Data Storage Area H95b2 (Paragraph [0288]) (S2). Host H stores TV Program Data#2 in TV Program Data Displaying Cell#2 of Multiple TV Screen Data Storage Area H95b2 (Paragraph [0288]) (S3). Host H stores TV Program Data#3 in TV Program Data Displaying Cell#3 of Multiple TV Screen Data Storage Area H95b2 (Paragraph [0288]) (S4). Host H stores TV Program Data#4 in TV Program Data Displaying Cell#4 of Multiple TV Screen Data Storage Area H95b2 (Paragraph [0288]) (S5). The foregoing sequence is repeated periodically.

Paragraph [0292]—This Paragraph [0292] illustrate(s) Multiple TV Program Matrix Data Producing Software H95c4 (Paragraph [0290]) of Host H (Paragraph [0022]), which displays the TV program data stored in Multiple TV Screen Data Storage Area H95b2 (Paragraph [0288]) in a matrix fashion. In the present embodiment, Host H retrieves TV Program Data#1 from TV Program Data Displaying Cell#1 of Multiple TV Screen Data Storage Area H95b2 (Paragraph [0288]) (S1). Host H retrieves TV Program Data#2 from TV Program Data Displaying Cell#2 of Multiple TV Screen Data Storage Area H95b2 (Paragraph [0288]) (S2). Host H retrieves TV Program Data#3 from TV Program Data Displaying Cell#3 of Multiple TV Screen Data Storage Area H95b2 (Paragraph [0288]) (S3). Host H retrieves TV Program Data#4 from TV Program Data Displaying Cell#4 of Multiple TV Screen Data Storage Area H95b2 (Paragraph [0288]) (S4). Host H produces a multiple TV program matrix data and stores the data in Work Area H95b3 (Paragraph [0286]) (S5). Here, the multiple TV program matrix data is a visual data produced by composing TV Program Data#1 through #4 into one screen data designed to be displayed on LCD 201 (FIG. 1) as described in Paragraph [0294]. The foregoing sequence is repeated periodically.

Paragraph [0293]—This Paragraph [0293] illustrate(s) Multiple TV Program Matrix Data Displaying Software H95c5 (Paragraph [0290]) of Host H (Paragraph [0022]) and Multiple TV Program Matrix Data Displaying Software 20695c5 (Paragraph [0277]) of Communication Device 200, which display the multiple TV program matrix data on LCD 201 (FIG. 1). In the present embodiment, Host H retrieves the multiple TV program matrix data from Work Area H95b3 (Paragraph [0286]) and sends the data to Communication Device 200 (S1). CPU 211 (FIG. 1) of Communication Device 200 receives the multiple TV program matrix data from Host H and stores the data in Work Area 20695b3 (Paragraph [0273]) (S2). The foregoing sequence is repeated periodically.

Paragraph [0294]—This Paragraph [0294] illustrate(s) the multiple TV program matrix data displayed on LCD 201 (FIG. 1). In the present embodiment, the TV program data stored in Multiple TV Screen Data Storage Area H95b2 of Host H (Paragraph [0022]) are displayed on LCD 201 (FIG. 1) of Communication Device 200 in a matrix fashion. Namely, TV Program Data#1 stored in TV Program Data Displaying Cell#1 of Multiple TV Screen Data Storage Area H95b2 (Paragraph [0288]) is displayed at Display Area 20195a; TV Program Data#2 stored in TV Program Data Displaying Cell#2 of Multiple TV Screen Data Storage Area H95b2 is displayed at Display Area 20195b; TV Program Data#3 stored in TV Program Data Displaying Cell#3 of Multiple TV Screen Data Storage Area H95b2 is displayed at Display Area 20195c; and TV Program Data#4 stored in TV Program Data Displaying Cell#4 of Multiple TV Screen Data Storage Area H95b2 is displayed at Display Area 20195d.

Paragraph [0295]—This Paragraph [0295] illustrate(s) TV Program Selecting Software H95c3 (Paragraph [0290]) of Host H (Paragraph [0022]) and TV Program Selecting Software 20695c3 (Paragraph [0277]) of Communication Device 200, which select a TV program in order for the TV program to be displayed on LCD 201 (FIG. 1) in full screen. In the present embodiment, the user of Communication Device 200 selects a display area (e.g., Display Area 20195a) by utilizing Input Device 210 (FIG. 1) or via voice recognition system (S1). CPU 211 (FIG. 1) of Communication Device 200 sends a selected display area signal, which is received by Host H (S2). Here, the selected display area signal is a signal identifying the display area (e.g., Display Area 20195a) selected in the previous step. Host H identifies the corresponding TV program data (e.g., TV Program Data#1) and retrieves the data which is sent to Communication Device 200 (S3). CPU 211 receives the TV program data (e.g., TV Program Data#1) and stores the data in Work Area 20695b3 (Paragraph [0273]) (S4). CPU 211 retrieves the TV program data (e.g., TV Program Data#1) from Work Area 20695b3 (Paragraph [0273]) and displays the data on LCD 201 (FIG. 1) in full screen (S5).

Paragraph [0296]—<<Communication Device Finding Function>>

Paragraph [0297]—This Paragraph [0297] illustrate(s) the storage area included in RAM 206 (FIG. 1) of Communication Device 200. In the present embodiment, RAM 206 includes Communication Device Finding Information Storage Area 20697a of which the data and the software programs stored therein are described in Paragraph [0299].

Paragraph [0298]—The data and/or the software programs stored in Communication Device Finding Information Storage Area 20697a (Paragraph [0297]) may be downloaded from Host H (Paragraph [0022]) in the manner described in Paragraph [0416] through Paragraph [0422].

Paragraph [0299]—This Paragraph [0299] illustrate(s) the storage areas included in Communication Device Finding Information Storage Area 20697a (Paragraph [0297]). In the present embodiment, Communication Device Finding Information Storage Area 20697a includes Communication Device Finding Data Storage Area 20697b and Communication Device Finding Software Storage Area 20697c. Communication Device Finding Data Storage Area 20697b stores the data necessary to implement the present function, such as the ones described in Paragraph [0300]. Communication Device Finding Software Storage Area 20697c stores the software programs necessary to implement the present function, such as the ones described in Paragraph [0301].

Paragraph [0300]—This Paragraph [0300] illustrate(s) the storage areas included in Communication Device Finding Data Storage Area 20697b (Paragraph [0299]). In the present embodiment, Communication Device Finding Data Storage Area 20697b includes User's Voice Wave Data Storage Area 20697b1, User's Voice Pattern Data Storage Area 20697b2, User's Phrase Data Storage Area 20697b3, Responding Sound Data Storage Area 20697b4, and Work Area 20697b5. User's Voice Wave Data Storage Area 20697b1 stores the user's voice wave data. Here, the user's voice wave data is the wave data of the voice of the user of Communication Device 200. User's Voice Pattern Data Storage Area 20697b2 stores the user's voice pattern data. Here, the user's voice pattern data is the voice pattern data of the user of Communication Device 200. The voice pattern data is same or similar to voice print which is unique to each user. User's Phrase Data Storage Area 20697b3 stores the user's phrase data. Here, the user's phrase data is primarily composed of alphanumeric data. The phrase data may be a word or a sentence determined by the user of Communication Device 200. In the present example, a phrase 'Where are you, Communication Device 200?' is stored in User's Phrase Data Storage Area 20697b3. Responding Sound Data Storage Area 20697b4 stores the responding sound data. Here the responding sound data is the sound data designed to be output via Speaker 216 (FIG. 1) for responding purposes. The responding sound data may be any data which may be output from Speaker 216. Work Area 20697b5 is utilized as a work area to perform calculation and temporarily store data.

Paragraph [0301]—This Paragraph [0301] illustrate(s) the software programs stored in Communication Device Finding Software Storage Area 20697c (Paragraph [0299]). In the present embodiment, Communication Device Finding Software Storage Area 20697c stores User's Voice Wave Data Analyzing Software 20697c1 and Responding Sound Data Outputting Software 20697c2. User's Voice Wave Data Analyzing Software 20697c1 is the software program described in Paragraph [0302]. Responding Sound Data Outputting Software 20697c2 is the software program described in Paragraph [0303] and Paragraph [0304].

Paragraph [0302]—This Paragraph [0302] illustrate(s) User's Voice Wave Data Analyzing Software 20697c1 (Paragraph [0301]) of Communication Device 200, which retrieves the user's voice pattern data and the user's phrase data from the user's voice wave data. In the present embodiment, the user of Communication Device 200 inputs the user's voice wave data via Microphone 215 (FIG. 1) (S1). CPU 211 (FIG. 1) of Communication Device 200 stores the user's voice wave data in User's Voice Wave Data Storage Area 20697b1 (Paragraph [0300]) (S2). CPU 211 retrieves the user's voice pattern data from the user's voice wave data, and stores the data in User's Voice Pattern Data Storage Area 20697b2 (Paragraph [0300]) (S3). CPU 211 retrieves the user's phrase data by voice recognition system, and stores the data in User's Phrase Data Storage Area 20697b3 (Paragraph [0300]) (S4).

Paragraph [0303]—This Paragraph [0303] illustrate(s) Responding Sound Data Outputting Software 20697c2 (Paragraph [0301]) of Communication Device 200, which outputs the responding sound data when a predetermined user's voice data is detected. In the present embodiment, CPU 211 (FIG. 1) of Communication Device 200 retrieves the general sound data via Microphone 215 (FIG. 1) (S1). CPU 211 stores the general sound data retrieved in the previous step in Work Area 20697b5 (Paragraph [0300]) (S2). CPU 211 retrieves the pattern data from the general sound data, and compares the data with the user's voice pattern data stored in User's Voice Pattern Data Storage Area 20697b2 (Paragraph [0300]) (S3). If the pattern data of the general sound data substantially matches with the user's voice pattern data, CPU 211 retrieves the alphanumeric data therefrom by utilizing voice recognition system described hereinbefore (S4). CPU 211 compares the alphanumeric data retrieved in the previous step with the user's phrase data stored in User's Phrase Data Storage Area 20697b3 (Paragraph [0300]) (S5). If the two data in the previous step substantially matches, CPU 211 retrieves the responding sound data from Responding Sound Data Storage Area 20697b4 (Paragraph [0300]), and outputs the responding sound data from Speaker 216 (FIG. 1) with maximum volume (S6). The foregoing sequence is repeated periodically.

Paragraph [0304]—This Paragraph [0304] illustrate(s) Responding Sound Data Outputting Software 20697c2 (Paragraph [0301]) of Communication Device 200, which outputs the responding sound data when a predetermined user's voice data is detected. The present embodiment illustrate(s) another embodiment of Responding Sound Data Outputting Software 20697c2 described in the previous embodiment. In the present embodiment, CPU 211 (FIG. 1) of Communication Device 200 retrieves the general sound data via Microphone 215 (FIG. 1) (S1). CPU 211 stores the general sound data retrieved in the previous step in Work Area 20697b5 (Paragraph [0300]) (S2). CPU 211 retrieves the general sound data from Work Area 20697b5 (Paragraph [0300]), and compares the data with the user's voice wave data stored in User's Voice Wave Data Storage Area 20697b1 (Paragraph [0300]) (S3). If the two data in the previous step substantially matches, CPU 211 retrieves the responding sound data from Responding Sound Data Storage Area 20697b4 (Paragraph [0300]), and outputs the responding sound data from Speaker 216 (FIG. 1) with maximum volume (S4). The foregoing sequence is repeated periodically.

Paragraph [0305]—<<Product Information Retrieving Function (CCD)>>

Paragraph [0306]—Paragraph [0307] through Paragraph [0327] illustrate(s) the product information retrieving function wherein an image data attached to a product (such as the one sold in a supermarket) is input via CCD Unit 214 (FIG. 1) and a product data relating to the product is displayed on LCD 201 (FIG. 1) of Communication Device 200.

Paragraph [0307]—This Paragraph [0307] illustrate(s) the storage area included in Host H (Paragraph [0022]). In the present embodiment, Host H includes Product Information Retrieving Information Storage Area H99a of which the data and the software programs stored therein are described in Paragraph [0308].

Paragraph [0308]—This Paragraph [0308] illustrate(s) the storage areas included in Product Information Retrieving Information Storage Area H99a (Paragraph [0307]). In the present embodiment, Product Information Retrieving Information Storage Area H99a includes Product Information Retrieving Data Storage Area H99b and Product Information Retrieving Software Storage Area H99c. Product Information Retrieving Data Storage Area H99b stores the data necessary to implement the present function on the side of Host H (Paragraph [0022]), such as the ones described in Paragraph [0309] through Paragraph [0311]. Product Information Retrieving Software Storage Area H99c stores the software programs necessary to implement the present function on the side of Host H, such as the ones described in Paragraph [0312].

Paragraph [0309]—This Paragraph [0309] illustrate(s) the storage areas included in Product Information Retrieving Data Storage Area H99b (Paragraph [0308]). In the present embodiment, Product Information Retrieving Data Storage Area H99b includes Product Data Storage Area H99b1, Encrypted Image Data Storage Area H99b2, and Work Area H99b3. Product Data Storage Area H99b1 stores the data described in Paragraph [0310]. Encrypted Image Data Storage Area H99b2 stores the data described in Paragraph [0311]. Work Area H99b3 is utilized as a work area to perform calculation and temporarily store data.

Paragraph [0310]—This Paragraph [0310] illustrate(s) the data stored in Product Data Storage Area H99b1 (Paragraph [0309]). In the present embodiment, Product Data Storage Area H99b1 comprises two columns, i.e., 'Product ID' and 'Product Data'. Column 'Product ID' stores the product IDs, and each product ID is an identification of the corresponding product data stored in column 'Product Data'. Column 'Product Data' stores the product data, and each product data includes various types of data of a specific product. Here, the product data includes, in the present example, the product name data, the produced date data, the price data, the producer's name data, the produced country data, and/or the ingredient data. Here, the product name data represents the name of the corresponding product; the produced date data represents the date at which the corresponding product is produced; the price data represents the price with which the corresponding product is sold; the producer's name data represents the name of the producer (or manufacturer) who produced (or manufactured) the corresponding product; the produced country data represents the name of the country at which the corresponding product is produced (or manufactured); and the ingredient data represents the ingredients included in the corresponding product. In the present embodiment, Product Data Storage Area H99b1 stores the following data: the product ID 'Product#1' and the corresponding product data 'Product Data#1'; the product ID 'Product#2' and the corresponding product data 'Product Data#2'; the product ID 'Product#3' and the corresponding product data 'Product Data#3'; and the product ID 'Product#4' and the corresponding product data 'Product Data#4'. The product data 'Product Data#1' represents the product data of a baby food; the product data 'Product Data#2' represents the product data of a soap; the product data 'Product Data#3' represents the product data of a dish; and the product data 'Product Data#4' represents the product data of a can juice.

Paragraph [0311]—This Paragraph [0311] illustrate(s) the data stored in Encrypted Image Data Storage Area H99b2 (Paragraph [0309]). In the present embodiment, Encrypted Image Data Storage Area H99b2 comprises two columns, i.e., 'Product ID' and 'Encrypted Image Data'. Column 'Product ID' stores the product IDs, and each product ID is an identification of the corresponding encrypted image data stored in column 'Encrypted Image Data'. The product IDs stored in Encrypted Image Data Storage Area H99b2 (Paragraph [0311]) are identical to the ones stored in Product Data Storage Area H99b1 (Paragraph [0310]). Column 'Encrypted Image Data' stores the encrypted image data, and each encrypted image data is an image data from which the product data can not be visually perceived. Bar code may be utilized for the encrypted image data. The encrypted image data may be constituted of two colors (i.e., black and white) or include more than two colors (i.e., blue, green, red, black, white, yellow, and brown). The encrypted image data may be constituted of a set of stripes, dots, and/or specific patterns. In the present embodiment, Encrypted Image Data Storage Area H99b2 stores the following data: the product ID 'Product#1' and the corresponding encrypted image data 'Encrypted Image Data#1'; the product ID 'Product#2' and the corresponding encrypted image data 'Encrypted Image Data#2'; the product ID 'Product#3' and the corresponding encrypted image data 'Encrypted Image Data#3'; and the product ID 'Product#4' and the corresponding encrypted image data 'Encrypted Image Data#4'.

Paragraph [0312]—This Paragraph [0312] illustrate(s) the software programs stored in Product Information Retrieving Software Storage Area H99c (Paragraph [0308]). In the present embodiment, Product Information Retrieving Software Storage Area H99c stores Product Data Displaying Software H99c2 and Product Data/Encrypted Image Data Updating Software H99c3. Product Data Displaying Software H99c2 is the software program described in Paragraph [0327]. Product Data/Encrypted Image Data Updating Software H99c3 is the software program described in Paragraph [0325].

Paragraph [0313]—This Paragraph [0313] illustrate(s) the storage area included in RAM 206 (FIG. 1) of Communication Device 200. In the present embodiment, RAM 206 includes Product Information Retrieving Information Storage Area 20699a of which the data and the software programs stored therein are described in Paragraph [0315].

Paragraph [0314]—The data and/or the software programs stored in Product Information Retrieving Information Storage Area 20699a (Paragraph [0313]) may be downloaded from Host H (Paragraph [0022]) in the manner described in Paragraph [0416] through Paragraph [0422].

Paragraph [0315]—This Paragraph [0315] illustrate(s) the storage areas included in Product Information Retrieving Information Storage Area 20699a (Paragraph [0313]). In the present embodiment, Product Information Retrieving Information Storage Area 20699a includes Product Information Retrieving Data Storage Area 20699b and Product Information Retrieving Software Storage Area 20699c. Product Information Retrieving Data Storage Area 20699b stores the data necessary to implement the present function on the side of Communication Device 200, such as the ones described in Paragraph [0316] through Paragraph [0318]. Product Information Retrieving Software Storage Area 20699c stores the software programs necessary to implement the present function on the side of Communication Device 200, such as the ones described in Paragraph [0319].

Paragraph [0316]—This Paragraph [0316] illustrate(s) the storage areas included in Product Information Retrieving Data Storage Area 20699b (Paragraph [0315]). In the present embodiment, Product Information Retrieving Data Storage Area 20699b includes Product Data Storage Area 20699b1, Encrypted Image Data Storage Area 20699b2, and Work Area 20699b3. Product Data Storage Area 20699b1 stores the data described in Paragraph [0317]. Encrypted Image Data Storage Area 20699b2 stores the data described in Paragraph [0318]. Work Area 20699b3 is utilized as a work area to perform calculation and temporarily store data.

Paragraph [0317]—This Paragraph [0317] illustrate(s) the data stored in Product Data Storage Area 20699b1 (Paragraph [0316]). In the present embodiment, Product Data Storage Area 20699b1 comprises two columns, i.e., 'Product ID' and 'Product Data'. Column 'Product ID' stores the product IDs, and each product ID is an identification of the corresponding product data stored in column 'Product Data'. Column 'Product Data' stores the product data, and each product data includes various types of data of a specific product. Here, the product data includes, in the present example, the product name data, the produced date data, the price data, the producer's name data, the produced country data, and/or the ingredient data. Here, the product name data represents the name of the corresponding product; the produced date data represents the date at which the corresponding product is produced; the price data represents the price with which the corresponding product is sold; the producer's name data represents the name of the producer (or manufacturer) who produced (or manufactured) the corresponding product; the produced country data represents the name of the country at which the corresponding product is produced (or manufactured); and the ingredient data represents the ingredients included in the corresponding product. In the present embodiment, Product Data Storage Area 20699b1 stores the following data: the product ID 'Product#1' and the corresponding product data 'Product Data#1'; the product ID 'Product#2' and the corresponding product data 'Product Data#2'; the product ID 'Product#3' and the corresponding product data 'Product Data#3'; and the product ID 'Product#4' and the corresponding product data 'Product Data#4'. The product data 'Product Data#1' represents the product data of a baby food; the product data 'Product Data#2' represents the product data of a soap; the product data 'Product Data#3' represents the product data of a dish; and the product data 'Product Data#4' represents the product data of a can juice.

Paragraph [0318]—This Paragraph [0318] illustrate(s) the data stored in Encrypted Image Data Storage Area 20699b2 (Paragraph [0316]). In the present embodiment, Encrypted Image Data Storage Area 20699b2 comprises two columns, i.e., 'Product ID' and 'Encrypted Image Data'. Column 'Product ID' stores the product IDs, and each product ID is an identification of the corresponding encrypted image data stored in column 'Encrypted Image Data'. The product IDs stored in Encrypted Image Data Storage Area H99b2 (Paragraph [0311]) are identical to the ones stored in Product Data Storage Area H99b1 (Paragraph [0310]). Column 'Encrypted Image Data' stores the encrypted image data, and each encrypted image data is an image data from which the product data can not be visually perceived. Bar code may be utilized for the encrypted image data. The encrypted image data may be constituted of two colors (i.e., black and white) or include more than two colors (i.e., blue, green, red, black, white, yellow, and brown). The encrypted image data may be constituted of a set of stripes, dots, and/or specific patterns. In the present embodiment, Encrypted Image Data Storage Area 20699b2 stores the following data: the product ID 'Product#1' and the corresponding encrypted image data 'Encrypted Image Data#1'; the product ID 'Product#2' and the corresponding encrypted image data 'Encrypted Image Data#2'; the product ID 'Product#3' and the corresponding encrypted image data 'Encrypted Image Data#3'; and the product ID 'Product#4' and the corresponding encrypted image data 'Encrypted Image Data#4'.

Paragraph [0319]—This Paragraph [0319] illustrate(s) the software programs stored in Product Information Retrieving Software Storage Area 20699c (Paragraph [0315]). In the present embodiment, Product Information Retrieving Software Storage Area 20699c stores Image Data Retrieving Software 20699c1, Product Data Displaying Software 20699c2, and Product Data/Encrypted Image Data Updating Software 20699c3. Image Data Retrieving Software 20699c1 is the software program described in Paragraph [0321]. Product Data Displaying Software 20699c2 is the software program described in Paragraph [0327]. Product Data/Encrypted Image Data Updating Software 20699c3 is the software program described in Paragraph [0325].

Paragraph [0320]—This Paragraph [0320] illustrate(s) the label, Label L99 (Paragraph [0320]) attached to a product, Product P99, sold in a supermarket. Here, Product P99 may be any product, such as baby food, soap, dish, can juice, and frozen food. Product P99 may also include paper product utilized for adverting, e.g., leaflet, catalogue, poster, brochure, and flyer. Label L99 (Paragraph [0320]) may be attached to Product P99. Label L99 (Paragraph [0320]) may be directly printed to Product P99 instead. A specific image is printed on Label L99 (Paragraph [0320]) from which the product data can not be visually perceived. Bar code may be utilized for the specific image. The specific image may be constituted of two colors (i.e., black and white) or include more than two colors (i.e., blue, green, red, black, white, yellow, and brown). The specific image may be constituted of a set of stripes, dots, and/or specific patterns.

Paragraph [0321]—This Paragraph [0321] illustrate(s) Image Data Retrieving Software 20699c1 (Paragraph [0319]) of Communication Device 200, which retrieves the image data of Label L99 (Paragraph [0320]). In the present embodiment, CPU 211 (FIG. 1) of Communication Device 200 retrieves the image data of Label L99 (Paragraph [0320]) via CCD Unit (FIG. 1) (S1). CPU 211 stores the image data retrieved in S1 in work area 20699b3 (Paragraph [0316]) (S2).

Paragraph [0322]—This Paragraph [0322] illustrate(s) Product Data Displaying Software H99c2 (Paragraph [0312]) of Host H (Paragraph [0022]) and the product data Displaying Software 20699c2 (Paragraph [0319]) of Communication Device 200, which display the product data of Product P99. In the present embodiment, CPU 211 (FIG. 1) of Communication Device 200 retrieves the image data from Work Area 20699b3 (Paragraph [0316]) which is sent to Host H (S1). Host H receives the image data from Communication Device 200 and stores the data in work area H99b3 (Paragraph [0309]) (S2). Host H compares the image data stored in work area H99b3 (Paragraph [0309]) with the encrypted image data stored in Encrypted Image Data Storage Area H99b2 (Paragraph [0311]) (S3). If the matched encrypted image data is found in the previous step, Host H identifies the corresponding product ID (S4). Host H identifies the product data stored in Product Data Storage Area H99b1 (Paragraph [0310]) of the corresponding product ID (S5). Host H sends the product data identified in the previous step to Communication Device 200, which is received by Communication Device 200 (S6). CPU 211 stores the product data received in the previous step in work area 20699b3 (Paragraph [0316]) and displays the data on LCD 201 (FIG. 1) (S7).

Paragraph [0323]—<<Product Information Retrieving Function (CCD)—Another Embodiment>>

Paragraph [0324]—Paragraph [0325] through Paragraph [0327] illustrate(s) another embodiment, wherein Communication Device 200 plays the major role in implementing the present function.

Paragraph [0325]—This Paragraph [0325] illustrate(s) Product Data/Encrypted Image Data Updating Software H99c3 (Paragraph [0312]) of Host H (Paragraph [0022]) and Product Data/Encrypted Image Data Updating Software 20699c3 (Paragraph [0319]) of Communication Device 200, which update all data stored in Product Data Storage Area 20699b1 (Paragraph [0317]) and Encrypted Image Data Storage Area 20699b2 (Paragraph [0318]). In the present embodiment, CPU 211 (FIG. 1) of Communication Device 200 sends the product data/encrypted image data updating request, which is received by Host H (S1). Here, the product data/encrypted image data updating request is a request sent to Host H to send all data stored in Product Data Storage Area H99b1 (Paragraph [0310]) and Encrypted Image Data Storage Area H99b2 (Paragraph [0311]) of Host H to Communication Device 200. Host H retrieves all data stored in Product Data Storage Area H99b1 (Paragraph [0310]) and Encrypted Image Data Storage Area H99b2 (Paragraph [0311]) which are sent to Communication Device 200 (S2). CPU 211 receives the data retrieved in the previous step (S3). CPU 211 stores the product ID and the product data in Product Data Storage Area 20699b1 (Paragraph [0317]) (S4). CPU 211 stores the product ID and the encrypted image data in Encrypted Image Data Storage Area 20699b2 (Paragraph [0318]) (S5).

Paragraph [0326]—This Paragraph [0326] illustrate(s) Image Data Retrieving Software 20699c1 (Paragraph [0319]) of Communication Device 200, which retrieves the image data of Label L99 (Paragraph [0320]). In the present embodiment, CPU 211 (FIG. 1) of Communication Device 200 retrieves the image data of Label L99 (Paragraph [0320]) via CCD Unit (FIG. 1) (S1). CPU 211 stores the image data retrieved in S1 in work area 20699b3 (Paragraph [0316]) (S2). Paragraph [0327]—This Paragraph [0327] illustrate(s) Product Data Displaying Software 20699c2 (Paragraph [0319]) of Communication Device 200, which displays the product data of Product P99. In the present embodiment, CPU 211 (FIG. 1) of Communication Device 200 retrieves the image data from Work Area 20699b3 (Paragraph [0316]) (S1). CPU 211 compares the image data stored in work area 20699b3 (Paragraph [0316]) with the encrypted image data stored in Encrypted Image Data Storage Area 20699b2 (Paragraph [0318]) (S2). If the matched encrypted image data is found in the previous step, CPU 211 identifies the corresponding product ID (S3). CPU 211 identifies the product data stored in Product Data Storage Area 20699b1 (Paragraph [0317]) of the corresponding product ID (S4). CPU 211 retrieves the product data identified in the previous step and displays the data on LCD 201 (FIG. 1) (S5).

Paragraph [0328]—<<Continue Enabled Video Game Function>>

Paragraph [0329]—Paragraph [0330] through Paragraph [0347] illustrate(s) the continue enabled video game function which enables a video game to be continued from the point the game ended.

Paragraph [0330]—This Paragraph [0330] illustrate(s) the storage area included in Host H (Paragraph [0022]). In the present embodiment, Host H includes Continue Enabled Video Game Information Storage Area H103a of which the data and the software programs stored therein are described in Paragraph [0331].

Paragraph [0331]—This Paragraph [0331] illustrate(s) the storage areas included in Continue Enabled Video Game Information Storage Area H103a (Paragraph [0330]). In the present embodiment, Continue Enabled Video Game Information Storage Area H103a includes Continue Enabled Video Game Data Storage Area H103b and Continue Enabled Video Game Software Storage Area H103c. Continue Enabled Video Game Data Storage Area H103b stores the data necessary to implement the present function on the side of Host H (Paragraph [0022]), such as the ones described in Paragraph [0332]. Continue Enabled Video Game Software Storage Area H103c stores the software programs necessary to implement the present function on the side of Host H, such as the ones described in Paragraph [0333].

Paragraph [0332]—This Paragraph [0332] illustrate(s) the storage areas included in Continue Enabled Video Game Data Storage Area H103b (Paragraph [0331]). In the present embodiment, Continue Enabled Video Game Data Storage Area H103b includes 3D Object Data Storage Area H103b1, Count Down Data Storage Area H103b2, and Work Area H103b3. 3D Object Data Storage Area H103b1 stores the 3D object operable data, the 3D object non-operable data, and the 3D background data. Here, the 3D object operable data represents the 3D object displayed on LCD 201 (FIG. 1) which is capable to be manipulated by the user of Communication Device 200. The 3D object non-operable data represents the 3D object displayed on LCD 201 (FIG. 1) which is not capable to be manipulated by the user of Communication Device 200. The 3D background data represents the 3D object which is displayed on LCD 201 (FIG. 1) as a background (e.g., sky, clouds, buildings, and streets) of the corresponding video game. Count Down Data Storage Area H103b2 stores the count down data. Here, the count down data is composed often count down image data, i.e., the count down image '10' data, the count down image '9' data, the count down image '8' data, the count down image '7' data, the count down image '6' data, the count down image '5' data, the count down image '4' data, the count down image '3' data, the count down image '2' data, and the count down image '1' data. The foregoing ten count down image data are designed to be displayed on LCD 201 (FIG. 1). Work Area H103b3 is utilized as a work area to perform calculation and temporarily store data.

Paragraph [0333]—This Paragraph [0333] illustrate(s) the software programs stored in Continue Enabled Video Game Software Storage Area H103c (Paragraph [0331]). In the present embodiment, Continue Enabled Video Game Software Storage Area H103c stores Video Game Processing Software H103c1, Video Game Continuing Software H103c2, and Video Game Downloading Software H103c3. Video Game Processing Software H103c1 is the software program described in Paragraph [0339] and Paragraph [0345]. Video Game Continuing Software H103c2 is the software program described in Paragraph [0340] and Paragraph [0341], and Paragraph [0346] and Paragraph [0347]. Video Game Downloading Software H103c3 is the software program described in Paragraph [0344].

Paragraph [0334]—This Paragraph [0334] illustrate(s) the storage area included in RAM 206 (FIG. 1) of Communication Device 200. In the present embodiment, RAM 206 includes Continue Enabled Video Game Information Storage Area 206103a of which the data and the software programs stored therein are described in Paragraph [0336].

Paragraph [0335]—The data and/or the software programs stored in Continue Enabled Video Game Information Storage Area 206103a (Paragraph [0334]) may be downloaded from Host H (Paragraph [0022]) in the manner described in Paragraph [0416] through Paragraph [0422].

Paragraph [0336]—This Paragraph [0336] illustrate(s) the storage areas included in Continue Enabled Video Game Information Storage Area 206103a (Paragraph [0334]). In the present embodiment, Continue Enabled Video Game Information Storage Area 206103a includes Continue Enabled Video Game Data Storage Area 206103b and Continue Enabled Video Game Software Storage Area 206103c. Continue Enabled Video Game Data Storage Area 206103b stores the data necessary to implement the present function on the side of Communication Device 200, such as the ones described in Paragraph [0337]. Continue Enabled Video Game Software Storage Area 206103c stores the software programs necessary to implement the present function on the side of Communication Device 200, such as the ones described in Paragraph [0338].

Paragraph [0337]—This Paragraph [0337] illustrate(s) the storage areas included in Continue Enabled Video Game Data Storage Area 206103b (Paragraph [0336]). In the present embodiment, Continue Enabled Video Game Data Storage Area 206103b includes 3D Object Data Storage Area 206103b1, Count Down Data Storage Area 206103b2, and Work Area 206103b3. 3D Object Data Storage Area 206103b1 stores the 3D object operable data, the 3D object non-operable data, and the 3D background data. Here, the 3D object operable data represents the 3D object displayed on LCD 201 (FIG. 1) which is capable to be manipulated by the user of Communication Device 200. The 3D object non-operable data represents the 3D object displayed on LCD 201 (FIG. 1) which is not capable to be manipulated by the user of Communication Device 200. The 3D background data represents the 3D object which is displayed on LCD 201 (FIG. 1) as a background (e.g., sky, clouds, buildings, and streets) of the corresponding video game. Count Down Data Storage Area 206103b2 stores the count down data. Here, the count down data is composed of ten count down image data, i.e., the count down image '10' data, the count down image '9' data, the count down image '8' data, the count down image '7' data, the count down image '6' data, the count down image '5' data, the count down image '4' data, the count down image '3' data, the count down image '2' data, and the count down image '1' data. The foregoing ten count down image data are designed to be displayed on LCD 201 (FIG. 1). Work Area 206103b3 is utilized as a work area to perform calculation and temporarily store data.

Paragraph [0338]—This Paragraph [0338] illustrate(s) the software programs stored in Continue Enabled Video Game Software Storage Area 206103c (Paragraph [0336]). In the present embodiment, Continue Enabled Video Game Software Storage Area 206103c stores Video Game Processing Software 206103c1, Video Game Continuing Software 206103c2, and Video Game Downloading Software 206103c3. Video Game Processing Software 206103c1 is the software program described in Paragraph [0339] and Paragraph [0345]. Video Game Continuing Software 206103c2 is the software program described in Paragraph [0340], and Paragraph [0346] and Paragraph [0347]. Video Game Downloading Software 206103c3 is the software program described in Paragraph [0344].

Paragraph [0339]—This Paragraph [0339] illustrate(s) Video Game Processing Software H103c1 (Paragraph [0333]) of Host H (Paragraph [0022]) and Video Game Processing Software 206103c1 (Paragraph [0338]) of Communication Device 200, which process the video game. Referring to the present embodiment, CPU 211 (FIG. 1) of Communication Device 200 sends a video game command signal which is received by Host H (S1). Here, the video game command signal is a signal input by utilizing Input Device 210 (FIG. 1) or via voice recognition system to operate the 3D object operable data displayed on LCD 201 (FIG. 1). Host H retrieves the 3D object operable data, the 3D object non-operable data, and the 3D background data from 3D Object Data Storage Area H103b1 (Paragraph [0332]) (S2). Host H processes with the data retrieved in the previous step in accordance with the video command signal received in S1 (S3). Host H produces the video game screen data, which is sent to Communication Device 200 (S4). Here, the video game screen data is the image data representing the perspective view of the 3D object operable data, the 3D object non-operable data, and the 3D background data retrieved in S2 after being processed in S3, which is designed to be displayed on LCD 201 (FIG. 1). CPU 211 receives the video game screen data and stores the data in Work Area 206103b3 (Paragraph [0337]), and displays the data on LCD 201 (FIG. 1) (S5). The foregoing sequence is repeated periodically.

Paragraph [0340]—This Paragraph [0340] illustrate(s) Video Game Continuing Software H103c2 (Paragraph

[0333]) of Host H (Paragraph [0022]) and Video Game Continuing Software 206103c2 (Paragraph [0338]) of Communication Device 200, which continue and resume the video game. In the present embodiment, Host H periodically checks the game status (S1). If the game is over, Host H proceeds to the next step (S2). Host H initiates the video game continuing process (S3). If the video game continuing signal is input during video game continuing process, Host H proceeds to the next step (S4). Here, the video game continuing signal is a signal input by utilizing Input Device 210 (FIG. 1) or via voice recognition system indicating to initiate the video game resuming process described in the next step. Host H initiates the video game resuming process (S5). Here, the video game is continued and resumed from the point where the game ended. As another embodiment, if the video game includes a plurality of game stages, and the game ended at a middle of a certain game stage, the video game is continued and resumed from the beginning of the game stage where the game ended.

Paragraph [0341]—This Paragraph [0341] illustrate(s) the video game continuing process described in the previous embodiment. In the present embodiment, Host H retrieves the count down image data (e.g., Count Down Image '10' Data) from Count Down Data Storage Area H103b2 (Paragraph [0332]) (S1). Host H produces the video game screen data, which is sent to Communication Device 200 (S2). Here, the video game screen data is the image data representing the perspective view of the 3D object operable data, 3D object non-operable data, and 3D background data retrieved in S2 after being processed in S3, which is designed to be displayed on LCD 201 (FIG. 1). CPU 211 (FIG. 1) of Communication Device 200 receives the video game screen data and stores the data in Work Area 206103b3 (Paragraph [0337]), and displays the data on LCD 201 (FIG. 1) (S3). The foregoing sequence is repeated periodically. Thus, the count down image '10' data is displayed on LCD 201 (FIG. 1) for a certain period of time, the count down image '9' data is displayed on LCD 201 (FIG. 1) for a certain period of time, the count down image '8' data is displayed on LCD 201 (FIG. 1) for a certain period of time, the count down image '7' data is displayed on LCD 201 (FIG. 1) for a certain period of time, the count down image '6' data is displayed on LCD 201 (FIG. 1) for a certain period of time, the count down image '5' data is displayed on LCD 201 (FIG. 1) for a certain period of time, the count down image '4' data is displayed on LCD 201 (FIG. 1) for a certain period of time, the count down image '3' data is displayed on LCD 201 (FIG. 1) for a certain period of time, the count down image '2' data is displayed on LCD 201 (FIG. 1) for a certain period of time, and the count down image '1' data is displayed on LCD 201 (FIG. 1) for a certain period of time.

Paragraph [0342]—<<Continue Enabled Video Game Function—Another Embodiment>>

Paragraph [0343]—Paragraph [0344] through Paragraph [0347] illustrate(s) another embodiment, wherein the present function is implemented solely by Communication Device 200.

Paragraph [0344]—This Paragraph [0344] illustrate(s) Video Game Downloading Software H103c3 (Paragraph [0333]) of Host H (Paragraph [0022]) and Video Game Downloading Software 206103c3 (Paragraph [0338]) of Communication Device 200, which enable Communication Device 200 to download a video game software capable to implement the present function. In the present embodiment, Host H retrieves all data from Continue Enabled Video Game Information Storage Area H103a (Paragraph [0330]), which is sent to Communication Device 200 (S1). CPU 211 (FIG. 1) of Communication Device 200 receives the data retrieved in the previous step and stores the data in Continue Enabled Video Game Information Storage Area 206103a (Paragraph [0334]) (S2).

Paragraph [0345]—This Paragraph [0345] illustrate(s) Video Game Processing Software 206103c1 (Paragraph [0338]) of Communication Device 200, which processes the video game. In the present embodiment, the user of Communication Device 200 inputs a video game command signal (S1). Here, the video game command signal is a signal input by utilizing Input Device 210 (FIG. 1) or via voice recognition system to operate the 3D object operable data displayed on LCD 201 (FIG. 1). CPU 211 retrieves the 3D object operable data, the 3D object non-operable data, and the 3D background data from 3D Object Data Storage Area 206103b1 (Paragraph [0337]) (S2). CPU 211 processes with the data retrieved in the previous step in accordance with the video command signal input in S1 (S3). CPU 211 produces the video game screen data (S4). Here, the video game screen data is the image data representing the perspective view of the 3D object operable data, the 3D object non-operable data, and the 3D background data retrieved in S2 after being processed in S3, which is designed to be displayed on LCD 201 (FIG. 1). CPU 211 stores the video game screen data in Work Area 206103b3 (Paragraph [0337]), and displays the data on LCD 201 (FIG. 1) (S5). The foregoing sequence is repeated periodically.

Paragraph [0346]—This Paragraph [0346] illustrate(s) Video Game Continuing Software 206103c2 (Paragraph [0338]) of Communication Device 200, which continues and resumes the video game. In the present embodiment, CPU 211 (FIG. 1) of Communication Device 200 periodically checks the game status (S1). If the game is over, CPU 211 proceeds to the next step (S2). CPU 211 initiates the video game continuing process (S3). If the video game continuing signal is input during video game continuing process, CPU 211 proceeds to the next step (S4). Here, the video game continuing signal is a signal input by utilizing Input Device 210 (FIG. 1) or via voice recognition system indicating to initiate the video game resuming process described in the next step. CPU 211 initiates the video game resuming process (S5). Here, the video game is continued and resumed from the point where the game ended. As another embodiment, if the video game includes a plurality of game stages, and the game ended at a middle of a certain game stage, the video game is continued and resumed from the beginning of the game stage where the game ended.

Paragraph [0347]—This Paragraph [0347] illustrate(s) the video game continuing process described in the previous embodiment. In the present embodiment, CPU 211 (FIG. 1) of Communication Device 200 retrieves the count down image data (e.g., Count Down Image '10' Data) from Count Down Data Storage Area 206103b2 (Paragraph [0337]) (S1). CPU 211 produces the video game screen data (S2). CPU 211 stores the video game screen data in Work Area 206103b3 (Paragraph [0337]), and displays the data on LCD 201 (FIG. 1) (S3). The foregoing sequence is repeated periodically. Thus, the count down image '10' data is displayed on LCD 201 (FIG. 1) for a certain period of time, the count down image '9' data is displayed on LCD 201 (FIG. 1) for a certain period of time, the count down image '8' data is displayed on LCD 201 (FIG. 1) for a certain period of time, the count down image '7' data is displayed on LCD 201 (FIG. 1) for a certain period of time, the count down image '6' data is displayed on LCD 201 (FIG. 1) for a certain period of time, the count down image '5' data is displayed on LCD 201 (FIG. 1) for a certain period of time, the count down image '4' data is displayed on LCD 201 (FIG. 1) for a certain period of time, the count down image '3' data is displayed on LCD 201 (FIG. 1) for a certain period of time, the count down image '2' data is displayed on LCD 201 (FIG. 1) for a certain period of time, and the count down image '1' data is displayed on LCD 201 (FIG. 1) for a certain period of time.

Paragraph [0348]—<<Resume Enabled Video Game Function>>

Paragraph [0349]—Paragraph [0350] through Paragraph [0367] illustrate(s) the resume enabled video game function which enables a video game to be resumed from the point at which the video game ended last time. For example, the user of Communication Device 200 may end playing the video game and close the video game software, and open the software on the next day and resume from the point he/she ended last day.

Paragraph [0350]—This Paragraph [0350] illustrate(s) the storage area included in Host H (Paragraph [0022]). In the present embodiment, Host H includes Resume Enabled Video Game Information Storage Area H104a of which the data and the software programs stored therein are described in Paragraph [0351].

Paragraph [0351]—This Paragraph [0351] illustrate(s) the storage areas included in Resume Enabled Video Game Information Storage Area H104a (Paragraph [0350]). In the present embodiment, Resume Enabled Video Game Information Storage Area H104a includes Resume Enabled Video Game Data Storage Area H104b and Resume Enabled Video Game Software Storage Area H104c. Resume Enabled Video Game Data Storage Area H104b stores the data necessary to implement the present function on the side of Host H (Paragraph [0022]), such as the ones described in Paragraph [0352]. Resume Enabled Video Game Software Storage Area H104c stores the software programs necessary to implement the present function on the side of Host H, such as the ones described in Paragraph [0353].

Paragraph [0352]—This Paragraph [0352] illustrate(s) the storage areas included in Resume Enabled Video Game Data Storage Area H104b (Paragraph [0351]). In the present embodiment, Resume Enabled Video Game Data Storage Area H104b includes 3D Object Data Storage Area H104b1, Middleway Resuming Data Storage Area H104b2, and Work Area H104b3. 3D Object Data Storage Area H104b1 stores the 3D object operable data, the 3D object non-operable data, and the 3D background data. Here, the 3D object operable data represents the 3D object displayed on LCD 201 (FIG. 1) which is capable to be manipulated by the user of Communication Device 200. The 3D object non-operable data represents the 3D object displayed on LCD 201 (FIG. 1) which is not capable to be manipulated by the user of Communication Device 200. The 3D background data represents the 3D object which is displayed on LCD 201 (FIG. 1) as a background (e.g., sky, clouds, buildings, and streets) of the corresponding video game. Middleway Resuming Data Storage Area H104b2 stores the middleway resuming data. Here, the middleway resuming data represents the point at which the video game ended last time. The middleway resuming data is utilized when the video game software program is executed next time and the user of Communication Device 200 desires to resume the video game from the point at which the video game ended last time. Work Area H104b3 is utilized as a work area to perform calculation and temporarily store data.

Paragraph [0353]—This Paragraph [0353] illustrate(s) the software programs stored in Resume Enabled Video Game Software Storage Area H104c (Paragraph [0351]). In the present embodiment, Resume Enabled Video Game Software Storage Area H104c stores Video Game Processing Software H104c1, Video Game Middleway Ending Software H104c2, Video Game Middleway Resuming Software H104c3, and Video Game Downloading Software H104c4. Video Game Processing Software H104c1 is the software program described in Paragraph [0359]. Video Game Middleway Ending Software H104c2 is the software program described in Paragraph [0360]. Video Game Middleway Resuming Software H104c3 is the software program described in Paragraph [0361]. Video Game Downloading Software H104c4 is the software program described in Paragraph [0364].

Paragraph [0354]—This Paragraph [0354] illustrate(s) the storage area included in RAM 206 (FIG. 1) of Communication Device 200. In the present embodiment, RAM 206 includes Resume Enabled Video Game Information Storage Area 206104a of which the data and the software programs stored therein are described in Paragraph [0356].

Paragraph [0355]—The data and/or the software programs stored in Resume Enabled Video Game Information Storage Area 206104a (Paragraph [0354]) may be downloaded from Host H (Paragraph [0022]) in the manner described in Paragraph [0416] through Paragraph [0422].

Paragraph [0356]—This Paragraph [0356] illustrate(s) the storage areas included in Resume Enabled Video Game Information Storage Area 206104a (Paragraph [0354]). In the present embodiment, Resume Enabled Video Game Information Storage Area 206104a includes Resume Enabled Video Game Data Storage Area 206104b and Resume Enabled Video Game Software Storage Area 206104c. Resume Enabled Video Game Data Storage Area 206104b stores the data necessary to implement the present function on the side of Communication Device 200, such as the ones described in Paragraph [0357]. Resume Enabled Video Game Software Storage Area 206104c stores the software programs necessary to implement the present function on the side of Communication Device 200, such as the ones described in Paragraph [0358].

Paragraph [0357]—This Paragraph [0357] illustrate(s) the storage areas included in Resume Enabled Video Game Data Storage Area 206104b (Paragraph [0356]). In the present embodiment, Resume Enabled Video Game Data Storage Area 206104b includes 3D Object Data Storage Area 206104b1, Middleway Resuming Data Storage Area 206104b2, and Work Area 206104b3. 3D Object Data Storage Area 206104b1 stores the 3D object operable data, the 3D object non-operable data, and the 3D background data. Here, the 3D object operable data represents the 3D object displayed on LCD 201 (FIG. 1) which is capable to be manipulated by the user of Communication Device 200. The 3D object non-operable data represents the 3D object displayed on LCD 201 (FIG. 1) which is not capable to be manipulated by the user of Communication Device 200. The 3D background data represents the 3D object which is displayed on LCD 201 (FIG. 1) as a background (e.g., sky, clouds, buildings, and streets) of the corresponding video game. Middleway Resuming Data Storage Area 206104b2 stores the middleway resuming data. Here, the middleway resuming data represents the point at which the video game ended last time. The middleway resuming data is utilized when the video game software program is executed next time and the user of Communication Device 200 desires to resume the video game from the point at which the video game ended last time. Work Area 206104b3 is utilized as a work area to perform calculation and temporarily store data.

Paragraph [0358]—This Paragraph [0358] illustrate(s) the software programs stored in Resume Enabled Video Game Software Storage Area 206104c (Paragraph [0356]). In the present embodiment, Resume Enabled Video Game Software Storage Area 206104c stores Video Game Processing Software 206104c1, Video Game Middleway Ending Software 206104c2, Video Game Middleway Resuming Software 206104c3, and Video Game Downloading Software 206104c4. Video Game Processing Software 206104c1 is the software program described in Paragraph [0359] and Paragraph [0365]. Video Game Middleway Ending Software 206104c2 is the software program described in Paragraph [0360] and Paragraph [0366]. Video Game Middleway Resuming Software 206104c3 is the software program described in Paragraph [0361] and Paragraph [0367]. Video Game Downloading Software 206104c4 is the software program described in Paragraph [0364].

Paragraph [0359]—This Paragraph [0359] illustrate(s) Video Game Processing Software H104c1 (Paragraph [0353]) of Host H (Paragraph [0022]) and Video Game Processing Software 206104c1 (Paragraph [0358]) of Communication Device 200, which process the video game. In the present embodiment, CPU 211 (FIG. 1) of Communication Device 200 sends the video game command signal, which is received by Host H (S1). Here, the video game command signal is a signal input by utilizing Input Device 210 (FIG. 1) or via voice recognition system to operate the 3D object operable data displayed on LCD 201 (FIG. 1). Host H retrieves the 3D object operable data, the 3D object non-operable data, and the 3D background data from 3D Object Data Storage Area H104b1 (Paragraph [0352]) (S2). Host H processes with the data retrieved in the previous step in accordance with the video command signal received in S1 (S3). Host H produces the video game screen data, which is sent to Communication Device 200 (S4). Here, the video game screen data is the image data representing the perspective view of the 3D object operable data, the 3D object non-operable data, and the 3D background data retrieved in S2 after being processed in S3, which is designed to be displayed on LCD 201 (FIG. 1). CPU 211 receives the video game screen data and stores the data in Work Area 206104b3 (Paragraph [0357]) and displays the data on LCD 201 (FIG. 1) (S5). The foregoing sequence is repeated periodically.

Paragraph [0360]—This Paragraph [0360] illustrate(s) Video Game Middleway Ending Software H104c2 (Paragraph [0353]) of Host H (Paragraph [0022]) and Video Game Middleway Ending Software 206104c2 (Paragraph [0358]) of Communication Device 200, which end the video game. In the present embodiment, the user of Communication Device 200 inputs the video game middleway ending signal which is sent to Host H (S1). Here, the video game middleway ending signal is a signal input by utilizing Input Device 210 (FIG. 1) or via voice recognition system indicating to end the video game and record the point at which the video game ended for purposes from which the video game to be resumed when the video game software is executed next time. Host H receives the video game middleway ending signal (S2). Host H, in response, produces the middleway resuming data and stores the data in Middleway Resuming Data Storage Area H104b2 (Paragraph [0352]) (S3). Host H ends the video game thereafter (S4).

Paragraph [0361]—This Paragraph [0361] illustrate(s) Video Game Middleway Resuming Software H104c3 (Paragraph [0353]) of Host H (Paragraph [0022]) and Video Game Middleway Resuming Software 206104c3 (Paragraph [0358]) of Communication Device 200, which resume the video game. In the present embodiment, the user of Communication Device 200 inputs the video game middleway resuming signal which is sent to Host H (S1). Here, the video game middleway resuming signal is a signal input by utilizing Input Device 210 (FIG. 1) or via voice recognition system indicating to resume the video game from the point at which the video game ended last time. Host H receives the video game middleway resuming signal (S2). Host H retrieves the middleway resuming data from Middleway Resuming Data Storage Area H104b2 (Paragraph [0352]) (S3). Host H resumes the video game in accordance with the middleway resuming data retrieved in the previous step (S4). Video Game Processing Software H104c1 of Host H and Video Game Processing Software 206104c1 of Communication Device 200 are executed and the video game is resumed from the point at which the video game ended last time. As another embodiment, if the video game includes a plurality of game stages, and the video game ended at a middle of a certain game stage, the video game may be continued and resumed from the beginning of the video game stage where the video game ended last time.

Paragraph [0362]—<<Resume Enabled Video Game Function—Another Embodiment>>

Paragraph [0363]—Paragraph [0364] through Paragraph [0367] illustrate(s) another embodiment, wherein the present function is implemented solely by Communication Device 200. Paragraph [0364]—This Paragraph [0364] illustrate(s) Video Game Downloading Software H104c4 (Paragraph [0353]) of Host H (Paragraph [0022]) and Video Game Downloading Software 206104c4 (Paragraph [0358]) of Communication Device 200, which enable Communication Device 200 to download a video game software capable to implement the present function. In the present embodiment, Host H retrieves all data from Resume Enabled Video Game Information Storage Area H104a (Paragraph [0350]), which is sent to Communication Device 200 (S1). CPU 211 (FIG. 1) of Communication Device 200 receives the data retrieved in the previous step and stores the data in Resume Enabled Video Game Information Storage Area 206104a (Paragraph [0354]) (S2).

Paragraph [0365]—This Paragraph [0365] illustrate(s) Video Game Processing Software 206104c1 (Paragraph [0358]) of Communication Device 200, which processes the video game. In the present embodiment, the user of Communication Device 200 inputs the video game command signal (S1). Here, the video game command signal is a signal input by utilizing Input Device 210 (FIG. 1) or via voice recognition system to operate the 3D object operable data displayed on LCD 201 (FIG. 1). CPU 211 retrieves the 3D object operable data, the 3D object non-operable data, and the 3D background data from 3D Object Data Storage Area 206104b1 (Paragraph [0357]) (S2). CPU 211 processes with the data retrieved in the previous step in accordance with the video command signal input in S1 (S3). CPU 211 produces the video game screen data (S4). Here, the video game screen data is the image data representing the perspective view of the 3D object operable data, the 3D object non-operable data, and the 3D background data retrieved in S2 after being processed in S3, which is designed to be displayed on LCD 201 (FIG. 1). CPU 211 stores the video game screen data in Work Area 206104b3 (Paragraph [0357]) and displays the data on LCD 201 (FIG. 1) (S5). The foregoing sequence is repeated periodically.

Paragraph [0366]—This Paragraph [0366] illustrate(s) Video Game Middleway Ending Software 206104c2 (Paragraph [0358]) of Communication Device 200, which ends the video game. In the present embodiment, the user of Communication Device 200 inputs the video game middleway ending signal (S1). Here, the video game middleway ending signal is a signal input by utilizing Input Device 210 (FIG. 1) or via voice recognition system indicating to end the video game and record the point at which the video game ended for purposes from which the video game to be resumed when the video game software is executed next time. CPU 211, in response, produces the middleway resuming data and stores the data in Middleway Resuming Data Storage Area 206104b2 (Paragraph [0357]) (S2). CPU 211 ends the video game thereafter (S3).

Paragraph [0367]—This Paragraph [0367] illustrate(s) Video Game Middleway Resuming Software 206104c3 (Paragraph [0358]) of Communication Device 200, which resumes the video game. In the present embodiment, the user of Communication Device 200 inputs the video game middleway resuming signal (S1). Here, the video game middleway resuming signal is a signal input by utilizing Input Device 210 (FIG. 1) or via voice recognition system indicating to resume the video game from the point at which the video game ended last time. CPU 211 retrieves the middleway resuming data from Middleway Resuming Data Storage Area 206104b2 (Paragraph [0357]) (S2). CPU 211 resumes the video game in accordance with the middleway resuming data retrieved in the previous step (S3). Video Game Processing Software 206104c1 of Communication Device 200 is executed and the video game is resumed from the point at which the video game ended last time. As another embodiment, if the video game includes a plurality of game stages, and the video game ended at a middle of a certain game stage, the video game may be continued and resumed from the beginning of the video game stage where the video game ended last time.

Paragraph [0368]—<<Signal Forwarding Function>>

Paragraph [0369]—Paragraph [0370] through Paragraph [0391] illustrate(s) the signal forwarding function by which a wireless signal received from a wireless communication device is forwarded to another wireless communication device by implementing the present function.

Paragraph [0370]—This Paragraph [0370] illustrate(s) the overall operation of the present function. Four Communication Devices 200, for example, Device A, Device B, Device C, and Device D are utilized to describe the present function. In the present embodiment, Device D is not within the communication range of Device A. In contrast, Device B and Device C are within the communication range of Device A. Device D is within the communication range of Device B and Device C. Device C is within the communication range of Device B. In the present example, Device A is capable to communicate with Device D via (Device B and) Device C, i.e., having Device A's wireless signal being forward to Device D by (Device B and) Device C. The device IDs are utilized to implement the present function: the device ID of Device A is 'Device#A'; the device ID of Device B is 'Device#B'; the device ID of Device C is 'Device#C'; and the device ID of Device D is 'Device#D'. Here, each device ID is an identification of the corresponding Communication Device 200.

Paragraph [0371]—This Paragraph [0371] illustrate(s) the storage area included in RAM 206 (FIG. 1) of Devices A through D. In the present embodiment, RAM 206 includes Signal Forwarding Information Storage Area 206105a of which the data and the software programs stored therein are described in Paragraph [0373].

Paragraph [0372]—The data and/or the software programs stored in Signal Forwarding Information Storage Area 206105a (Paragraph [0371]) may be downloaded from Host H (Paragraph [0022]) in the manner described in Paragraph [0416] through Paragraph [0422].

Paragraph [0373]—This Paragraph [0373] illustrate(s) the storage areas included in Signal Forwarding Information Storage Area 206105a (Paragraph [0371]). In the present embodiment, Signal Forwarding Information Storage Area 206105a includes Signal Forwarding Data Storage Area 206105b and Signal Forwarding Software Storage Area 206105c. Signal Forwarding Data Storage Area 206105b stores the data necessary to implement the present function, such as the ones described in Paragraph [0374]. Signal Forwarding Software Storage Area 206105c stores the software programs necessary to implement the present function, such as the ones described in Paragraph [0375].

Paragraph [0374]—This Paragraph [0374] illustrate(s) the storage areas included in Signal Forwarding Data Storage Area 206105b (Paragraph [0373]). In the present embodiment, Signal Forwarding Data Storage Area 206105b includes Origin Device ID Storage Area 206105b1, Destination Device TD Storage Area 206105b2, Communication Route Data Storage Area 206105b3, Communication Data Storage Area 206105b4, and Work Area 206105b5. Origin Device ID Storage Area 206105b1 stores the origin device ID which represents the device ID (e.g., Device#A) of Communication Device 200 which transmits a wireless signal. In the present example, the device ID 'Device#A' is the origin device ID, i.e., Device A transmits the wireless signal, which is received by Device D by having the wireless signal being forwarded by (Device B and) Device C. Destination Device ID Storage Area 206105b2 stores the destination device ID which represents the device ID (e.g., Device#D) of Communication Device 200 which receives the wireless signal transmitted by Communication Device 200 of which the device ID is the origin device ID. In the present example, the device ID 'Device#D' is the destination device ID, i.e., Device D receives the wireless signal transmitted by Device A forwarded by (Device B and) Device C. Communication Route Data Storage Area 206105b3 stores the shortest route from Communication Device 200 represented by the origin device ID (e.g., Device#A) to Communication Device 200 represented by the destination device ID (e.g., Device#D). Communication Data Storage Area 206105b4 stores the communication data which may include audio data, text data, image data, video data, and/or other types of data. Work Area 206105b5 is utilized as a work area to perform calculation and temporarily store data.

Paragraph [0375]—This Paragraph [0375] illustrate(s) the software programs stored in Signal Forwarding Software Storage Area 206105c (Paragraph [0373]). In the present embodiment, Signal Forwarding Software Storage Area 206105c stores Route Inquiry Initiating Software 206105c1, Route Inquiry Signal Forwarding Software 206105c2, Route Inquiry Signal Receiving Software 206105c3, Route Comparing Software 206105c4, Route Response Initiating Software 206105c5, Route Response Signal Forwarding Software 206105c6, Route Response Signal Receiving Software 206105c7, Origin Device Communicating Software 206105c8, Communication Data Forwarding Software 206105c9, and Communication Data Receiving Software 206105c10. Route Inquiry Initiating Software 206105c1 is the software program described in Paragraph [0377]. Route Inquiry Signal Forwarding Software 206105c2 is the software program described in Paragraph [0378] and Paragraph [0379]. Route Inquiry Signal Receiving Software 206105c3 is the software program described in Paragraph [0380]. Route Comparing Software 206105c4 is the software program described in Paragraph [0388]. Route Response Initiating Software 206105c5 is the software program described in Paragraph [0381]. Route Response Signal Forwarding Software 206105c6 is the software program described in Paragraph [0382]. Route Response Signal Receiving Software 206105c7 is the software program described in Paragraph [0383]. Origin Device Communicating Software 206105c8 is the software program described in Paragraph [0389]. Communication Data Forwarding Software 206105c9 is the software program described in Paragraph [0390]. Communication Data Receiving Software 206105c10 is the software program described in Paragraph [0391].

Paragraph [0376]—This Paragraph [0376] illustrate(s) the data included in the route inquiry signal which is utilized to implement the present function. In the present embodiment, the route inquire signal includes the origin device ID, the forwarding device IDs, and the destination device ID. Here, the origin device ID represents the device ID (e.g., Device#A) of Communication Device 200 which transmits a wireless signal. The destination device ID represents the device ID (e.g., Device#D) of Communication Device 200 which receives the wireless signal transmitted by Communication Device 200 of which the device ID is the origin device ID (e.g., Device#A). The forwarding device IDs represent the device IDs (e.g., Device#C and Device#D) of Communication Devices 200 which forward the wireless signal received from Communication Device 200 of which the device ID is the origin device ID (e.g., Device#A) to Communication Device 200 of which the device ID is the destination device ID (e.g., Device#D).

Paragraph [0377]—This Paragraph [0377] illustrate(s) Route Inquiry Initiating Software 206105c1 (Paragraph [0375]) of Device A, which initiates to transfer the route inquiry signal. In the present embodiment, CPU 211 (FIG. 1) of Device A produces the route inquiry signal (S1). CPU 211 retrieves the origin device ID (e.g., Device#A) from Origin Device ID Storage Area 206105b1 and adds the data to the route inquiry signal (S2). CPU 211 retrieves the destination device ID (e.g., Device#D) from Destination Device ID Storage Area 206105b2 and adds the data to the route inquiry signal (S3). CPU 211 sends the route inquiry signal in a wireless fashion via Antenna 218 (FIG. 1) to Communication Device 200 within its communication range (e.g., Devices B and C) (S4).

Paragraph [0378]—This Paragraph [0378] illustrate(s) Route Inquiry Signal Forwarding Software 206105c2 (Paragraph [0375]) of Device B, which forwards the route inquiry signal. In the present embodiment, CPU 211 (FIG. 1) of Device B receives signal via Antenna 218 (FIG. 1) (S1). If the signal received in S1 is the route inquiry signal, CPU 211 proceeds to the next step (S2). If own device ID (e.g., Device#B) is NOT included in the destination device ID of the route inquiry signal, CPU 211 proceeds to the next step (S3). CPU 211 adds its own device ID (e.g., Device#B) as the forwarding device ID to the route inquiry signal and sends via Antenna 218 (FIG. 1) the data to Communication Device 200 located within its communication range (e.g., Device C) (S4). The foregoing sequence is performed periodically.

Paragraph [0379]—This Paragraph [0379] illustrate(s) Route Inquiry Signal Forwarding Software 206105c2 (Paragraph [0375]) of Device C, which forwards the route inquiry signal. In the present embodiment, CPU 211 (FIG. 1) of Device C receives signal via Antenna 218 (FIG. 1) (S1). If the signal received in S1 is the route inquiry signal, CPU 211 proceeds to the next step (S2). If own device ID (e.g., Device#C) is NOT included in the destination device ID of the route inquiry signal, CPU 211 proceeds to the next step (S3). CPU 211 adds its own device ID (e.g., Device#C) as the forwarding device ID to the route inquiry signal and sends via Antenna 218 (FIG. 1) the data to Communication Device 200 located within its communication range (e.g., Device C) (S4). The foregoing sequence is performed periodically.

Paragraph [0380]—This Paragraph [0380] illustrate(s) Route Inquiry Signal Receiving Software 206105c3 (Paragraph [0375]) of Device D, which receives the route inquiry signal. In the present embodiment, CPU 211 (FIG. 1) of Device D receives signal via Antenna 218 (FIG. 1) (S1). If the signal received in S1 is the route inquiry signal, CPU 211 proceeds to the next step (S2). If own device ID (e.g., Device#D) is included in the destination device ID of the route inquiry signal, CPU 211 proceeds to the next step (S3). CPU 211 stores the route inquiry signal in Work Area 206105c (S4). The foregoing sequence is performed periodically.

Paragraph [0381]—This Paragraph [0381] illustrate(s) Route Response Initiating Software 206105c5 (Paragraph [0375]) of Device D, which sends a response to the route inquiry signal. In the present embodiment, CPU 211 (FIG. 1) of Device D retrieves the route inquiry signal from Work Area 206105c and produces the route response signal and includes the route inquiry signal therein (S1). CPU 211 returns the route response signal via Antenna 218 (FIG. 1) to the previous Communication Device 200 (e.g., Device C) by referring to the route inquiry signal included in the route response signal (S2).

Paragraph [0382]—This Paragraph [0382] illustrate(s) Route Response Signal Forwarding Software 206105c6 (Paragraph [0375]) of Devices C and B, which forward the route response signal. Taking Device C for example, CPU 211 (FIG. 1) of Device C receives signal via Antenna 218 (FIG. 1) (S1). If the signal received in S1 is the route response signal, CPU 211 proceeds to the next step (S2). CPU 211 returns the route response signal via Antenna 218 (FIG. 1) to the previous Communication Device 200 (e.g., Device A) by referring to the route inquiry signal included in the route response signal (S3). The foregoing sequence is performed periodically.

Paragraph [0383]—This Paragraph [0383] illustrate(s) Route Response Signal Receiving Software 206105c7 (Paragraph [0375]) of Device A, which receives the route response signal. In the present embodiment, CPU 211 (FIG. 1) of Device A receives signal via Antenna 218 (FIG. 1) (S1). If the signal received in S1 is the route response signal, CPU 211 proceeds to the next step (S2). CPU 211 stores the route response signal in Work Area 206105c (S3). The foregoing sequence is performed periodically.

Paragraph [0384]—This Paragraph [0384] illustrate(s) the overall process described in the previous seven software programs. In the present embodiment, CPU 211 (FIG. 1) of Device A retrieves the destination device ID (e.g., Device#D) from Destination Device ID Storage Area 206105b2 and adds the data to the route inquiry signal (S1). CPU 211 of Device A adds its own device ID (e.g., Device#A) to the route inquiry signal and sends the route inquiry signal (S2). CPU 211 (FIG. 1) of Device B receives the route inquiry signal and adds its own device ID (e.g., Device#B) to the route inquiry signal and sends the route inquiry signal (S3). CPU 211 (FIG. 1) of Device C receives the route inquiry signal and adds its own device ID (e.g., Device#C) to the route inquiry signal and sends the route inquiry signal (S4). CPU 211 (FIG. 1) of Device D receives the route inquiry signal and adds its own device ID (e.g., Device#D) to the route inquiry signal (S5).

Paragraph [0385]—This Paragraph [0385] illustrate(s) the simplified description of the process described in the previous embodiment. In the present embodiment, the route inquiry signal is transferred from Device A which is forward by Device B and Device C, and received by Device D.

Paragraph [0386]—This Paragraph [0386] illustrate(s) the overall process of the software programs described hereinbefore. In the present embodiment, CPU 211 (FIG. 1) of Device A retrieves the destination device ID (e.g., Device#D) from Destination Device ID Storage Area 206105b2 and adds the data to the route inquiry signal (S1). CPU 211 of Device A adds its own device ID (e.g., Device#A) to the route inquiry signal and sends the route inquiry signal (S2). CPU 211 (FIG. 1) of Device C receives the route inquiry signal and adds its own device ID (e.g., Device#C) to the route inquiry signal and sends the route inquiry signal (S3). CPU 211 (FIG. 1) of Device D receives the route inquiry signal and adds its own device ID (e.g., Device#D) to the route inquiry signal (S4).

Paragraph [0387]—This Paragraph [0387] illustrate(s) the simplified description of the process described in the previous embodiment. In the present embodiment, the route inquiry signal is transferred from Device A to Device C, and received by Device D.

Paragraph [0388]—This Paragraph [0388] illustrate(s) Route Comparing Software 206105c4 (Paragraph [0375]) of Device A, which compares the route inquiry signals to identify the shortest route. In the present embodiment, CPU 211 (FIG. 1) of Device A retrieves all route response signals from Work Area 206105b5 (S1). CPU 211 retrieves the route inquiry signals from the route response signals (S2). CPU 211 compares all route inquiry signals (S3). CPU 211 identifies the route inquiry signal representing the shortest route and stores the data as the communication route data (e.g., Communication Route Data#A) in Communication Route Data Storage Area 206105b3 (S4).

Paragraph [0389]—This Paragraph [0389] illustrate(s) Origin Device Communicating Software 206105c8 (Paragraph [0375]) of Device A, which sends the communication data. In the present embodiment, CPU 211 (FIG. 1) of Device A retrieves the communication route data (e.g., Communication Route Data#A) from Communication Route Data Storage Area 206105b3 (S1). CPU 211 retrieves the communication data from Communication Data Storage Area 206105b4 (S2). Here, the communication data may include audio data, text data, image data, video data, and/or other types of data. CPU 211 produces the device to device communicating signal and adds its data retrieved in S1 and S2 (S3). Here, the device to device communicating signal is a signal produced for purposes of communicating (sending/receiving audio data, text data, image data, video data, and/or other types of data) with Communication Device 200 (e.g., Device D) of which the device ID (e.g., Device#D) is the destination device ID. CPU 211 sends the device to device communicating signal in accordance with the communication route data (e.g., Communication Route Data#A) (e.g., to Device C) via Antenna 218 (FIG. 1) (S4).

Paragraph [0390]—This Paragraph [0390] illustrate(s) Communication Data Forwarding Software 206105c9 (Paragraph [0375]) of Device C, which forwards the communication data. In the present embodiment, CPU 211 (FIG. 1) of Device C receives signal via Antenna 218 (FIG. 1) (S1). If the signal received in S1 is the device to device communicating signal, CPU 211 proceeds to the next step (S2). If own device ID (e.g., Device#C) is NOT included in destination device ID of the device to device communicating signal, CPU 211 proceeds to the next step (S3). CPU 211 forwards the device to device communicating signal in accordance with the communication route data (e.g., Communication Route Data#A) (e.g., to Device D) via Antenna 218 (FIG. 1) (S4). The foregoing sequence is performed periodically.

Paragraph [0391]—This Paragraph [0391] illustrate(s) Communication Data Receiving Software 206105c10 (Paragraph [0375]) of Device D, which receives the communication data. In the present embodiment, CPU 211 (FIG. 1) of Device D receives signal via Antenna 218 (FIG. 1) (S1). If the signal received in S1 is the device to device communicating signal, CPU 211 proceeds to the next step (S2). If own device ID (e.g., Device#D) is included in destination device ID of the device to device communicating signal, CPU 211 proceeds to the next step (S3). CPU 211 stores the device to device communicating signal in Work Area 206105b5 (S4). CPU 211 retrieves the communication data from the device to device communicating signal (S5). CPU 211 processes with the communication data thereafter (S6). The foregoing sequence is performed periodically.

Paragraph [0392]—<<Voice Message Displaying Function>>

Paragraph [0393]—Paragraph [0394] through Paragraph [0405] illustrate(s) the voice message displaying function which converts the message data, a voice data, stored by implementing the answering machine mode into text data.

Paragraph [0394]—This Paragraph [0394] illustrate(s) the storage area included in RAM 206 (FIG. 1) of Communication Device 200. In the present embodiment, RAM 206 includes Voice Message Displaying Information Storage Area 206107a of which the data and the software programs stored therein are described in Paragraph [0396].

Paragraph [0395]—The data and/or the software programs stored in Voice Message Displaying Information Storage Area 206107a (Paragraph [0394]) may be downloaded from Host H (Paragraph [0022]) in the manner described in Paragraph [0416] through Paragraph [0422].

Paragraph [0396]—This Paragraph [0396] illustrate(s) the storage areas included in Voice Message Displaying Information Storage Area 206107a (Paragraph [0394]). In the present embodiment, Voice Message Displaying Information Storage Area 206107a includes Voice Message Displaying Data Storage Area 206107b and Voice Message Displaying Software Storage Area 206107c. Voice Message Displaying Data Storage Area 206107b stores the data necessary to implement the present function, such as the ones described in Paragraph [0397]. Voice Message Displaying Software Storage Area 206107c stores the software programs necessary to implement the present function, such as the ones described in Paragraph [0401].

Paragraph [0397]—This Paragraph [0397] illustrate(s) the storage areas included in Voice Message Displaying Data Storage Area 206107b (Paragraph [0396]). In the present embodiment, Voice Message Displaying Data Storage Area 206107b includes Answering Machine Message Data Storage Area 206107b1, Caller's Message Data Storage Area 206107b2, Time Stamp Data Storage Area 206107b3, Text Message Data Storage Area 206107b4, and Work Area 206107b5. Answering Machine Message Data Storage Area 206107b1 stores the answering machine message data which is the voice data indicating that the user of Communication Device 200 (callee) can not answer the call and also indicating to leave a message. Caller's Message Data Storage Area 206107b2 stores the data described in Paragraph [0398]. Time Stamp Data Storage Area 206107b3 stores the data described in Paragraph [0399]. Text Message Data Storage Area 206107b4 stores the data described in Paragraph [0400]. Work Area 206107b5 is utilized as a work area to perform calculation and temporarily store data.

Paragraph [0398]—This Paragraph [0398] illustrate(s) the data stored in Caller's Message Data Storage Area 206107b2 (Paragraph [0397]). In the present embodiment, Caller's Message Data Storage Area 206107b2 comprises two columns, i.e., 'Message ID' and 'Caller's Message Data'. Column 'Message ID' stores the message IDs, and each message ID is an identification of the corresponding caller's message data stored in column 'Caller's Message Data'. Here, the message ID may be the caller's phone number or his/her name. Column 'Caller's Message Data' stores the caller's message data, and each caller's message data is the voice data of the caller who called the user of Communication Device

200. In the present embodiment, Caller's Message Data Storage Area 206107b2 stores the following data: the message ID 'Message#1' and the corresponding caller's message data 'Caller's Message Data#1'; the message ID 'Message#2' and the corresponding caller's message data 'Caller's Message Data#2'; the message ID 'Message#3' and the corresponding caller's message data 'Caller's Message Data#3'; and the message ID 'Message#4' and the corresponding caller's message data 'Caller's Message Data#4'.

Paragraph [0399]—This Paragraph [0399] illustrate(s) the data stored in Time Stamp Data Storage Area 206107b3 (Paragraph [0397]). In the present embodiment, Time Stamp Data Storage Area 206107b3 comprises two columns, i.e., 'Message ID' and 'Time Stamp Data'. Column 'Message ID' stores the message IDs, and each message ID is an identification of the corresponding time stamp data stored in column 'Time Stamp Data'. The message IDs stored in Time Stamp Data Storage Area 206107b3 are identical to the ones stored in Caller's Message Data Storage Area 206107b2 (Paragraph [0398]). Column 'Time Stamp Data' stores the time stamp data, and each time stamp data is the data indicating the date, day, and time at which the caller's message data of the corresponding message ID is stored in Caller's Message Data Storage Area 206107b2 (Paragraph [0398]). In the present embodiment, Time Stamp Data Storage Area 206107b3 stores the following data: the message ID 'Message#1' and the corresponding time stamp data 'Time Stamp Data#1'; the message ID 'Message#2' and the corresponding time stamp data 'Time Stamp Data#2'; the message ID 'Message#3' and the corresponding time stamp data 'Time Stamp Data#3'; and the message ID 'Message#4' and the corresponding time stamp data 'Time Stamp Data#4'.

Paragraph [0400]—This Paragraph [0400] illustrate(s) the data stored in Text Message Data Storage Area 206107b4 (Paragraph [0397]). In the present embodiment, Text Message Data Storage Area 206107b4 comprises two columns, i.e., 'Message ID' and 'Text Message Data'. Column 'Message ID' stores the message IDs, and each Message ID is an identification of the corresponding text message data stored in column 'Text Message Data'. The message IDs stored in Text Message Data Storage Area 206107b4 (Paragraph [0400]) are identical to the ones stored in Caller's Message Data Storage Area 206107b2 (Paragraph [0398]). Column 'Text Message Data' stores the text message data, and each text message data is the text data to which the caller's message data of the corresponding message ID stored in Caller's Message Data Storage Area 206107b2 (Paragraph [0398]) is converted by utilizing the voice recognition system. In the present embodiment, Text Message Data Storage Area 206107b4 stores the following data: the message ID 'Message#1' and the corresponding text message data 'Text Message Data#1'; the message ID 'Message#2' and the corresponding text message data 'Text Message Data#2'; the message ID 'Message#3' and the corresponding text message data 'Text Message Data#3'; and the message ID 'Message#4' and the corresponding text message data 'Text Message Data#4'.

Paragraph [0401]—This Paragraph [0401] illustrate(s) the software programs stored in Voice Message Displaying Software Storage Area 206107c (Paragraph [0396]). In the present embodiment, Voice Message Displaying Software Storage Area 206107c stores Answering Machine Mode Implementing Software 206107c1, Afterwards Caller's Message Data Converting Software 206107c2, Text Message Data Displaying Software 206107c3, and Realtime Caller's Message Data Converting Software 206107c4. Answering Machine Mode Implementing Software 206107c1 is the software program described in Paragraph [0402]. Afterwards Caller's Message Data Converting Software 206107c2 is the software program described in Paragraph [0403]. Text Message Data Displaying Software 206107c3 is the software program described in Paragraph [0404]. Realtime Caller's Message Data Converting Software 206107c4 is the software program described in Paragraph [0405].

Paragraph [0402]—This Paragraph [0402] illustrate(s) Answering Machine Mode Implementing Software 206107c1 (Paragraph [0401]) of Communication Device 200, which implements the answering machine mode. In the present embodiment, CPU 211 (FIG. 1) of Communication Device 200 receives signal via Antenna 218 (FIG. 1) (S1). If the signal received in S1 is the phone call signal, CPU 211 (FIG. 1) proceeds to the next step (S2). Here, the phone call signal indicates that another person (caller) is calling the user of Communication Device 200 (callee) for voice communication. CPU 211 connects the call (S3). CPU 211 retrieves the answering machine message data from Answering Machine Message Data Storage Area 206107b1 and outputs the data to the caller (S4). CPU 211 assigns the caller's phone number (or his/her name) as the new message ID (e.g., Message#4) (S5). CPU 211 stores the caller's message data at the message ID (e.g., Message#4) assigned in the previous step in Caller's Message Data Storage Area 206107b2 (Paragraph [0398]) (S6). CPU 211 (FIG. 1) stores the current time as the time stamp data at the message ID (e.g., Message#4) assigned in the previous step in Time Stamp Data Storage Area 206107b3 (Paragraph [0399]) (S7). CPU 211 disconnects the call thereafter (S8). The foregoing sequence is performed periodically.

Paragraph [0403]—This Paragraph [0403] illustrate(s) Afterwards Caller's Message Data Converting Software 206107c2 (Paragraph [0401]) of Communication Device 200, which selects a caller's message data and converts the data to a text message data. In the present embodiment, CPU 211 (FIG. 1) of Communication Device 200 retrieves all message IDs from Caller's Message Data Storage Area 206107b2 (Paragraph [0398]) and displays the data on LCD 201 (FIG. 1) (S1). The user of Communication Device 200 selects by utilizing Input Device 210 (FIG. 1) or via voice recognition system a message ID (e.g., Message#1) (S2). CPU 211 outputs the corresponding caller's message data (e.g., Caller's Message Data#1) from Speaker 216 (FIG. 1) (S3). CPU 211 retrieves the corresponding time stamp data (e.g., Time Stamp Data#1) from Time Stamp Data Storage Area 206107b3 (Paragraph [0399]) and displays the data on LCD 201 (FIG. 1) (S4). If a convert to text message data signal is input by utilizing Input Device 210 (FIG. 1) or via voice recognition system, CPU 211 (FIG. 1) proceeds to the next step (S5). Here, the convert to text message data signal is a signal to convert the caller's message data (e.g., Message#1) selected in S2 to the text message data (e.g., Text Message Data#1). CPU 211 converts the caller's message data (e.g., Caller's Message Data#1) of the message ID (e.g., Message#1) selected in S2 to the text message data (e.g., Text Message Data#1) and displays the data on LCD 201 (FIG. 1) (S6). CPU 211 stores the text message data (e.g., Text Message Data#1) converted in the previous step at the corresponding message ID (e.g., Message#1) in Text Message Data Storage Area 206107b4 (Paragraph [0400]) (S7).

Paragraph [0404]—This Paragraph [0404] illustrate(s) Text Message Data Displaying Software 206107c3 (Paragraph [0401]) of Communication Device 200, which displays the text message data on LCD 201 (FIG. 1). In the present embodiment, CPU 211 (FIG. 1) of Communication Device 200 retrieves all message IDs from Text Message Data Storage Area 206107b4 (Paragraph [0400]) (S1). CPU 211 retrieves all corresponding time stamp data from Time Stamp Data Storage Area 206107b3 (Paragraph [0399]) (S2). CPU 211 retrieves all corresponding text message data (however, the first portion of each text message data (e.g., first 10 words of each text message data)) from Text Message Data Storage Area 206107b4 (Paragraph [0400]) (S3). CPU 211 displays the data retrieved in the previous three steps on LCD 201 (FIG. 1) (S4). The user of Communication Device 200 selects by utilizing Input Device 210 (FIG. 1) or via voice recognition system a message ID (e.g., Message#1) (S5). CPU 211 retrieves the corresponding text message data (the entire data of Text Message Data#1) and the corresponding message ID (e.g., Message#1) from Text Message Data Storage Area 206107b4 (Paragraph [0400]) (S6). CPU 211 retrieves the corresponding time stamp data (e.g., Time Stamp Data#1) from Time Stamp Data Storage Area 206107b3 (Paragraph [0399]) (S7). CPU 211 displays the data retrieved in the previous two steps on LCD 201 (FIG. 1) (S8).

Paragraph [0405]—This Paragraph [0405] illustrate(s) Realtime Caller's Message Data Converting Software 206107c4 (Paragraph [0401]) of Communication Device 200, which converts the caller's message data to text message data realtime. In the present embodiment, CPU 211 (FIG. 1) of Communication Device 200 receives signal via Antenna 218 (FIG. 1) (S1). If the signal received in S1 is the phone call signal, CPU 211 (FIG. 1) proceeds to the next step (S2). Here, the phone call signal indicates that another person (caller) is calling the user of Communication Device 200 (callee) for voice communication. CPU 211 connects the call (S3). CPU 211 retrieves the answering machine message data from Answering Machine Message Data Storage Area 206107b1 and outputs the data to the caller (S4). CPU 211 assigns the caller's phone number (or his/her name) as the new message ID (e.g., Message#4) (S5). CPU 211 stores the caller's message data (e.g., Caller's Message Data#4) at the message ID (e.g., Message#4) assigned in the previous step in Caller's Message Data Storage Area 206107b2 (Paragraph [0398]) (S6). CPU 211 stores the current time as the time stamp data (e.g., Time Stamp Data#4) at the message ID (e.g., Message#4) assigned in the previous step in Time Stamp Data Storage Area 206107b3 (Paragraph [0399]) (S7). CPU 211 outputs the caller's message data (e.g., Caller's Message Data#4) stored in S6 from Speaker 216 (FIG. 1) (S8). CPU 211 converts the caller's message data (e.g., Caller's Message Data#4) stored in S6 to the text message data (e.g., Text Message Data#4) (S9). CPU 211 stores the text message data (e.g., Text Message Data#4) converted in the previous step at the corresponding message ID (e.g., Message#4) in Text Message Data Storage Area 206107b4 (Paragraph [0400]) (S10). CPU 211 retrieves the text message data (e.g., Text Message Data#4) stored in the previous step from Text Message Data Storage Area 206107b4 (Paragraph [0400]) (S11). CPU 211 retrieves the time stamp data (e.g., Time Stamp Data#4) stored in S7 from Time Stamp Data Storage Area 206107b3 (Paragraph [0399]) (S12). CPU 211 displays the data retrieved in the previous two steps on LCD 201 (FIG. 1) (S13). CPU 211 disconnects the call thereafter (S14). The foregoing sequence is performed periodically. The data stored in the foregoing sequence may be displayed on LCD 201 by executing Text Message Data Displaying Software 206107c3 (Paragraph [0404]).

Paragraph [0406]—<<Multiple Mode Implementing Function>>

Paragraph [0407]—Paragraph [0408] through Paragraph [0413] illustrate(s) the multiple mode implementing function of Communication Device 200 which enables to activate and implement a plurality of modes, functions, and/or systems described in this specification simultaneously.

Paragraph [0408]—This Paragraph [0408] illustrate(s) the software programs stored in RAM 206 (FIG. 1) to implement the multiple mode implementing function (FIG. 1). As described in Paragraph [0408], RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f. Mode List Displaying Software 20690c displays on LCD 201 (FIG. 1) a list of a certain amount or all modes, functions, and/or systems explained in this specification of which the sequence is explained in Paragraph [0409]. Mode Selecting Software 20690d selects a certain amount or all modes, functions, and/or systems explained in this specification of which the sequence is explained in Paragraph [0410]. Mode Activating Software 20690c activates a certain amount or all modes, functions, and/or systems selected by the Mode Selecting Software 20690d of which the sequence is explained in Paragraph [0411]. Mode Implementation Repeater 20690f executes Multiple Mode Implementer 20690b which reactivates Mode List Displaying Software 20690c, Mode Selecting Software 20690d, Mode Activating Software 20690e of which the sequence is explained in Paragraph [0412].

Paragraph [0409]—This Paragraph [0409] illustrate(s) the sequence of Mode List Displaying Software 20690c (Paragraph [0408]). Referring to Paragraph [0409], CPU 211 (FIG. 1), under the command of Mode List Displaying Software 20690c, displays a list of a certain amount or all modes, functions, and/or systems described in this specification on LCD 201 (FIG. 1).

Paragraph [0410]—This Paragraph [0410] illustrate(s) the sequence of Mode Selecting Software 20690d (Paragraph [0408]). Referring to Paragraph [0410], the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

Paragraph [0411]—This Paragraph [0411] illustrate(s) the sequence of Mode Activating Software 20690e (Paragraph [0408]). Referring to Paragraph [0411], CPU 211 (FIG. 1), under the command of Mode Activating Software 20690e, activates the mode, function, or, system selected in S2 of Paragraph [0410]. CPU 211 thereafter implements the activated mode, function, or system as described in the relevant embodiments in this specification.

Paragraph [0412]—This Paragraph [0412] illustrate(s) the sequence of Mode Implementation Repeater 20690f (Paragraph [0408]). Referring to Paragraph [0412], the user of Communication Device 200 inputs an input signal by utilizing Input Device 210 (FIG. 1) or via voice recognition system (S1). Once the activation of the selected mode, function, or system described in Paragraph [0411] hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690b (Paragraph [0408]), which reactivates Mode List Displaying Software 20690c (Paragraph [0408]), Mode Selecting Software 20690d (Paragraph [0408]), and Mode Activating Software 20690e (Paragraph [0408]) to activate the second mode, function, or system while the first mode, function, or system is implemented by utilizing the method of so-called 'time sharing' (S3). Mode List Displaying Software 20690c, Mode Selecting Software 20690d, and Mode Activating Software 20690e can be repeatedly executed until all modes, function, and systems displayed on LCD 201 (FIG. 1) are selected and activated. The activation of modes, functions, and/or systems is not repeated if the input signal explained in S2 so indicates.

Paragraph [0413]—As another embodiment, Multiple Mode Implementer 20690b, Mode List Displaying Software 20690c, Mode Selecting Software 20690d, Mode Activating Software 20690e, and Mode Implementation Repeater 20690f described in Paragraph [0408] may be integrated into one software program, Multiple Mode Implementer 20690b, as described in this Paragraph [0413]. Referring to this Paragraph [0413], CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant embodiments in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

Paragraph [0414]—<<Multiple Software Download Function>>

Paragraph [0415]—Paragraph [0416] through Paragraph [0422] illustrate(s) the multiple software download function which enables Communication Device 200 to download a plurality of software programs simultaneously. All software programs, data, any types of information to implement all modes, functions, and systems described in this specification are stored in a host or server from which Communication Device 200 can download.

Paragraph [0416]—This Paragraph [0416] illustrate(s) the software programs stored in RAM 206 (FIG. 1). As described in Paragraph [0416], RAM 206 includes Multiple Software Download Controller Storage Area 20691a. Multiple Software Download Controller Storage Area 20691a includes Multiple Software Download Controller 20691b, Download Software List Displaying Software 20691c, Download Software Selector 20691d, Download Software Storage Area Selector 20691e, Download Implementer 20691f, and Download Repeater 20691g. Multiple Software Download Controller 20691b administers the overall implementation of the present function. One of the major tasks of Multiple Software Download Controller 20691b is to administer and control the timing and sequence of Download Software List Displaying Software 20691c, Download Software Selector 20691d, Download Software Storage Area Selector 20691e, Download Implementer 20691f, and Download Repeater 20691g. For example, Multiple Software Download Controller 20691b executes them in the following order: Download Software List Displaying Software 20691c, Download Software Selector 20691d, Download Software Storage Area Selector 20691e, Download Implementer 20691f, and Download Repeater 20691g. Download Software List Displaying Software 20691c displays on LCD 201 (FIG. 1) a list of a certain amount or all software programs necessary to implement the modes, functions, and/or systems explained in this specification of which the sequence is explained in Paragraph [0417] hereinafter. Download Software Selector 20691d selects one of the software programs displayed on LCD 201 of which the sequence is explained in Paragraph [0418] hereinafter. Download Software Storage Area Selector 20691e selects the storage area in RAM 206 where the downloaded software program is stored of which the sequence is explained in Paragraph [0419] hereinafter. Download Implementer 20691f implements the download process of the software program selected by Download Software Selector 20691d hereinbefore and stores the software program in the storage area selected by Download Software Storage Area Selector 20691e hereinbefore of which the sequence is explained in Paragraph [0420] hereinafter. Download Repeater 20691g executes Multiple Software Download Controller 20691b which reactivates Download Software List Displaying Software 20691c, Download Software Selector 20691d, Download Software Storage Area Selector 20691e, and Download Implementer 20691f of which the sequence is explained in Paragraph [0420] hereinafter.

Paragraph [0417]—This Paragraph [0417] illustrate(s) the sequence of Download Software List Displaying Software 20691c (Paragraph [0416]). Referring to Paragraph [0417], CPU 211 (FIG. 1), under the command of Download Software List Displaying Software 20691c, displays a list of a certain amount or all software programs to implement all modes, functions, and systems described in this specification on LCD 201 (FIG. 1).

Paragraph [0418]—This Paragraph [0418] illustrate(s) the sequence of Download Software Selector 20691d (Paragraph [0416]). Referring to Paragraph [0418], the user of Communication Device 200 inputs an input signal by utilizing Input Device 210 (FIG. 1) or via voice recognition system identifying one of the software programs displayed on LCD 201 (FIG. 1) (S1), and CPU 211, under the command of Download Software Selector 20691d, interprets the input signal and selects the corresponding software program (S2).

Paragraph [0419]—This Paragraph [0419] illustrate(s) the sequence of Download Software Storage Area Selector 20691e (Paragraph [0416]). Referring to Paragraph [0419], CPU 211 (FIG. 1), under the command of Download Software Storage Area Selector 20691e, selects a specific storage area in RAM 206 (FIG. 1) where the downloaded software program is to be stored. The selection of the specific storage area in RAM 206 may be done automatically by CPU 211 or manually by the user of Communication Device 200 by utilizing Input Device 210 (FIG. 1) or via voice recognition system.

Paragraph [0420]—This Paragraph [0420] illustrate(s) the sequence of Download Implementer 20691f (Paragraph [0416]). Referring to Paragraph [0420], CPU 211 (FIG. 1), under the command of Download Implementer 20691f, implements the download process of the software program selected by Download Software Selector 20691d (Paragraph [0418]) and stores the software program in the storage area selected by Download Software Storage Area Selector 20691e (Paragraph [0419]).

Paragraph [0421]—This Paragraph [0421] illustrate(s) the sequence of Download Repeater 20691g (Paragraph [0416]). Referring to Paragraph [0421], the user of Communication Device 200 inputs an input signal by utilizing Input Device 210 (FIG. 1) or via voice recognition system when the downloading process of the software program is completed (S1). If the input signal indicates to repeat the process to download another software program, CPU 211 (FIG. 1), under the command of Download Repeater 20691g, executes Multiple Software Download Controller 20691b (Paragraph [0416]), which reactivates Download Software List Displaying Software 20691c (Paragraph [0416]), Download Software Selector 20691d (Paragraph [0416]), Download Software Storage Area Selector 20691e (Paragraph [0416]), and Download Implementer 20691f (Paragraph [0416]) to download the second software program while the downloading process of the first software program is still in progress by utilizing the method so-called 'time sharing' (S3). Download Software List Displaying Software 20691c, Download Software Selector 20691d, Download Software Storage Area Selector 20691e, and Download Implementer 20691f can be repeatedly executed until all software programs displayed on LCD 201 (FIG. 1) are selected and downloaded. The downloading process is not repeated if the input signal explained in S2 so indicates.

Paragraph [0422]—As another embodiment, as described in this Paragraph [0422], Multiple Software Download Controller 20691b, Download Software List Displaying Software 20691c, Download Software Selector 20691d, Download Software Storage Area Selector 20691e, Download Implementer 20691f, and Download Repeater 20691g may be integrated into a single software program, Multiple Software Download Controller 20691b. First of all, CPU 211 (FIG. 1) displays a list of all software programs downloadable from a host or server on LCD 201 (FIG. 1) (S1). The user of Communication Device 200 inputs an input signal by utilizing Input Device 210 (FIG. 1) or via voice recognition system identifying one of the software programs displayed on LCD 201 (S2), and CPU 211 interprets the input signal and selects the corresponding software program (S3) and selects the storage area in RAM 206 (FIG. 1) where the downloaded software program is to be stored (S4). The selection of the specific storage area in RAM 206 may be done automatically by CPU 211 or manually by the user of Communication Device 200 by utilizing Input Device 210 (FIG. 1) or via voice recognition system. CPU 211 then implements the download process of the software program selected in S3 and stores the software program in the storage area selected in S4 (S5). The user of Communication Device 200 inputs an input signal by utilizing Input Device 210 or via voice recognition system when the activation of downloading process of the software program described in S5 is completed (S6). If the input signal indicates to repeat the process to download another software program, CPU 211 repeats the steps of S1 through S5 to download the second software program while the downloading process of the first software program is still in progress by utilizing the method so-called 'time sharing' (S7). The steps of S1 through S5 can be repeated until all software programs displayed on LCD 201 are selected and downloaded. The downloading process is not repeated if the input signal explained in S6 so indicates.

Paragraph [0423]—For the avoidance of doubt, Paragraph [0416] through Paragraph are also applicable to download data and any types of information other than software programs.

Paragraph [0424]—<<INCORPORATION BY REFERENCE>>

Paragraph [0425]—The following paragraphs and drawings described in U.S. Provisional Application No. 60/521,265, filed 2004-Mar.-23, are incorporated to this application by reference: the preamble described in paragraph [2822] (no drawings); Communication Device 200 (Voice Communication Mode) described in paragraphs [2823] through [2828] (FIGS. 1 through 2c); Voice Recognition System described in paragraphs [2829] through [2861] (FIGS. 3 through 19); Positioning System described in paragraphs [2862] through [2893] (FIGS. 20a through 32c); Auto Backup System described in paragraphs [2894] through [2903] (FIGS. 33 through 37); Signal Amplifier described in paragraphs [2904] through [2909] (FIG. 38); Audio/Video Data Capturing System described in paragraphs [2910] through [2922] (FIGS. 39 through 44b); Digital Mirror Function (1) described in paragraphs [2923] through [2931] (FIGS. 44c through 44e); Caller ID System described in paragraphs [2932] through [2939] (FIGS. 45 through 47); Stock Purchasing Function described in paragraphs [2940] through [2949] (FIGS. 48 through 52); Timer Email Function described in paragraphs [2950] through [2956] (FIGS. 53a and 53b); Call Blocking Function described in paragraphs [2957] through [2970] (FIGS. 54 through 59); Online Payment Function described in paragraphs [2971] through [2980] (FIGS. 60 through 64); Navigation System described in paragraphs [2981] through [3003] (FIGS. 65 through 74a); Remote Controlling System described in paragraphs [3004] through [3022] (FIGS. 75 through 85); Auto Emergency Calling System described in paragraphs [3023] through [3031] (FIGS. 86 and 87); Cellular TV Function described in paragraphs [3032] through [3116] (FIGS. 88 through 135); 3D Video Game Function described in paragraphs [3117] through [3129] (FIGS. 136 through 144); Digital Mirror Function (2) described in paragraphs [3130] through [3139] (FIGS. 145 through 155); Voice Recognition Sys—E-mail (2) described in paragraphs [3140] through [3148] (FIGS. 156 through 160); Positioning System—GPS Search Engine described in paragraphs [3149] through [3191] (FIGS. 161 through 182); Mobile Ignition Key Function described in paragraphs [3192] through [3214] (FIGS. 183 through 201); Voice Print Authentication System described in paragraphs [3215] through [3225] (FIGS. 202 through 211); Fingerprint Authentication System described in paragraphs [3226] through [3238] (FIGS. 212 through 221); Auto Time Adjust Function described in paragraphs [3239] through [3243] (FIGS. 222 through 224); Video/Photo Mode described in paragraphs [3244] through [3272] (FIGS. 225 through 242); Call Taxi Function described in paragraphs [3273] through [3313] (FIGS. 243 through 269); Shooting Video Game Function described in paragraphs [3314] through [3330] (FIGS. 270 through 283); Driving Video Game Function described in paragraphs [3331] through (FIGS. 284 through 294); Address Book Updating Function described in paragraphs through [3365] (FIGS. 295 through 312); Batch Address Book Updating Function—With Host described in paragraphs [3366] through [3387] (FIGS. 313 through 329); Batch Address Book Updating Function—Peer-To-Peer Connection described in paragraphs [3388] through (FIGS. 329a through 329c); Batch Scheduler Updating Function—With Host described in paragraphs [3393] through [3416] (FIGS. 330 through 350); Batch Scheduler Updating Function—Peer-To-Peer Connection described in paragraphs [3417] through [3421] (FIGS. 351 and 352); Calculator Function described in paragraphs [3422] through [3427] (FIGS. 353 through 356); Spreadsheet Function described in paragraphs [3428] through [3435] (FIGS. 357 through 360); Word Processing Function described in paragraphs [3436] through [3451] (FIGS. 361 through 373); TV Remote Controller Function described in paragraphs [3452] through [3474] (FIGS. 374 through 394); CD/PC Inter-communicating Function described in paragraphs [3475] through (FIGS. 413 through 427); PDWR Sound Selecting Function described in paragraphs through [3536] (FIGS. 428 through 456); Start Up Software Function described in paragraphs [3537] through [3553] (FIGS. 457 through 466); Another Embodiment Of Communication Device 200 described in paragraphs [3554] through [3558] (FIGS. 467a through 467d); Stereo Audio Data Output Function described in paragraphs [3559] through [3578] (FIGS. 468 through 479); Stereo Visual Data Output Function described in paragraphs [3579] through (FIGS. 480 through 491); Multiple Signal Processing Function described in paragraphs through [3671] (FIGS. 492 through 529); Positioning System—Pin-pointing Function described in paragraphs [3672] through [3705] (FIGS. 530 through 553); Artificial Satellite Host described in paragraphs [3706] through [3724] (FIGS. 554 through 567); CCD Bar Code Reader Function described in paragraphs [3725] through [3746] (FIGS. 568 through 579); Online Renting Function described in paragraphs [3747] through [3824] (FIGS. 580 through 633); SOS Calling Function described in paragraphs [3825] through [3845] (FIGS. 634 through 645); Input Device described in paragraphs [3846] through [3851] (FIGS. 646 through 650); PC Remote Controlling Function described in paragraphs [3852] through [3887] (FIGS. 651 through 670); PC Remote Downloading Function described in paragraphs [3888] through [3937] (FIGS. 671 through 701); Audiovisual Playback Function described in paragraphs [3938] through [3963] (FIGS. 702 through 716); Audio Playback Function described in paragraphs [3964] through [3988] (FIGS. 717 through 731); Ticket Purchasing Function described in paragraphs [3989] through [4018] (FIGS. 732 through 753); Remote Data Erasing Function described in paragraphs [4019] through [4048] (FIGS. 754 through 774); Business Card Function described in paragraphs [4049] through [4065] (FIGS. 775 through 783); Game Vibrating Function described in paragraphs [4066] through [4076] (FIGS. 784 through 786); Part-time Job Finding Function described in paragraphs through [4097] (FIGS. 787 through 801); Parking Lot Finding Function described in paragraphs [4098] through [4137] (FIGS. 802 through 832); Parts Upgradable Communication Device described in paragraphs [4138] through [4163] (FIGS. 833a through 833x); On Demand TV Function described in paragraphs [4164] through [4194] (FIGS. 834 through 855); Intercommunicating TV Function described in paragraphs [4195] through [4229] (FIGS. 856 through 882); Display Controlling Function described in paragraphs [4230] through [4247] (FIGS. 883 through 894); Multiple Party Communicating Function described in paragraphs [4248] through (FIGS. 894a through 917); Display Brightness Controlling Function described in paragraphs [4282] through [4291] (FIGS. 918 through 923); Multiple Party Pin-pointing Function described in paragraphs [4292] through [4339] (FIGS. 924 through 950f); Digital Camera Function described in paragraphs [4340] through [4367] (FIGS. 951 through 968); Phone Number Linking Function described in paragraphs [4368] through [4391] (FIGS. 968a through 983); Multiple Window Displaying Function described in paragraphs [4392] through [4410] (FIGS. 984 through 995); Mouse Pointer Displaying Function described in paragraphs [4411] through [4448] (FIGS. 996 through 1021); House Item Pin-pointing Function described in paragraphs [4449] through [4608] (FIGS. 1022 through 1152); Membership Administrating Function described in paragraphs [4609] through [4651] (FIGS. 1153 through 1188); Keyword Search Timer Recording Function described in paragraphs [4652] through [4743] (FIGS. 1189 through 1254); Weather Forecast Displaying Function described in paragraphs [4744] through [4785] (FIGS. 1255 through 1288); Multiple Language Displaying Function described in paragraphs [4786] through [4843] (FIGS. 1289 through 1331); Caller's Information Displaying Function described in paragraphs through [4897] (FIGS. 1332 through 1375); Communication Device Remote Controlling Function (By Phone) described in paragraphs [4898] through [4938] (FIGS. 1394 through 1415); Communication Device Remote Controlling Function (By Web) described in paragraphs [4939] through [4979] (FIGS. 1416 through 1437); Shortcut Icon Displaying Function described in paragraphs [4980] through [5007] (FIGS. 1438 through 1455); Task Tray Icon Displaying Function described in paragraphs [5008] through [5030] (FIGS. 1456 through 1470); Multiple Channel Processing Function described in paragraphs [5031] through [5078] (FIGS. 1471 through 1498); Solar Battery Charging Function described in paragraphs [5079] through [5092] (FIGS. 1499 through 1509); OS Updating Function described in paragraphs [5093] through [5160] (FIGS. 1510 through 1575); Device Managing Function described in paragraphs [5161] through [5178] (FIGS. 1576 through 1587); Automobile Controlling Function described in paragraphs [5179]through [5227] (FIGS. 1588 through 1627); OCR Function described in paragraphs [5228] through [5263] (FIGS. 1628 through 1652); Real-time GPS Function described in paragraphs through [5333] (FIGS. 1653 through 1712); CCD Video Stabilizing Function described in paragraphs [5334] through [5365] (FIGS. 1713 through 1736); DVD Remote Controlling Function described in paragraphs [5366] through [5404] (FIGS. 1737 through 1757); Dual Frame Buffer Implementing Function described in paragraphs [5405] through [5421] (FIGS. 1758 through 1767); Mouse Pointer Image Auto Changing Function described in paragraphs [5422] through [5435] (FIGS. 1768 through 1774); Dual CCD Camera Function described in paragraphs [5436] through [5456] (FIGS. 1775a through 1786); Radio Tuner Function described in paragraphs [5457] through [5487] (FIGS. 1787 through 1812); Registered Voice Recognizing Function described in paragraphs [5488] through [5527] (FIGS. 1813 through 1842); Host's TV Resolution Converting Function described in paragraphs [5528] through [5557] (FIGS. 1843 through 1864); Voice Shortcut Recognizing Function described in paragraphs [5558] through [5592] (FIGS. 1865 through 1889); Vital Sign Monitoring Function described in paragraphs [5593] through [5682] (FIGS. 1890*a* through 1954); Attached File Emailing Function described in paragraphs [5683] through [5695] (FIGS. 1955 through 1961); Movie eTicket Function described in paragraphs [5696] through [5748] (FIGS. 1962 through 2002); Carrier Prepaid eCard Function described in paragraphs [5749] through [5789] (FIGS. 2003 through 2032); Carrier ePass Function described in paragraphs [5790] through [5829] (FIGS. 2033 through 2061*b*); Communication Device 200 Installed In Carrier described in paragraphs [5830] through [5831] (FIG. 2062); Wireless Communication Facilitating System described in paragraphs [5832] through [5861] (FIGS. 2063 through 2076*b*); In-Carrier Notifying Function described in paragraphs [5862] through [5892] (FIGS. 2077 through 2093); Station Name Notifying Function described in paragraphs [5893] through [5922] (FIGS. 2094 through 2110); Restaurant eMenu Function described in paragraphs [5923] through [5965] (FIGS. 2111 through 2144); Geographic Location Recording Function described in paragraphs [5966] through [6007] (FIGS. 2145 through 2176*b*); CCD Dictionary Function described in paragraphs [6008] through [6032] (FIGS. 2177 through 2195*b*); Schedule Notifying Function described in paragraphs [6033] through [6059] (FIGS. 2196 through 2215); Customized Device Purchasing System described in paragraphs [6060] through [6100] (FIGS. 2216 through 2250); Multiple Type TV Program Distributing System described in paragraphs [6101] through [6131] (FIGS. 2251 through 2274); Multiple TV Screen Displaying Function described in paragraphs [6132] through [6163] (FIGS. 2275 through 2297); Touch Panel Function described in paragraphs [6164] through [6189] (FIGS. 2298 through 2315); Communication Device Finding Function described in paragraphs [6190] through [6201] (FIGS. 2316 through 2322); Carrier Safety Measure Controlling Function described in paragraphs [6202] through [6236] (FIGS. 2323 through 2342); Product Information Retrieving Function (CCD) described in paragraphs [6237] through [6265] (FIGS. 2343 through 2360); Product Information Stored Chip Function described in paragraphs [6266] through [6303] (FIGS. 2361 through 2385); Karaoke Playing Function described in paragraphs [6304] through [6332] (FIGS. 2386 through 2406); Performing Pattern Identifying Anti-Virus Function described in paragraphs through [6355] (FIGS. 2407 through 2421); Continue Enabled Video Game Function described in paragraphs [6356] through [6378] (FIGS. 2422 through 2436); Resume Enabled Video Game Function described in paragraphs [6379] through [6401] (FIGS. 2437 through 2451); Signal Forwarding Function described in paragraphs [6402] through [6430] (FIGS. 2452 through 2472); In-Carrier Auto Implementing Mode Function described in paragraphs [6431] through (FIGS. 2473 through 2492); Voice Message Displaying Function described in paragraphs through [6481] (FIGS. 2493 through 2503*c*); Human Toes Displaying Function described in paragraphs [6482] through [6499] (FIGS. 2504 through 2521); Wrinkles/Muscles Displaying Function described in paragraphs [6500] through [6541] (FIGS. 2522*a* through 2552*e*); Protruded Body Part Displaying Function described in paragraphs [6542] through [6561] (FIGS. 2553 through 2566*b*); Satellite TV Program Displaying Function described in paragraphs [6562] through [6606] (FIGS. 2567 through 2601); Definition of Communication Device 200 described in paragraphs [6607] through [6608] (no drawings); Multiple Mode Implementing Function described in paragraphs [6610] through [6617] (FIGS. 395 through 400); Multiple Software Download Function described in paragraphs [6618] through [6627] (FIGS. 401 through 407); Selected Software Distributing Function described in paragraphs [6628] through [6647] (FIGS. 1376 through 1393*d*); Multiple Software Download And Mode Implementation Function described in paragraphs [6648] through [6655] (FIGS. 408 through 412); and the last sentence described in paragraph [6657] (no drawings).

The invention claimed is:

1. A method for a communication device comprising a microphone, a speaker, an input device, a display, a camera, a touch panel, and a wireless communicating system, said method comprising:

a function implementing step in which a specific function is implemented;

wherein said communication device implements a voice communicating function, an attached file emailing function, a geographic location function, a dictionary function, a schedule notifying function, a multiple type TV program function, a multiple TV screen displaying function, a touch panel function, a communication device finding function, and a resume enabled video game function, independently or simultaneously;

voice communication is implemented by utilizing said microphone and said speaker, when said voice communicating function is implemented in said step;

an email is sent with a file attached thereto, when said attached file emailing function is implemented in said step;

a communication device geographic location which indicates the geographic location of said communication device is indicated on a map displayed on said display, a corresponding street address which corresponds to said communication device geographic location is displayed on said display, and a corresponding phone number which corresponds to said communication device geographic location or said corresponding street address is displayed on said display, when said geographic location function is implemented in said step;

an image is retrieved via said camera of said communication device, an alphanumeric data is retrieved from said image, and an explanation data corresponding to said alphanumeric data is displayed on said display, when said dictionary function is implemented in said step;

a notice is displayed on said display when a schedule is about to start, when said schedule notifying function is implemented in said step;

a satellite TV program data is received via said wireless communicating system and output from said speaker and said display under a 1st mode, and a ground wave TV program data is received via said wireless communicating system and output from said speaker and said display under a 2nd mode, when said multiple type TV program function is implemented in said step;

a plurality of TV screens are displayed on said display, wherein said plurality of TV screens include a 1st cell and a 2nd cell, a 1st TV program data and a 2nd TV program data are received via said wireless communicating system and said 1st TV program data of a shrunk version is displayed in said 1st cell and said 2nd TV program data of a shrunk version is displayed in said 2nd cell simultaneously, when said 1st cell is selected by said input device, said 1st TV program data of a non-shrunk version is displayed on said display, and when said 2nd cell is selected by said input device, said 2nd TV program data of a non-shrunk version is displayed on said display, when said multiple TV screen displaying function is implemented in said step, wherein each of the TV program data of the non-shrunk version is an image larger in size than the corresponding TV program data of the shrunk version;

said communication device is operated via said touch panel, when said touch panel function is implemented in said step;

when said communication device detects a predetermined audio data via said microphone, said communication device responds by outputting a responding sound data, which is a certain sound data, from said speaker in order to assist the user to find the location of said communication device, when said communication device finding function is implemented in said step; and a video game, which is operable to be resumed from the point which said video game was paused, is performed when said resume enabled video game function is implemented in said step.

2. A communication device comprising:
a microphone;
a speaker;
an input device;
a display;
a camera;
a touch panel;
a wireless communicating system;
a voice communicating means, wherein voice communication is implemented by utilizing said microphone and said speaker;
an attached file emailing means, wherein an email is sent with a file attached thereto;
a geographic location means, wherein a communication device geographic location which indicates the geographic location of said communication device is indicated on a map displayed on said display, a corresponding street address which corresponds to said communication device geographic location is displayed on said display, and a corresponding phone number which corresponds to said communication device geographic location or said corresponding street address is displayed on said display;
a dictionary means, wherein an image is retrieved via said camera of said communication device, an alphanumeric data is retrieved from said image, and an explanation data corresponding to said alphanumeric data is displayed on said display;
a schedule notifying means, wherein a notice is displayed on said display when a schedule is about to start;
a multiple type TV program means, wherein a satellite TV program data is received via said wireless communicating system and output from said speaker and said display under a 1st mode, and a ground wave TV program data is received via said wireless communicating system and output from said speaker and said display under a 2nd mode;
a multiple TV screen displaying means, wherein a plurality of TV screens are displayed on said display, wherein said plurality of TV screens include a 1st cell and a 2nd cell, a 1st TV program data and a 2nd TV program data are received via said wireless communicating system and said 1st TV program data of a shrunk version is displayed in said 1st cell and said 2nd TV program data of a shrunk version is displayed in said 2nd cell simultaneously, when said 1st cell is selected by said input device, said 1st TV program data of a non-shrunk version is displayed on said display, and when said 2nd cell is selected by said input device, said 2nd TV program data of a non-shrunk version is displayed on said display, wherein each of the TV program data of the non-shrunk version is an image larger in size than the corresponding TV program data of the shrunk version;

a touch panel means, wherein said communication device is operated via said touch panel;

a communication device finding means, wherein when said communication device detects a predetermined audio data via said microphone, said communication device responds by outputting a responding sound data, which is a certain sound data, from said speaker in order to assist the user to find the location of said communication device; and a resume enabled video game means, wherein a video game, which is operable to be resumed from the point which said video game was paused, is performed.

3. A communication device comprising:
a microphone;
a speaker;
an input device;
a display;
a camera;
a touch panel;
an antenna;
a voice communicating implementor, wherein voice communication is implemented by utilizing said microphone and said speaker;
an attached file emailing implementor, wherein an email is sent with a file attached thereto;
a geographic location implementor, wherein a communication device geographic location which indicates the geographic location of said communication device is indicated on a map displayed on said display;
a dictionary implementor, wherein an image is retrieved via said camera of said communication device, an alphanumeric data is retrieved from said image, and an explanation data corresponding to said alphanumeric data is displayed on said display;
a schedule notifying implementor, wherein a notice is output from said communication device when a schedule is about to start;
a multiple type TV program implementor, wherein a 1st type TV program data is received via said antenna and output from said speaker and said display under a 1st mode, and a 2nd TV program data is received via said antenna and output from said speaker and said display under a 2nd mode;
a multiple TV screen displaying implementor, wherein a 1st TV program data and a 2nd TV program data are received via said antenna, and said 1st TV program data and said 2nd TV program data are displayed on said display simultaneously;
a touch panel implementor, wherein said communication device is operated via said touch panel;
a communication device finding implementor, wherein when said communication device detects a predetermined audio data via said microphone, said communication device responds by outputting a responding sound data, which is a certain sound data, from said speaker; and
a resume enabled video game implementor, wherein a video game, which is operable to be resumed from the point which said video game was paused, is performed.

* * * * *